(12) United States Patent
Takabayashi et al.

(10) Patent No.: US 7,821,669 B2
(45) Date of Patent: Oct. 26, 2010

(54) IMAGE RETOUCHING PROGRAM

(75) Inventors: Nobuhisa Takabayashi, Nagano-ken (JP); Masaru Hoshino, Nagano-ken (JP); Atsushi Hatta, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 303 days.

(21) Appl. No.: 11/543,149

(22) Filed: Oct. 5, 2006

(65) Prior Publication Data
US 2007/0030506 A1 Feb. 8, 2007

Related U.S. Application Data

(62) Division of application No. 10/229,275, filed on Aug. 28, 2002, now Pat. No. 7,256,911.

(30) Foreign Application Priority Data

Aug. 29, 2001 (JP) .............................. 2001-259880

(51) Int. Cl.
*H04N 1/40* (2006.01)
(52) U.S. Cl. ........................................ 358/1.9; 358/527
(58) Field of Classification Search .................. 358/1.9, 358/2.1, 527, 504, 406; 382/189
See application file for complete search history.

(56) References Cited

U.S. PATENT DOCUMENTS

| | | | |
|---|---|---|---|
| 4,885,786 A | 12/1989 | Anderson et al. | |
| 5,493,408 A | 2/1996 | Kurogane et al. | |
| 5,539,426 A * | 7/1996 | Nishikawa et al. | 345/635 |
| 6,333,752 B1 * | 12/2001 | Hasegawa et al. | 715/764 |
| 6,396,594 B1 * | 5/2002 | French et al. | 358/1.18 |
| 6,839,803 B1 * | 1/2005 | Loh et al. | 711/113 |
| 6,847,729 B1 * | 1/2005 | Clinch et al. | 382/128 |
| 7,324,749 B2 * | 1/2008 | Kubo | 396/429 |

FOREIGN PATENT DOCUMENTS

| | | |
|---|---|---|
| EP | 0806721 A1 | 11/1997 |
| EP | 1 098 243 A2 | 5/2001 |
| JP | 10-315577 | 12/1988 |
| JP | 4-264976 | 9/1992 |
| JP | 05-292082 | 11/1993 |

(Continued)

OTHER PUBLICATIONS

Micrografx Picture Publisher Reference Guide ("Micrografx Guide"), copyright Micrografx, Inc. 1992, pp. 5-4-5-5, 6-1-6-2, 6-8, 6-32, 6-37, 6-45-6-49).

*Primary Examiner*—Thomas D Lee
*Assistant Examiner*—Stephen M Brinich
(74) *Attorney, Agent, or Firm*—Sughrue Mion, PLLC

(57) ABSTRACT

Provided is photo retouching software which is easy for photo studio personnel to use. Upon opening photo image(s), special photo retoucher 11 converts photo image data thereof to working color space image data. At such time(s), if working ICC profile(s) is/are set which is/are different from ICC profile(s) previously embedded in such photo image file(s), color perceptual matching is carried out on the photo image data thereof based on such embedded ICC profile(s) and working ICC profile(s) when such photo image file(s) is/are opened. Furthermore, when such photo image(s) is/are displayed at monitor(s), such image data is converted to monitor color space image data through color matching using working ICC profile(s) and monitor ICC profile(s).

12 Claims, 33 Drawing Sheets

FOREIGN PATENT DOCUMENTS

| | | |
|---|---|---|
| JP | 9-030057 | 2/1997 |
| JP | 09231353 A | 9/1997 |
| JP | 9-330192 | 12/1997 |
| JP | 10-028196 | 1/1998 |
| JP | 10-187364 | 7/1998 |
| JP | 10224643 A | 8/1998 |
| JP | 10-329392 | 12/1998 |
| JP | 11069096 A | 3/1999 |
| JP | 11-099729 | 4/1999 |
| JP | 11-119600 | 4/1999 |
| JP | 11298725 A | 10/1999 |
| JP | 11-314439 | 11/1999 |
| JP | 2000-059638 A | 2/2000 |
| JP | 2000-101771 | 4/2000 |
| JP | 2000-122833 | 4/2000 |
| JP | 2000-181655 | 6/2000 |
| JP | 2000-184145 A | 6/2000 |
| JP | 2000-194239 | 7/2000 |
| JP | 2000-267201 | 9/2000 |
| JP | 2000-276484 A | 10/2000 |
| JP | 2000-284920 | 10/2000 |
| JP | 2000-284938 | 10/2000 |
| JP | 2000-305934 A | 11/2000 |
| JP | 2001-014445 A | 1/2001 |
| JP | 2001-056867 | 2/2001 |
| JP | 2001-157069 A | 6/2001 |
| JP | 2001-169098 A | 6/2001 |
| JP | 2001-218025 A | 8/2001 |
| JP | 2002-117101 A | 4/2002 |
| JP | 2002-237959 | 8/2002 |
| WO | WO 03-012622 A1 | 2/2003 |

* cited by examiner

FIG. 15

| | Custom Trim Settings | | |
|---|---|---|---|
| | Name | W : | H |
| 1. | Custom1 fghfghfgh | 1.2 : | 2.2 |
| 2. | Custom 2 | 2 : | 2.5 |
| 3. | Custom 3 | 2 : | 2.4 |
| 4. | Custom 4 | 2 : | 2.6 |
| 5. | Custom 5 | 2 : | 2.8 |
| 6. | Custom 6 | 2 : | 2.9 |
| 7. | Custom 7 | 2 : | 3 |
| 8. | Custom 8 | 3 : | 4 |
| 9. | Custom 9 | 2 : | 2.1 |
| 10. | Custom 10 | 2 : | 2.2 |

1021

Default    Cancel    O K

Image display area when in EASY submode of COLOR/TONE mode

Image display area when in EASY submode of COLOR/TONE mode

Control area when in EASY submode of COLOR/TONE mode

Image display area when in MANUAL submode of COLOR/TONE mode

IMAGE RETOUCHING PROGRAM

This is a divisional of application Ser. No. 10/229,275 filed Aug. 28, 2002 now U.S. Pat. No. 7,256,911. The entire disclosure of the prior application, application Ser. No. 10/229,275 is considered part of the disclosure of the accompanying divisional application and is hereby incorporated by reference.

FIELD OF ART

The present invention pertains to art for retouching of images.

BACKGROUND ART

As a result of improvements in digital camera and electronic printer performance, not only amateurs but also photographic industry professionals have begun using digital cameras and electronic printers. Amateurs as well as professionals typically make use of a simple system wherein an electronic printer is connected by way of a dedicated interface cable, LAN, or the like to a personal computer on which a photo retouching program is installed. Use of a sophisticated photo retouching program makes it possible to carry out a diverse variety of retouching and/or color correction operations on photographic images taken with a digital camera, and/or freely vary the size and/or resolution of such images. Inkjet printers are favorably used as such electronic printers, as they permit printed output of high-quality full-color photographs that are as good as silver halide photographs.

The typical system described above performs extremely well in terms of its ability to permit each individual photograph to be finished as necessary to achieve a quality print which can then be output. However, at photo studios or other such sites dealing with commercial or professional photographic prints, a variety of other capabilities are required in addition to capabilities related to high-quality print generation.

First and foremost, professionals demand the ability to produce printed output having color that is consistent with what they were expecting. One factor which interferes with this ability is the fact that the characteristics affecting color in digital cameras, computer display monitors, printers, and other such image processing devices differ from device to device. For this reason, the color of the original image taken with the camera, the color of the image on the monitor screen, and the color of the image which is printed out will all be different. Despite this, conventional systems do not possess the capability to automatically adjust color to compensate for differences in color characteristics among devices. Unless the user has a good understanding of the color characteristics of each device and manually adjusts color himself or herself in, for example, photo retouching software or the like, the user will be unable to produce printed output having color that is consistent with what the user was expecting.

Second, the ability to efficiently process studio business is demanded. For example, as the operation which takes the most time at a photo studio is the retouching of photographs, there is a demand for reduction in the amount of time that must be set aside for same. Conventional photo retouching software is provided with an extremely diverse variety of retouching functionalities so as to also appeal to graphical designers and the like. However, as the retouching carried out most frequently by photo studios is more or less limited to a few particular categories, it is instead more important that they be able to carry those particular categories of retouching quickly and in routine fashion. Furthermore, as there are any number of standard sizes which may be used for printed output of commercial photographs, prior to printing it is necessary to carry out print layout operations wherein photograph size is made to conform to such a standard size and/or multiple numbers of photographs of standard size are arranged on a sheet of media. However, such print layout operations also represent an inconvenience in conventional systems. There is therefore a demand that such print layout operations be made capable of being carried out easily and in routine fashion.

DISCLOSURE OF INVENTION

The present invention was conceived primarily to address the second of the foregoing problems, it being an object thereof to provide photo retouching software that is easy for photo studio personnel to use.

An image retouching program (photo retouching software) in accordance with a first aspect of the present invention is capable of causing a computer or computers to carry out step or steps wherein a screen or screens in which a plurality of retouching mode selection buttons respectively correspond to a plurality of retouching modes associated with a retouching operation or operations is or are displayed, the retouching mode selection buttons being arrayed in order pursuant to sequence within the retouching operation or operations; and step or steps wherein at a time or times when a retouching mode selection button or buttons is or are selected by a user or users from the displayed screen or screens, a retouching operation or operations associated with a retouching mode or modes corresponding to the selected retouching mode selection button or buttons is or are made available for being carried out by the user or users.

An image retouching program in accordance with a second aspect of the present invention is capable of causing a computer or computers to carry out step or steps wherein an image or images represented by image data present in a storage area or areas specified by a user or users is or are displayed in thumbnail fashion; step or steps wherein a priority (or importance) setting or settings for an image or images displayed in thumbnail fashion is or are accepted from the user or users; and step or steps wherein at least either (1) or (2) is performed, (1) being display on or near an image or images of a priority or priorities set by the user or users for that image or those images, and (2) being arrayal of an image or images displayed in thumbnail fashion in correspondence to a priority or priorities set by the user or users.

An image retouching program in accordance with a third aspect of the present invention is capable of causing a computer or computers to carry out step or steps wherein an image or images represented by image data present in a storage area or areas specified by a user or users is or are displayed in thumbnail fashion; and step or steps wherein one or more images selected by the user or users from among image or images displayed in thumbnail fashion is or are rotated in response to a request or requests from the user or users while being displayed in thumbnail fashion.

An image retouching program in accordance with a fourth aspect of the present invention is capable of causing a computer or computers to carry out step or steps wherein an image or images represented by image data present in a storage area or areas specified by a user or users is or are displayed in thumbnail fashion in a particular display region or regions; and step or steps wherein a plurality of images selected by the user or users from among image or images displayed in thumbnail fashion are displayed in arrayed fashion in a display region or regions different from the particular display region or regions.

In a preferred embodiment of an image retouching program according to any of the second through fourth aspects of the present invention, an image retouching program is capable of causing a computer or computers to carry out step or steps wherein an image or images displayed in thumbnail fashion is or are stored in the form of thumbnail image data different from original image data for that image or those images; and step or steps wherein at a time or times when an image or images for image data previously displayed in thumbnail fashion is or are to be displayed in thumbnail fashion again, the stored thumbnail image data is read and an image or images is or are displayed in thumbnail fashion without resorting to use of the image data itself.

An image retouching program in accordance with a fifth aspect of the present invention is capable of causing a computer or computers to carry out step or steps wherein a particular image or images is or are displayed and a retouching operation or operations is or are carried out on the image or images; and step or steps wherein one or more other images capable of being selected as subject or subjects of retouching operation or operations is or are further displayed in thumbnail fashion in response to a request or requests from a user or users while subject or subjects of retouching operation or operations is or are displayed.

An image retouching program in accordance with a sixth aspect of the present invention, being a computer program for image retouching having cropping functionality such that a region or regions outside a rectangular cropping locus or loci specified by a user or users on a particular displayed image or images is or are cropped away so as to extract only a region or regions inside the rectangular cropping locus or loci, is capable of causing a computer or computers to carry out step or steps wherein specification of an aspect ratio or ratios for the rectangular cropping locus or loci is accepted from the user or users; and step or steps wherein an aspect ratio or ratios of a rectangular cropping locus or loci is or are controlled such that an aspect ratio or ratios specified by the user or users is or are maintained regardless of how big the user or users specifies or specify the rectangular cropping locus or loci to be.

An image retouching program in accordance with a seventh aspect of the present invention, being a computer program for image retouching having cropping functionality such that a region or regions outside a cropping locus or loci specified by a user or users on an image or images displayed on a particular display screen or screens is or are cropped away so as to extract only a region or regions inside the cropping locus or loci, is capable of causing a computer or computers to carry out step or steps wherein inclination of only the image or images is adjusted, the specified cropping locus or loci being left unmoved on the display screen or screens, in response to a request or requests from the user or users.

An image retouching program in accordance with an eighth aspect of the present invention, being a computer program for image retouching having cropping functionality such that a region or regions outside a cropping locus or loci specified by a user or users on a particular displayed image or images is or are cropped away so as to extract only a region or regions inside the cropping locus or loci, is capable of causing a computer or computers to carry out step or steps wherein a positional fiduciary or fiduciaries for assisting in positioning of the cropping locus or loci is or are displayed (e.g., grid line or lines might be displayed within cropping locus or loci, ruler or rulers (scale or scales) might be displayed on or near side or sides of cropping locus or loci, center mark or marks indicating center or centers of region or regions delineated by cropping locus or loci might be displayed within cropping locus or loci, and so forth).

An image retouching program in accordance with a ninth aspect of the present invention is capable of causing a computer or computers to carry out step or steps wherein a cursor or cursors indicating a region or regions affected by a brush or brushes for retouching processing is or are displayed on an image or images subject to retouching processing.

An image retouching program in accordance with a tenth aspect of the present invention, being a computer program for image retouching having a color/tone adjustment functionality or functionalities respectively corresponding to a plurality of color/tone adjustment modes, is capable of causing a computer or computers to carry out step or steps wherein, at a time or times when switching between or among color/tone adjustment modes in response to a request or requests from a user or users, a parameter value or values set for an image or images subject to color/tone adjustment at or before switching is or are applied to an image or images subject to color/tone adjustment while in a post-switching color/tone adjustment mode or modes.

An image retouching program in accordance with an eleventh aspect of the present invention, being a computer program for image retouching having a color/tone adjustment functionality or functionalities, is capable of causing a computer or computers to carry out step or steps wherein specification of a color locus or loci subject to color adjustment is accepted from a user or users; and step or steps wherein color adjustment is carried out only on a pixel or pixels having color or colors within the color locus or loci specified by the user or users.

A preferred embodiment of this image retouching program is capable of causing a computer or computers to carry out step or steps wherein, responsive to a request or requests from the user or users, another color locus or other color loci is or are specified for region or regions at the perimeter or perimeters of color locus or loci subject to color adjustment; and step or steps wherein color adjustment is carried out on a pixel or pixels having color or colors within the other color locus or loci specified by the user or users so as to cause color adjustment effect to decrease in continuous fashion as one goes from the color locus or loci subject to color adjustment to the color locus or loci not subject to color adjustment.

An image retouching program in accordance with a twelfth aspect of the present invention, being a computer program for image retouching having a color/tone adjustment functionality or functionalities, is capable of causing a computer or computers to carry out step or steps wherein selection by a user or users of a desired parameter or parameters from among a plurality of parameters for a color adjustment filter or filters is accepted; step or steps wherein a plurality of post-application images are created which respectively represent results of application in trial fashion, to an image or images subject to color/tone adjustment, of color adjustment filter or filters for which the parameter or parameters selected by the user or users is or are varied in increment or increments and/or decrement or decrements of a particular value or values relative to a particular parameter value or values; and step or steps wherein the plurality of created post-application images are displayed in arrayed fashion in correspondence to respective parameter value or values for respective color adjustment filter or filters respectively applied in creating that plurality of post-application images, the post-application image or images created by application of color adjustment filter or filters having the particular parameter value or values occupying a central location or locations therein.

A preferred embodiment of this image retouching program is capable of causing a computer or computers to carry out step or steps wherein selection by the user or users of a desired post-application image or images from among the plurality of post-application images displayed in arrayed fashion is accepted; and step or steps wherein the plurality of post-application images are rearrayed so as to cause the selected post-application image or images to move to the center thereof. Another preferred embodiment of this image retouching program is capable of causing a computer or computers to carry out step or steps wherein selection by the user or users of a parameters or parameters other than the aforesaid selected parameters or parameters is accepted; and step or steps wherein, for a post-application image or images selected by the user or users, the creating step and the display step are executed such that a color adjustment filter or filters for which the other parameter or parameters selected by the user or users is or are a particular parameter value or values is or are applied in creating a post-application image or images in the central location or locations or a post-application image or images selected by the user or users.

An image retouching program in accordance with a thirteenth aspect of the present invention, being a computer program for image retouching having a color/tone adjustment functionality or functionalities, is an image retouching program capable of causing a computer or computers to carry out step or steps wherein selection by a user or users of a first parameter or parameters and a second parameter or parameters from among a plurality of parameters for a color adjustment filter or filters is accepted; step or steps wherein a plurality of first post-application images are created which respectively represent results of application in trial fashion, to an image or images subject to color/tone adjustment, of color adjustment filter or filters for which the first parameter or parameters selected by the user or users is or are varied in increment or increments and/or decrement or decrements of a particular value or values relative to a first particular parameter value or values; step or steps wherein color adjustment filter or filters for which the second parameter or parameters selected by the user or users is or are varied in increment or increments and/or decrement or decrements of a particular value or values relative to a second particular parameter value or values is or are respectively applied in trial fashion to the plurality of created first post-application images to create a plurality of second post-application images; and step or steps wherein the plurality of created second post-application images are displayed in arrayed fashion in correspondence to respective first and second parameter values for respective color adjustment filter or filters respectively applied in creating that plurality of second post-application images, the post-application image or images created by application of color adjustment filter or filters having the first particular parameter value or values and color adjustment filter or filters having the second particular parameter value or values occupying a central location or locations therein.

A preferred embodiment of an image retouching program in accordance with the twelfth or thirteenth aspect of the present invention is capable of causing a computer or computers to carry out step or steps wherein specification by the user or users of a magnitude or magnitudes for the increment or increments and/or decrement or decrements of a particular value or values is accepted. Another preferred embodiment is capable of causing a computer or computers to carry out step or steps wherein, responsive to a request or requests from the user or users, one or more images from among the plurality of post-application images and/or the plurality of second post-application images displayed in arrayed fashion is or are displayed in enlarged and/or reduced fashion.

An image retouching program in accordance with a fourteenth aspect of the present invention is capable of causing a computer or computers to carry out step or steps wherein another image retouching program or other image retouching programs is or are launched in response to a request or requests from a user or users while a retouching operation or operations is or are underway; step or steps wherein image data which is a subject of the retouching operation or operations is passed to the other image retouching program or programs and the retouching operation or operations is or are temporarily halted; and step or steps wherein, upon termination of the other image retouching program or programs, image data which is a subject of the retouching operation or operations is received from the other image retouching program or programs and the retouching operation or operations is or are resumed.

An image retouching program in accordance with a fifteenth aspect of the present invention is capable of causing a computer or computers to carry out step or steps wherein an image or images subject to retouching is or are stored by one of storage methods (1) and (2), (1) being a method wherein an image or images resulting from application to a pre-retouching original image or images of retouching processing executed at or before a time or times of a storage request or requests is or are stored, and (2) being a method, wherein data associated with retouching processing executed at or before a time or times of a storage request or requests is stored together with the pre-retouching original image or images, without any change having been made to the original image or images.

A preferred embodiment of an image retouching program in accordance with at least any of the first through fifteenth aspects of the present invention is capable of causing a computer or computers to carry out step or steps wherein a desired retouching operation or operations is or are performed on an image or images subject to retouching; step or steps wherein a working color profiles or profiles indicating a working color space or spaces for the retouching operation or operations is or are automatically set for an image or images subject to retouching; and step or steps wherein, at a time or times when the retouching operation or operations is or are completed, a retouched image or images subject to retouching is or are output in linked fashion with the working color profiles or profiles.

The foregoing image retouching program or programs may be installed or loaded on a computer or computers by way of any of various media such as disk-type storage, semiconductor memory, communication network or networks, and so forth.

BRIEF DESCRIPTION OF DRAWINGS

FIG. 15 is a drawing showing CUSTOM TRIM SETTINGS dialog box 1021 as displayed when in TRIM mode.

BEST MODE FOR CARRYING OUT INVENTION

Before beginning description of embodiments, "color profiles" and "color matching," repeated reference to which is made throughout such description, will be described.

Each of the various image processing devices (e.g., cameras, image scanners, display monitors, printers, etc.) has its own unique color space(s) in which operations are carried out and its own unique gamut(s) (gamut), i.e., locus or loci of colors that can be created. For example, while display monitors all operate within RGB color space, gamut will vary from monitor to monitor. Likewise, gamuts of printers, which carry out operations in CMYK color space, will be different for different printers. Furthermore, even the same printer will exhibit different gamuts depending upon the type of ink and printing medium (printing paper) used therewith.

Figure 1:
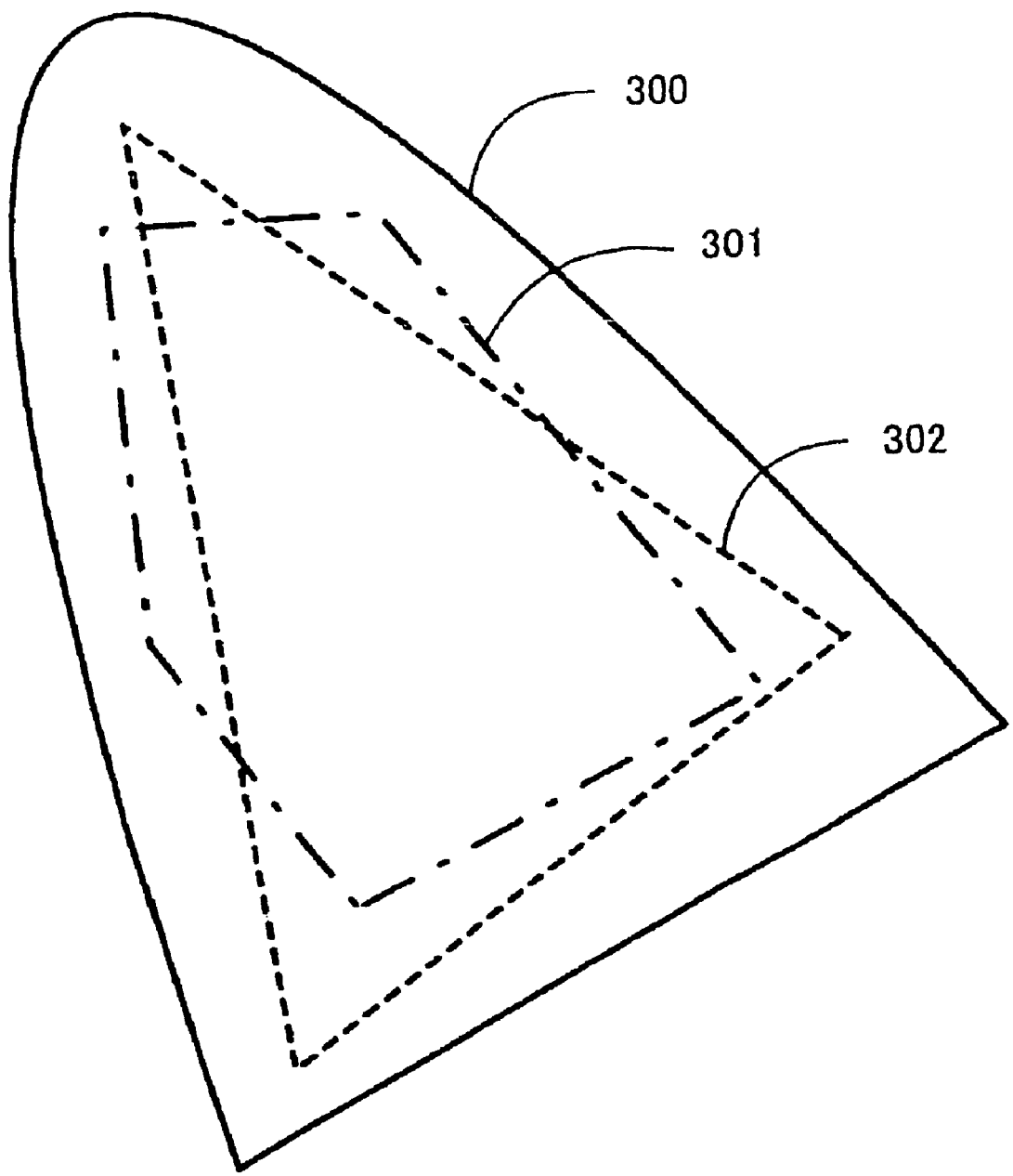
FIG. 1 is drawing showing a schematic example of printer and monitor gamuts.

FIG. 1 is drawing showing a schematic example of gamuts of different devices. At FIG. 1, reference numeral 300 indicates gamut visibly perceivable by human beings, reference numeral 301 indicates gamut capable of being printed out by a particular printer, and reference numeral 302 indicates gamut capable of being displayed by a particular display monitor. As shown in FIG. 1, gamut varies depending on device.

An output device such as a monitor or printer is only capable of expressing colors within the range of its gamut. An input device such as a camera or image scanner is only capable of storing colors within the range of its gamut. The fact that gamut varies from device to device in this fashion means that the color space within which the device operates will vary from device to device. For example, while every printer operates within the same type of color space, i.e., CMYK, gamut will be different for each individual printer and for each ink and printing medium used therewith. There therefore exist different CMYK color spaces for each individual printer and for each ink and printing medium used therewith.

"Color profiles" refer to numerical representations used to provide rigorous definition of the color spaces within which various devices operate. A color profile includes indication of the type(s) of color space peculiar to that device (e.g., RGB, CMYK, LCH, etc.). But the primary information included as part of a color profile is conversion table(s) for conversion of color space(s) peculiar to that device (e.g., RGB, CMYK, LCH, and/or other such color spaces) to device-independent color space(s) (e.g., XYZ, Yxy, Lab, Luv, and/or other such color spaces), and/or for carrying out conversion in the reverse direction. Such conversion tables make it possible for characteristic gamuts of devices to be quantitatively defined.

The International Color Profile format (International Color Profile format) established by the ICC (International Color Consortium) is a known standard for color profile format. In the description that follows, "ICC profile" refers to a color profile written in this International Color Profile format.

"Color matching," also called "color mapping," refers to the adjustment (shift) which must be made to color values in image data subject to conversion when converting image data in one particular color space to image data in a different color space so as to cause colors in the two color spaces to approximate one another. It is impossible to cause colors to match perfectly when going between two different color spaces if the gamuts thereof are different. But if, when converting image data of one color space to image data of a different color space, great care is exercised in shifting color values of such image data so as to compensate for the difference in gamuts between the two color spaces, it is possible to satisfactorily approximate colors in going from one of the two devices to the other. Processing for shifting color values in this way is called color matching (or color mapping).

Color matching may be carried out through use of color profiles, e.g., ICC profiles, respectively representing source (conversion input) color space(s) and target (conversion output) color space(s). For example, when converting RGB image data output from a digital camera to CMYK image data to be printed by a printer, color matching may be carried out through use of a color profile for the RGB color space of the digital camera as source, and a color profile for the CMYK color space of the printer as target. This will allow a printout to be obtained which has color(s) satisfactorily approximating color(s) as present in pictures taken with the digital camera. Alternatively, when converting RGB image data displayed on a monitor to CMYK image data to be printed by a printer, color matching may be carried out through use of a color profile for the RGB color space of the monitor as source, and a color profile for the CMYK color space of the printer as target. This will allow a printout to be obtained which has color(s) satisfactorily approximating color(s) as displayed on the monitor.

Color matching may be broadly categorized as falling into one of two categories depending upon the method used to handle colors present in the gamut of the source which lie outside of the bounds of the target gamut. In the first method, source colors lying outside of the target gamut are essentially discarded. In the second method, source colors lying outside of the target gamut are shifted so as to make them fall within the target gamut through use of interpolation processing or the like. These two methods each have advantages and disadvantages. Especially with conversion of photographic images, there is less tendency that a person looking at the post-conversion photographic image will be struck by a sense of unnaturalness if the latter color matching method is used. This latter color matching method is referred to as "perceptual (perceptual) color matching."

Figure 2:
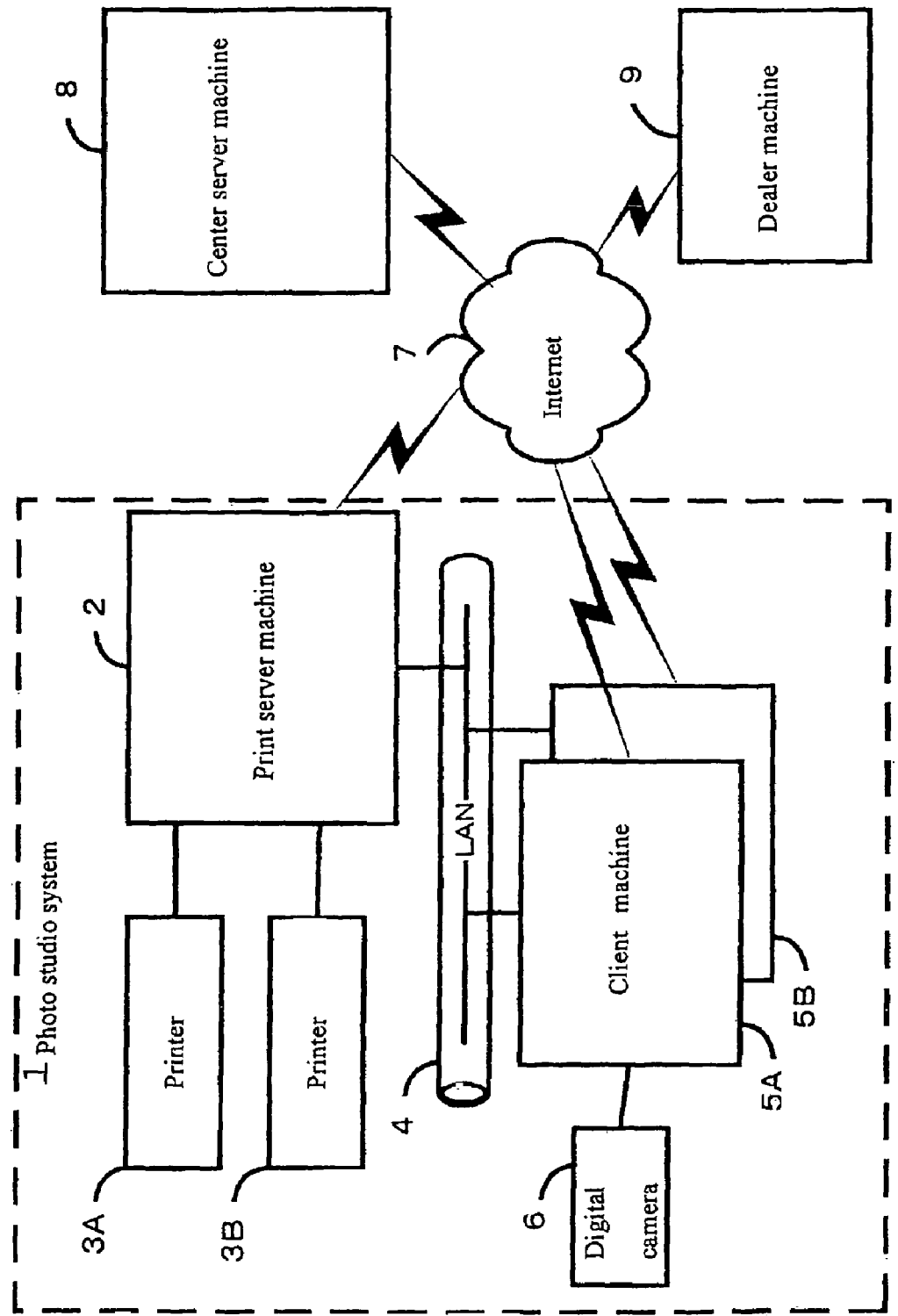
FIG. 2 is a block diagram showing the overall constitution of an embodiment of the present invention.

An embodiment of the present invention is described below. FIG. 2 shows the overall constitution of this embodiment.

At FIG. 2, each of a number of photo studios is equipped with photo studio system(s) 1. Present at photo studio(s) there is or are LAN(s) 4, such LAN(s) 4 connecting print server machine(s) 2 and one or a plurality of (e.g., two) computer machines (hereinafter "client machines") 5A, 5B. Client machines 5A, 5B may connect, e.g., via USB, to digital camera(s) 6. Furthermore, one or a plurality of (here, two) electronic printers 3A, 3B is or are respectively connected, e.g., via USB, to print server machine(s) 2. Each printer 3A, 3B is an inkjet printer employing for example pigment-type inks, these being capable of producing high-quality printed output that is extremely lightfast. Print server machine(s) 2 and the two printers 3A, 3B may be housed within a single dedicated box-like casing (not shown), permitting installation at a single location somewhere at the photo studio.

Client machines 5A, 5B are primarily used to read one or a plurality of photo images from digital camera(s) 6 and store same in disk storage and for editing one or more desired photo images and generating therefrom data representing print job(s) of desired number(s) of pages and other such operations. Included among the editing of photo images carried out here are photo retouching operations wherein desired enhancements such as trimming, local modifications, global color adjustment, and/or the like are carried out on individual photo images, print layout editing wherein one or more desired photo images is or are arranged so as to occupy the space on a sheet of media (printed page), and so forth. Print server machine(s) 2, on the other hand, possesses or possess the ability to accept print job data from client machines 5A, 5B and to create respective page(s) of printed image(s) based thereon and send same to printers 3A, 3B. Furthermore, print server machine(s) 2 possesses or possess the ability to manage status, print job execution status and execution history, and other such information (hereinafter "print information") pertaining to printers 3A, 3B, and to communicate same to client machines 5A, 5B.

Moreover, existing separate from the photo studio(s) there is or are center server machine(s) 8, whose role it is to centrally manage operational status of photo studio systems 1 at a multiplicity of photo studios. Print server machines 2 and client machines 5A, 5B at respective photo studio systems 1 may respectively communicate with center server machine(s) 8 via the Internet 7. Center server machine(s) 8 gather print information for respective photo studios from print server machines 2 of the photo studio systems 1 thereof, this being stored in database(s) of center server machine(s) 8, where it is managed. Upon being logged onto by way of WWW browser(s) by user(s) at respective photo studios, center server machine(s) 8 may provide such a WWW browser with print information for that photo studio as stored in database(s) of center server machine(s) 8. Furthermore, when information indicating occurrence of prescribed event(s) previously specified by user(s) at respective photo studios (e.g., a printer paper jam or other such error) is received from such a photo studio, center server machine(s) 8 may transmit such fact by electronic mail to email address(es) previously specified by such a user (e.g. an email address for a mobile phone belonging to such a user). In addition, center server machine(s) 8 may, based on print information from respective photo studios, calculate consumed quantity or quantities of print media, ink, and/or other such consumables at such a photo studio and may make arrangements for supply of consumables to respective photo studios, carry out billing for amounts in connection therewith, and so forth.

Furthermore, in one mode of photo studio business management, intermediate management organization(s) (hereinafter "dealer(s)") might be interposed between center(s) and the several photo studios, each dealer managing business from a plurality of photo studios. In such a case, each dealer would also have computer machine(s) (hereinafter "dealer machine(s)") 9 whereon WWW browser(s) and/or the like is or are installed. Moreover, upon being logged onto by way of WWW browser(s) by respective dealers, center server machine(s) 8 may provide such a WWW browser with print information for photo studio(s) whose account(s) is or are handled by such a dealer. Dealer machine(s) 9 may take the place of center server machine(s) 8 in making arrangements for supply of consumables to respective photo studios, billing for amounts in connection therewith, and so forth based on print information for respective photo studios.

Figure 3:
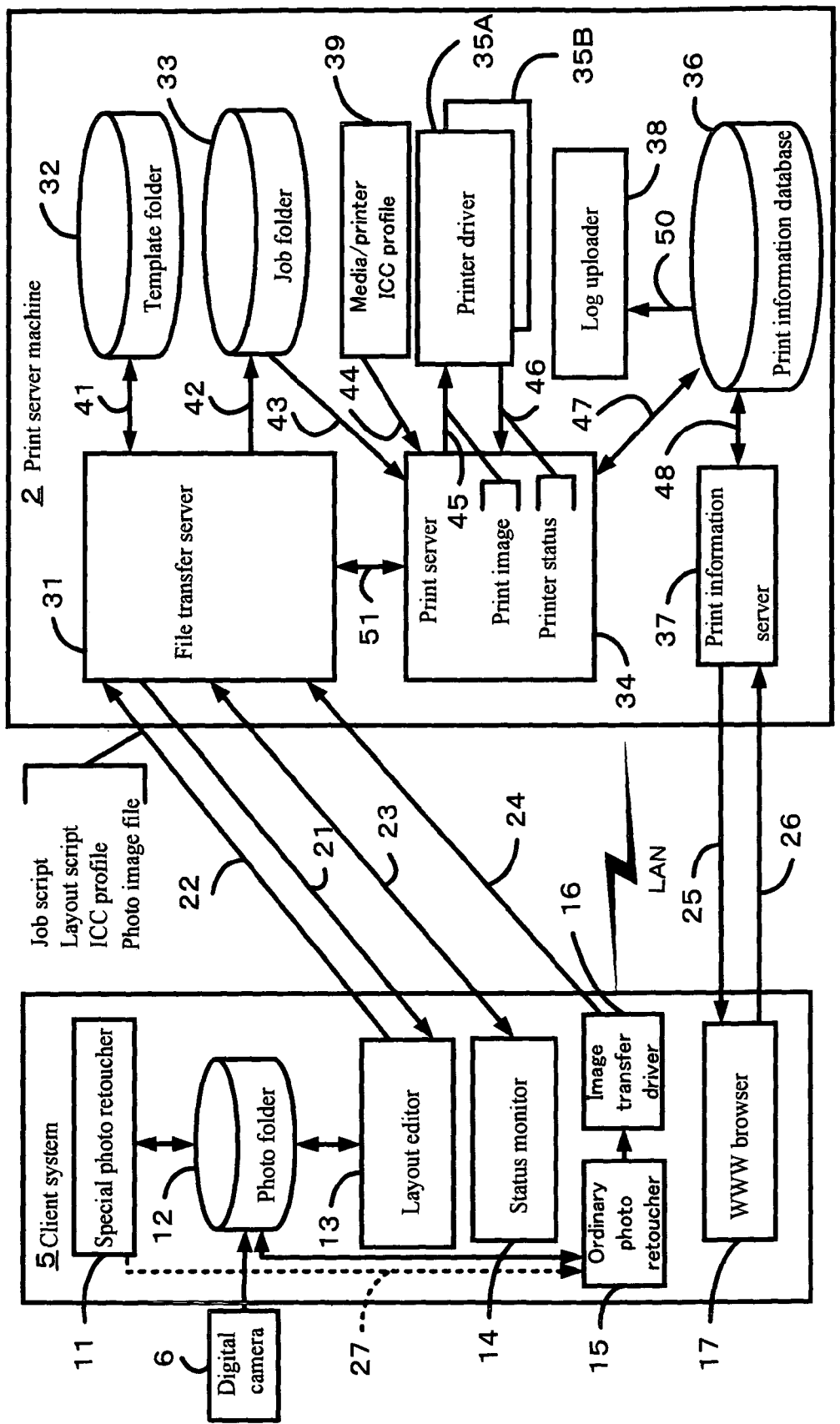
FIG. 3 is a block diagram showing constitution, function, and operation at print server machine 2 and client machines 5A, 5B in photo studio system 1.
Figure 4:
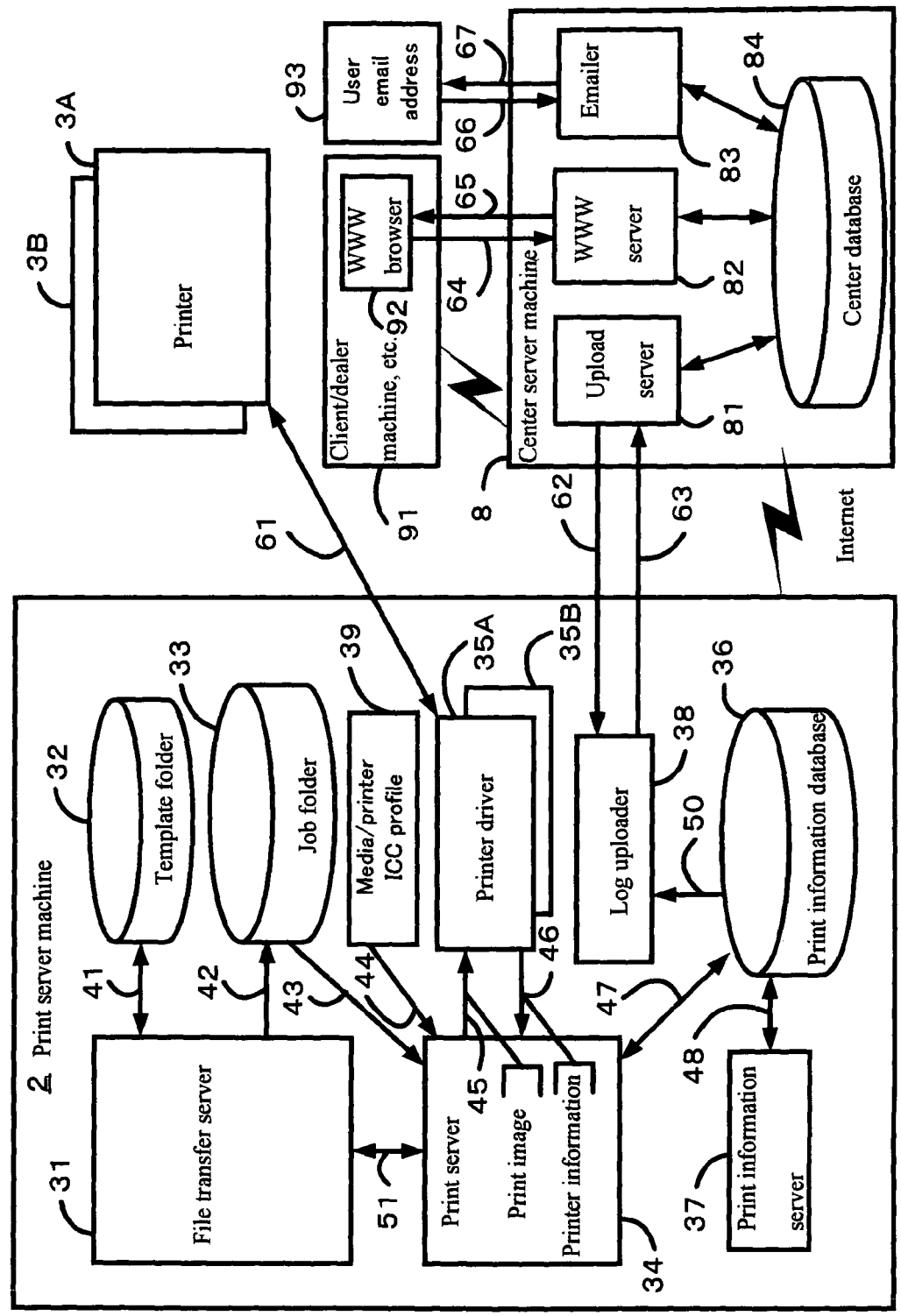
FIG. 4 is a block diagram showing constitution, function, and operation at print server machine 2 and center server machine 8.

Below, constitution and function of the various machines mentioned above will be described in further detail with reference to FIG. 3 and FIG. 4. FIG. 3 shows constitution and function at print server machine 2 and client machines 5A, 5B in photo studio system 1. FIG. 4 shows constitution and function at print server machine 2 and center server machine 8. By looking at FIG. 3 and FIG. 4 together, the relationship among the various machines with respect to exchange of information therebetween will become clear.

Referring first to FIG. 3, constitution and function of client machines 5A, 5B will be described. Note that at FIG. 3, client machines 5A, 5B are indicated collectively by the single block of client system 5. The number of client machines contained at client system 5 need not be two as in the present embodiment, it being possible to employ any number so long as there is one or more thereof. Furthermore, the plurality of application programs 11 through 17 such as will be described below which client system 5 possesses may be installed on all of the client machines comprised by client system 5 or may be installed on any one machine only, or may be installed in distributed fashion such that one program is for example installed on client machine 5A, another program is for example installed on client machine 5B, and so forth.

As shown in FIG. 3, a plurality of application programs, including special photo retoucher 11, layout editor 13, status monitor 14, ordinary photo retoucher 15, image transfer driver 16, and WWW (World Wide Web) browser 17, are installed at client system 5. Moreover, a program for sending and receiving electronic mail (not shown) may also be installed at client system 5.

Special photo retoucher 11, being a specially designed photo retouching program for photo studio use, is constituted so as to permit prescribed retouching tasks typically required at photo studios to be carried out efficiently and in routine fashion.

When beginning retouching operations on respective photo image(s), this special photo retoucher 11 automatically (always, unless otherwise requested by the user) causes ICC color profile(s) to be set which indicates or indicate color space(s) in which those retouching operations are to be carried out. The user may specify the type of color space(s) for which ICC color profile(s) is or are to be set. But where there is no specific specification from user(s), special photo retoucher 11 will always cause ICC color profile(s) to be set in accordance with default settings. Furthermore, when outputting photo image(s) after retouching thereof is finished, special photo retoucher 11 embeds such ICC profile(s) in file(s) containing such photo image(s).

Note that color space(s) in which photo image editing operations are carried out prior to printing, such as color space(s) in which this special photo retoucher 11 carries out retouching operations or color space(s) in which layout editor 13, described next, carries out print layout editing operations, will hereinafter be referred to as "working color space(s)" for such photo images. Note also that ICC profile(s) indicating such working color space(s) will hereinafter be referred to as "working ICC profile(s)."

Layout editor 13, being an application program for print layout editing intended for photo studios, is designed to permit print layout editing operations, wherein one or more photo images is or are arranged so as to occupy printed page(s) (the space(s) on sheet(s) of print media) with size(s) of respective photo image(s) being made to conform to desired standard size(s), to be carried out quickly and in routine fashion. That is, as indicated by arrow 21, layout editor 13 reads from print server machine 2 a multiplicity of templates respectively representing various basic print layouts previously prepared and made available at print server machine 2, and displays template(s) desired by user(s) at monitor(s) of client system 5. The basic print layouts represented by the respective templates are space(s) (print page(s)) of standard print media size(s) capable of being used by printer(s), e.g., A4, A3, or B4, etc., in landscape (horizontal) or portrait (vertical) orientation, wherein one or a plurality of photo frame(s) of standard photo size(s), e.g., 8×10 inch, 5×7 inch, 2.5×3.5 inch, or 1.75×2.5 inch, is or are arranged. Many templates are such that photo frame(s) is or are efficiently arranged so as to make sufficiently small the total area outside of photo frame(s) in order to make economic use of print media. By using graphical user interface(s) of layout editor 13 to drag and drop desired photo image(s) onto desired respective photo frame(s) within template(s), user(s) can cause print page layout editing to be carried out automatically.

When beginning print layout editing operations on respective photo image(s), layout editor 13 also causes working ICC profile(s) for working color space(s) in which such operations are to be carried out to be set for such photo image(s). If particular ICC profile(s) has or have previously been embedded in such photo image(s), layout editor 13 uses such embedded ICC profile(s) as working ICC profile(s). Because image(s) which has or have, for example, been subjected to retouching by special photo retoucher 11 will already have embedded therein ICC profile(s) for color space(s) in which special photo retoucher 11 operated, this means that layout editor 13 will operate in exactly the same color space(s) as the color space(s) in which special photo retoucher 11 operated. If, on the other hand, such photo image(s) does or do not yet have ICC profile(s) embedded therein, layout editor 13 automatically guesses at ICC profile(s) which it assumes to have been previously embedded in such photo image(s), using such assumed ICC profile(s) as working ICC profile(s). User(s) may specify exactly what ICC profile(s) is or are to be assumed in such a case. But where there is no specific specification from user(s), layout editor 13 will automatically use specific ICC profile(s) which has or have been set by default as the ICC profile(s) which it assumes and uses as if previously embedded in such photo image(s). Furthermore, when outputting photo image(s) after print layout editing is finished, layout editor 13 embeds working ICC profile(s) automatically set as described above in file(s) containing such photo image(s).

Upon completion of editing of the layout of all print pages constituting a single print job, layout editor 13 creates data for that print job, which is transferred to print server machine 2 as indicated by arrow 22. Such print job data includes data indicating layout of all print page(s) contained within that print job, file(s) containing all photo image(s) to be placed on such print page(s), and working ICC profile(s) embedded in such photo image file(s).

Layout editor 13 is made available as an independent program separate from retouching program(s) such as the special photo retoucher 11, described above, or the ordinary photo retoucher 15, described below. Moreover, client machines 5A, 5B, whereon such programs are installed, are connected by way of LAN 4 so as to permit mutual sharing of data, programs, and other such resources. This makes it possible for studio business to proceed efficiently and in such manner as to permit one user at a studio to for example use one client machine 5A to carry out photo retouching operations with retouching program 11 or 15 on photo image(s) acquired from digital camera(s) 6, while in parallel fashion with respect thereto another user might use the other client machine 5B to carry out print layout editing operations with layout editor 13 on photo image(s) which has or have already been retouched. Furthermore, if there are three or more client machines, this will allow studio business to proceed in all the more flexible and efficient fashion.

As indicated by arrow 23, status monitor 14 obtains the most recent history information pertaining to errors generated by printers 3A, 3B and completion of execution (completion of printing) of respective print jobs from print server machine 2 at time intervals (e.g., every 10 minutes, etc.) previously set by user(s), displaying same on display monitor(s) of client system 5.

Ordinary photo retoucher 15, being a conventionally known ordinary photo retouching program, is provided not only with retouching functionalities typically required at photo studios but also with a diverse variety of retouching functionalities capable of satisfying graphical designers and the like. With respect to tasks within the bounds of retouching typically performed at photo studios, special photo retoucher 11, described above, is designed to allow operations to proceed more efficiently than would be the case with ordinary photo retoucher 15. But in the event of a desire to perform atypical retouching not supported by special photo retoucher 11, user(s) may use ordinary photo retoucher 15 instead of special photo retoucher 11.

Special photo retoucher 11, described above, is designed to permit retouching operations to be performed in cooperation with ordinary photo retoucher 15. That is, special photo retoucher 11 has button(s) on its graphical user interface for launching ordinary photo retoucher 15. Moreover, if such button(s) is or are pressed by user(s) while retouching operations are underway on particular photo image(s), special photo retoucher 11 automatically assigns specific file name(s) to and saves the photo image(s) on which operations were underway, storing such file name(s), and furthermore, as indicated by arrow 27, launches ordinary photo retoucher 15 and informs ordinary photo retoucher 15 of such file name(s), causing such photo image(s) to be opened therein. In addition, special photo retoucher 11 itself become inactive. Upon termination of ordinary photo retoucher 15 thereafter, special photo retoucher 11 automatically becomes active again, reopening the photo image file(s) having the file name(s) which was or were stored. As a result, if the photo image(s) passed from special photo retoucher 11 to ordinary photo retoucher 15 as described above is or are stored with the same file name(s) prior to termination of ordinary photo retoucher 15, this means that special photo retoucher 11 will automatically reopen that or those photo image file(s), permitting resumption of continued retouching operations thereon. Combination of special photo retoucher 11 and ordinary photo retoucher 15 in this way makes it possible for retouching operations to proceed efficiently. Moreover, when photo image(s) is or are passed from special photo retoucher 11 to ordinary photo retoucher 15, because there is no guarantee that working ICC profile(s) of such photo image(s) would be preserved by ordinary photo retoucher 15, special photo retoucher 11 discards such working ICC profile(s). Furthermore, when reopening such photo image file(s), special photo retoucher 11 again causes working ICC profile(s) to be set.

Image transfer driver 16, launched at time(s) of print request(s) from ordinary photo retoucher 15, creates print job data for photo image(s) open in ordinary photo retoucher 15 and transfers same to print server machine 2, as indicated by arrow 24.

WWW browser(s) 17 is or are program(s) for accessing various WWW servers available over the Internet 7 or LAN(s) 4. First among the ways in which WWW browser(s) 17 may be used in connection with photo studio business is for connecting to print information server(s) (such a server representing a type of WWW server) 37 of print server machine 2 and, as indicated by arrows 25 and 26, accessing status, print job execution history, and other such printer information for printers 3A, 3B which is managed by print server machine 2. Second, as indicated by arrow 65 of FIG. 4, is for connecting to WWW server(s) 82 of center server machine(s) 8 and accessing printer information or the like for such photo studio(s) which is managed by center server machine(s) 8.

Next, referring to FIG. 3 and FIG. 4, function and constitution of print server machine 2 will be described.

As shown in FIG. 3 and FIG. 4, programs including file transfer server 31, print server 34, printer drivers 35A, 35B, print information server 37, and log uploader 38, are installed at print server machine 2.

File transfer server 31 possesses a multiplicity of templates for use in print layout editing and carries out processing for providing such templates to layout editor 13 of client system 5, processing for accepting print job data from image transfer driver 16 and/or layout editor 13 of client system 5 and for transferring same to print server 34, processing for sending to status monitor 14 of client system 5 information concerning the situation with respect to occurrence of errors, termination of execution of print jobs, and so forth at printers 3A, 3B which is provided by print server 34, and so forth.

This file transfer server 31 possesses templates for a variety of basic print layouts previously prepared and made available at template library folder 32 within disk storage at print server machine 2. Furthermore, when specific template(s) is or are requested by layout editor 13 of client system 5, file transfer server 31 reads the requested template(s) from template library folder 32 as indicated by arrow 41, and transfers same to layout editor 13 as indicated by arrow 21. Utilization of such templates facilitates print layout editing at layout editor 13. It is possible to make use of the shared templates which are centrally managed by print server machine 2 no matter which client machine 5A, 5B is or are being used to carry out print layout editing.

Furthermore, file transfer server 31 receives print job data from image transfer driver 16 and/or layout editor 13 of client system 5 as indicated by arrow 22 (and/or 24), and stores such print job data in job folder 33 within disk storage at print server machine 2 as indicated by arrow 42. As shown in the drawing, the print job data from layout editor 13, indicated by arrow 22, comprises job script(s) for such print job(s), layout script(s) for one or more pages included within such print job(s), file(s) containing one or a plurality of photo image(s) included within such print job(s), and working ICC profile(s) for such photo image(s). What is here referred to as a job script is or are file(s) containing description of item(s) necessary for management of such print job(s); e.g., user name(s), printing priority, number of copies to be printed, designation of type(s) (material(s)) and size(s) of print media, designation of printer(s), time stamp(s) for such print job(s), and/or the like. What is here referred to as a layout script is or are file(s) containing description of item(s) necessary for determining print layout on such respective print page(s); e.g., template number(s), name(s) of file(s) containing photo image(s) to be placed in respective photo frame(s) on respective template(s), settings for print options (e.g., printing of alignment mark(s), file name(s), etc.), and/or the like. To reduce print job data volume, each photo image file is as a rule sent only once in a single print job data transmission regardless of how many of such photos are to be printed. Working ICC profile(s) embedded in respective photo image file(s), as described above, indicate working color space(s) in which editing operations were carried out on such photo image(s) at client system 5.

Furthermore, upon receipt of request(s) from status monitor 14 of client system 5 for history information, file transfer server 31 communicates same to print server 34 as indicated by arrow 23, and moreover, receives history information pertaining to printer errors and completion of print jobs sent thereto from print server 34 responsive to such request and transfers same to status monitor 14 of client system 5 as indicated by arrow 23.

Print server 34 carries out processing for creating print image data for respective page(s) from print job data, processing for assignment of respective set(s) of print image data to printer(s) 3A and/or 3B and for sending such set(s) of print image data to printer driver(s) 35A and/or 35B for printer(s) to which it or they was or were assigned, processing for managing status and print job execution history of printer(s) 3A and/or 3B as provided by printer driver(s) 35A and/or 35B, and so forth. Printer drivers 35A, 35B—respectively corresponding to printers 3A, 3B—carry out processing for converting print image data received from print server 34 into data of such form as to permit processing thereof by printers 3A, 3B and for sending same to printers 3A, 3B, processing for monitoring status of printers 3A, 3B and communicating same to print server 34, and so forth.

Print server 34 reads print job data for respective print job(s) from job folder 33 as indicated by arrow 43. As previously mentioned, print job data includes job script(s) for such print job(s), layout script(s) for print page(s), photo image file(s), and working ICC profile(s) for photo image(s). Print server 34 uses layout script(s) for respective print page(s) included within such print job data, and uses file(s) containing photo image(s) placed on respective print page(s), to create print image data for respective print page(s) with layout(s) as edited by user(s).

In creating print image data for respective print page(s), print server 34 reads such job script(s) and ascertains the printer(s) and print media (hereinafter "output printer(s)" and "output media") type(s) to be used for printing such print page(s). In addition, as indicated by arrow 44, print server 34 reads, from prescribed folder 39 at print server machine 2, ICC profile(s) (hereinafter "printer ICC profile(s)") indicating color space(s) (hereinafter "printer color space(s)") in which such output printer(s) 3A and/or 3B is or are to carry out printing operations using such output media. Previously saved within such folder 39 are different printer ICC profiles for each type of print media respectively capable of being used with printer 3A and printer 3B. Furthermore, printer ICC profiles for all printers of all photo studios are stored at center server machine 8, print server machine(s) 2 of respective photo studio(s) being capable of downloading printer ICC profile(s) for printer(s) 3A, 3B at such photo studio(s) from center server machine 8 by designating, for center server machine 8, machine number(s) for such printer(s) 3A, 3B (such machine numbers being identification numbers unique to the individual printers).

After reading printer ICC profile(s) corresponding to output printer(s) and output media from folder 39 as described above, print server 34 uses the printer ICC profile(s) which was or were read and working ICC profile(s) for respective photo image(s) on respective print page(s) to carry out perceptual color matching on respective set(s) of photo image data. This permits respective set(s) of photo image data to be adjusted so as to produce color(s) when printed out that is or are as close as possible to the color(s) present during editing thereof. In addition, print server 34 uses such adjusted photo image data to create print image data for respective print page(s). Print server 34 thereafter sends the created print image data for respective print page(s) to printer driver(s) 35A and/or 35B corresponding to output printer(s) as indicated by arrow 45. Printer drivers 35A, 35B respectively convert print image data (e.g., RGB-type bitmapped image data) received from print server 34 into print data of such form as to permit processing thereof by printers 3A, 3B (e.g., carrying out color conversion from RGB to CMYK, halftoning, division into bands, addition of required control information, etc.), and send the created print data to the corresponding printer(s) 3A, 3B as indicated by arrow 61 in FIG. 4.

Furthermore, at appropriate time or times, printer driver(s) 35A, 35B acquires or acquire from corresponding printer(s) 3A, 3B the status (e.g., operational status, error status, consumables status, etc.) of printer(s) 3A, 3B and sends or send acquired printer status to print server 34 as indicated by arrow 46. Print server 34 ascertains status with respect to execution of print job(s) sent to printer driver(s) 35A, 35B based on the printer status received from printer driver(s) 35A, 35B. Furthermore, as indicated by arrow 47, print server 34 writes ascertained status of printer(s) 3A, 3B, print job execution status, and other such information to print information database 36 at print server machine 2. As a result, a history of the status of printers 3A, 3B and a history of executed print jobs come to be stored at print information database 36. Moreover, studio user registration information is also managed at print information database 36.

Furthermore, upon receipt of information request(s) from status monitor 14 of client system 5 via file transfer server 31 as indicated by arrow 51, print server 34 as indicated by arrow 47 reads from print information database 36 that information within the error history and history of completed print jobs for printer(s) 3A, 3B which is most recent and has not yet been communicated to client system 5, and sends same to file transfer server 31 as indicated by arrow 51. As has already been described, this most recent error history and history of print jobs for which execution has been completed are immediately transferred to status monitor 14 of client system 5 and are displayed at display monitor(s) of client system 5.

Print information server 37 is a type of WWW server, and upon being logged onto (arrow 26) by an entity having registered user privileges from WWW browser 17 of client system 5, print information server 37 creates web page(s) respectively displaying content such as studio user registration information, printer status history or histories, and/or print job execution history or histories stored at print information database 36, and provides same to such WWW browser 17 as indicated by arrow 25. Furthermore, print information server 37 also has print job history search capability or capabilities, and may receive search request(s) from user(s) from WWW browser 17, may search print information database 36 for print job history or histories requested by user(s), and may return search results to WWW browser 17. Moreover, print information server 37 also has print job control capability or capabilities, receiving control request(s) (e.g., for deletion, changes in priority, number of copies to be printed, and/or other such particulars of job content, etc.) from user(s) from WWW browser 17 for print job(s) waiting to be printed and altering information for such print job(s) within print information database 36. In addition, print information server 37 also has user registration capability or capabilities, and upon being logged onto from WWW browser 17 by an entity having administrator privileges at such photo studio, may register new user information with print information database 36.

Log uploader 38 reads new print information not yet sent to center server machine 8 from print information database 36 at regular intervals (and/or as needed, as the case may be) in accordance with upload schedule(s) (time(s), time interval(s), etc. at which uploading is to be carried out) previously specified by center server machine 8, and uploads same to center server machine 81 as indicated by arrow 63 in FIG. 4.

Furthermore, log uploader 38 has a WATCHDOG MODE for immediately reporting to user(s) abnormalities at photo studio system(s) 1 occurring when user(s) is or are absent or the like. A user wishing to make use of WATCHDOG MODE registers in advance with log uploader 38 the type(s) of abnormality to be reported (e.g., various categories of printer errors, etc.) and email address(es) (e.g., email address(es) for user mobile phone(s)) as desired by the user. Log uploader 38 communicates such registered email address(es) to center server machine 8. By putting log uploader 38 into watchdog mode at time(s) such as when such user(s) will be away from photo studio(s) or the like, upon occurrence of the specified abnormality or abnormalities log uploader 38 immediately communicates the fact of occurrence of such abnormality or abnormalities to center server machine 8. Upon receipt thereof, center server machine 8 creates email reporting occurrence of such abnormality or abnormalities, which it sends to such registered email address(es). This makes it possible for user(s) to be made quickly aware of abnormalities occurring at studio(s) of user(s) even when such user(s) is or are away from such studio(s).

Next, referring to FIG. 4, constitution and function of center server machine 8 will be described.

As shown in FIG. 4, application programs including upload server 81, WWW server 82, and emailer 83 are installed at center server machine 8.

Upload server 81, as indicated by arrow 62, communicates, to log uploader(s) 38 of respective photo studio(s), upload schedule(s) (time(s), time interval(s), etc. at which uploading is to be carried out) managed by center database 84, each studio having its own upload schedule(s), and moreover, receives the most recent print information for such studio(s) sent thereto from log uploader(s) 38 of respective studio(s) in accordance with such upload schedule(s) and stores same at center database 84 of center server machine 8.

Furthermore, at time or times when communication of occurrence of abnormality or abnormalities is received from log uploader(s) 38 of respective studio(s) while in watchdog mode, described above, upload server 81 immediately passes such communication of occurrence of abnormality or abnormalities to emailer 83 by way of center database 84. Upon receipt thereof, emailer 83 immediately creates email reporting occurrence of such abnormality or abnormalities, which it sends, as indicated by arrow 66, to previously registered email address(es) 93 as desired by user(s). This makes it possible for user(s) to be made quickly aware of abnormalities occurring at studio(s) of user(s) even when such user(s) is or are away from such studio(s).

Upon being logged onto from WWW browser 92 installed at some computer machine(s) 91 (e.g., client machine(s) 5A, 5B, dealer machine(s) 9, or other such computer(s), PDA(s), mobile phone(s), and/or the like) by an entity having user, dealer, system-wide administrator privileges, or the like, WWW server 82 reads from center database 84 print information, user information, and/or the like of a range commensurate with privileges with which such entity logged on thereto, creates web page(s) displaying such information, and sends same to such WWW browser 92 as indicated by arrow 65. What is here referred to as a range commensurate with privileges with which such entity logged on thereto might for example in the case of user privileges mean "extending only to photo studio(s) of such user(s) and only to such user(s)," or might in the case of dealer privileges mean "extending only to photo studio(s) whose account(s) is or are handled by such dealer(s) and only to user(s) included in such account(s)," or might in the case of system-wide administrator privileges mean "extending to all photo studio(s) and to all user(s)."

Furthermore, also managed by center database 84 in addition to print information and user information of respective photo studio(s) is a variety of information including amounts of consumables used at respective studio(s) as calculated by the center and amounts billed by the center, various news-type communications issued by the center, and so forth. Such information is also communicated to respective user(s) and respective dealer(s) by WWW server 82 and/or emailer 83.

Next, referring to FIG. 3 and FIG. 4, and also to FIG. 5 and following FIGS., operation of photo studio system(s) 1 and center server machine 8 will be described in detail.

First, operation of photo studio system 1 will be described more or less following the sequence of operations at a photo studio.

As shown in FIG. 3, file(s) containing (e.g., JPEG format or TIFF format) photo image(s) taken by digital camera(s) 6 is or are acquired by client system 5 via for example USB from digital camera(s) 6, and is or are stored in photo folder(s) 12 designated by user(s) at client system 5.

Special photo retoucher 11 and/or ordinary photo retoucher 15 is or are launched by user(s) in order to carry out photo retouching operations. The description below applies to the case where special photo retoucher 11 is launched.

Figure 5:
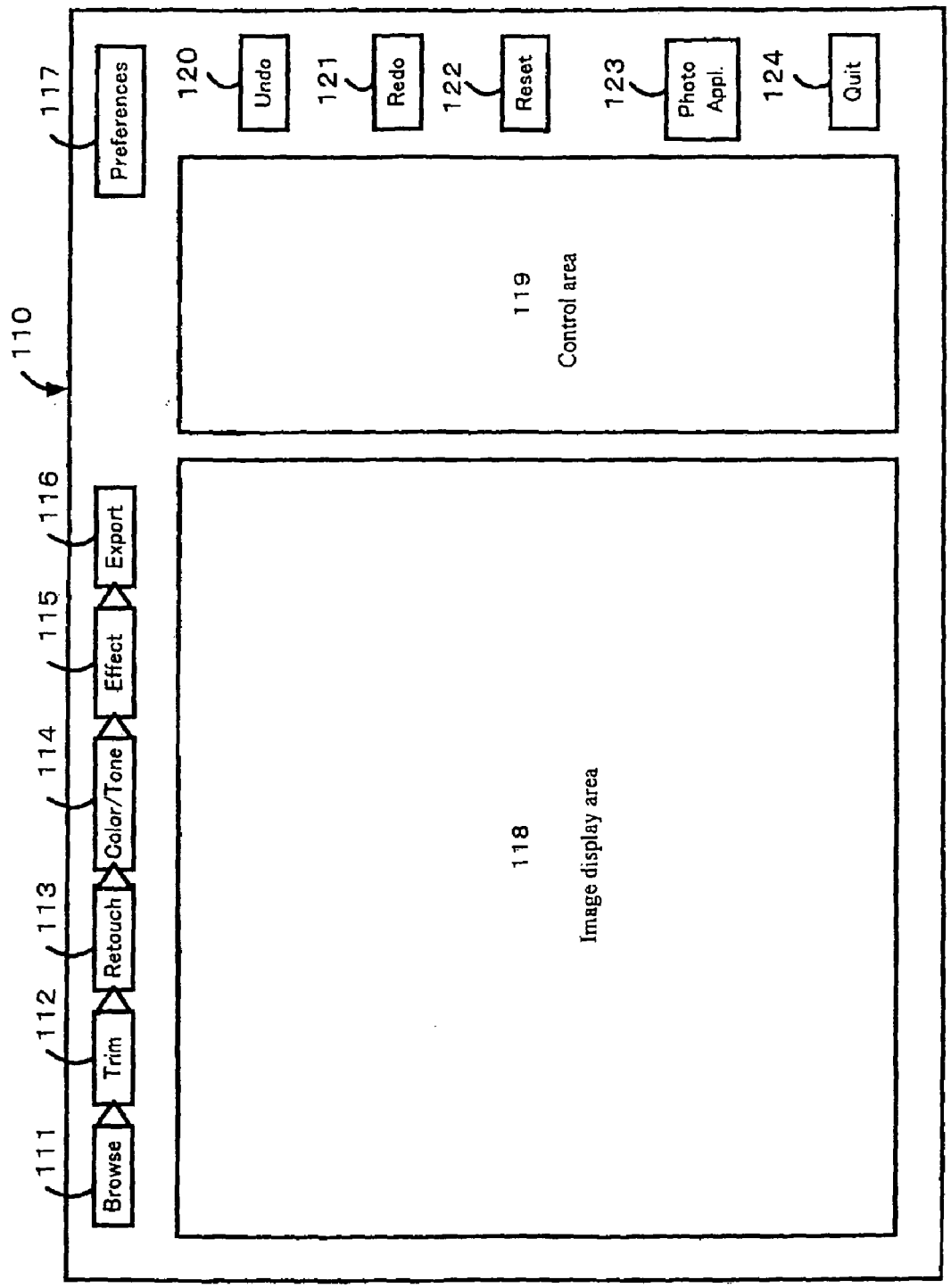
FIG. 5 is a drawing showing retoucher main window 110 of special photo retoucher 11.

Special photo retoucher 11 displays graphical user interface(s) (hereinafter "retoucher main window") 110 such as is shown at FIG. 5 at monitor(s) of client system 5. As shown at FIG. 5, arrayed from left to right at the upper portion of retoucher main window 110 are BROWSE button 111, TRIM button 112, RETOUCH button 113, COLOR/TONE button 114, EFFECT button 115, and EXPORT button 116. The order of arrayal of these buttons 111 through 116 from left to right parallels retouching operational procedure as typically carried out by a user. Such operational procedure is more or less as follows.

To wit, firstly, if BROWSE button 111 is pressed (e.g., by left-clicking a mouse), BROWSE mode is entered, wherein thumbnail images of all of the photo image files within desired photo folder(s) 12 may be browsed and desired photo image file(s) may be selected therefrom. Next, if TRIM button 112 is pressed (e.g., by left-clicking a mouse), TRIM mode is entered, wherein photo image(s) selected while in BROWSE mode may be displayed in its or their entirety and unwanted region or regions other than region or regions of such image(s) which is or are desired to be printed may be cropped away so as to extract only the region or regions of such image(s) which is or are desired to be printed. Next, if RETOUCH button 113 is pressed (e.g., by left-clicking a mouse), RETOUCH mode is entered, wherein desired brush(es) may be used to apply desired modifications at desired location(s) within such photo image(s). Next, if COLOR/TONE button 114 is pressed (e.g., by left-clicking a mouse), COLOR/TONE mode is entered, wherein color adjustment filter(s) may be used to apply desired color adjustment(s) to entire photo image(s). Next, if EFFECT button 115 is pressed (e.g., by left-clicking a mouse), EFFECT mode is entered, wherein special effects filter(s) may be used to apply desired special effect(s) to entire photo image(s). Note that the various types of image processing carried out on photo image(s) at the foregoing TRIM through EFFECT modes is hereinafter referred to as "enhancement."

Lastly, if EXPORT button 116 is pressed (e.g., by left-clicking a mouse), EXPORT mode is entered, wherein file(s) containing such photo image(s) may be saved to desired photo folder(s) 12. Among the ways in which saving may be carried out are two user-selectable methods, one of which is a method wherein photo image file(s) resulting from application to the original photo image(s) of all enhancements carried out at TRIM through EFFECT modes is or are saved, and the other of which is a method wherein file(s) containing description of parameters for all enhancements carried out at TRIM through EFFECT modes is or are saved without any change having been made to the original photo image file(s).

Routinely selecting one mode after the other from BROWSE mode to EXPORT mode and carrying out operations as described above permits facilitation of retouching operations. Furthermore, there is less chance of forgetting to carry out an enhancement which was supposed to have been done. Furthermore, while carrying out operations within the respective modes, at retoucher main window 110 shown in FIG. 5, photo image(s) subject to processing during that step or those steps is or are displayed in image display area 118, and a variety of indicators indicating processing status as well as various tools and console buttons used during that step or those steps are displayed in control area 119.

At the initial BROWSE mode, special photo retoucher 11 automatically (always, unless otherwise requested by the user) causes working ICC profile(s) to be set for photo image(s). The user may personally change working ICC profile settings. But if there is no special specification from the user, special photo retoucher 11 will automatically cause working ICC profile(s) to be set in accordance with default settings. Working ICC profile(s) set at BROWSE mode will be applied to photo image(s) selected while in BROWSE mode when processing proceeds from BROWSE mode to TRIM mode.

Figure 6:
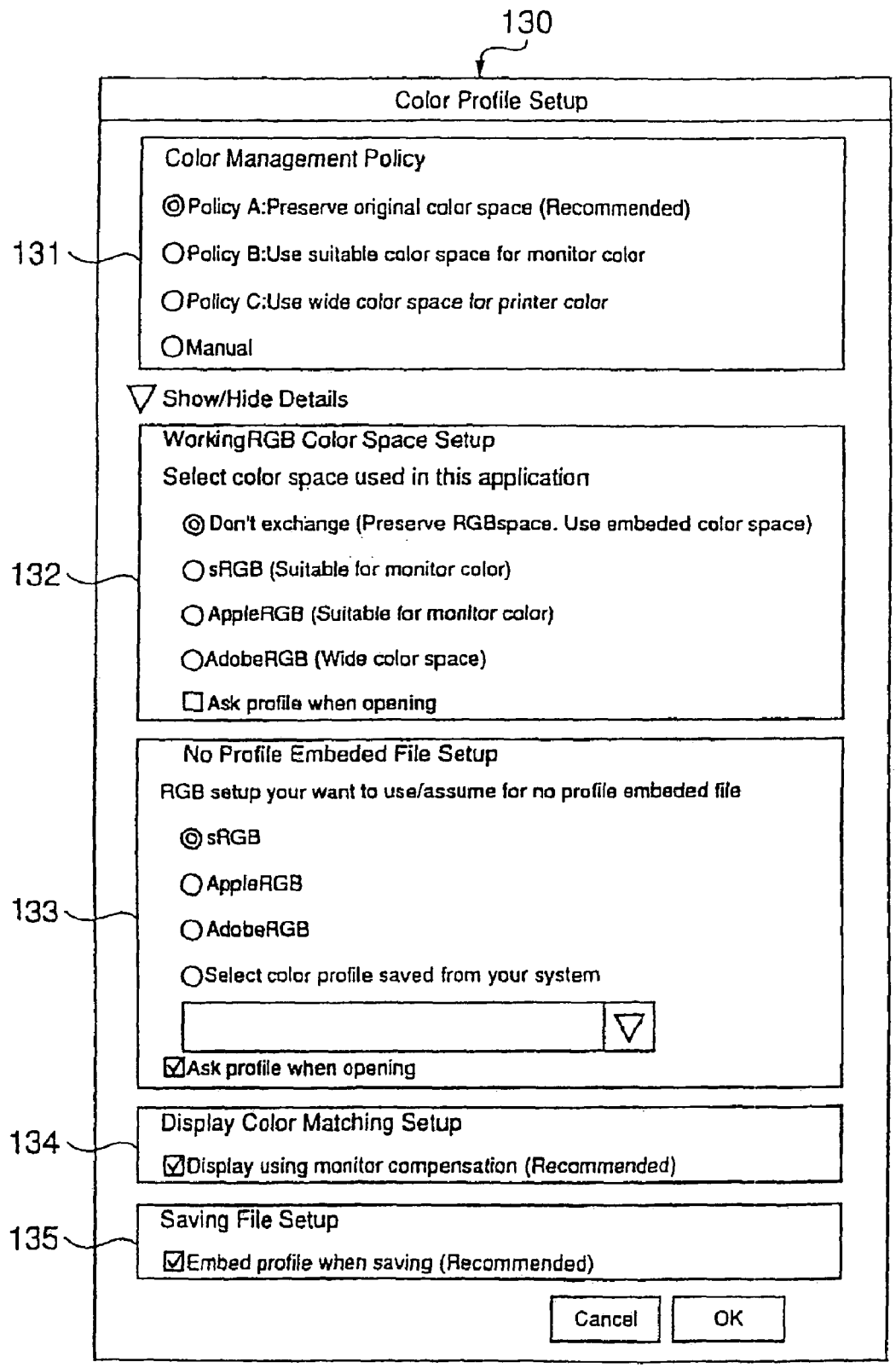
FIG. 6 is a drawing showing COLOR PROFILE SETUP dialog box 130 of special photo retoucher 11.

To personally set working ICC profile(s) and/or confirm current settings, a user presses (e.g., by left-clicking a mouse) PREFERENCES button 117 within retoucher main window 110 while in BROWSE mode. Upon so doing, a COLOR PROFILE SETUP dialog box 130 such as shown in FIG. 6 is displayed in popup fashion. Note that default profile settings are shown in the example of FIG. 6. At this COLOR PROFILE SETUP dialog box 130, a user may select from among three predetermined color management policies A through C at COLOR MANAGEMENT POLICY field 131. Special photo retoucher 11 will cause working ICC profile(s) to be set which has or have preprepared parameters in correspondence to policy or policies selected here by the user.

The foregoing three policies A through C are such as will now be described.

Policy A causes ICC profile(s) previously embedded in such photo image file(s) to be employed as working ICC profile(s). (While this is not the case for the commonly available types of digital camera,) high-quality digital cameras of the type used by photo studios embed ICC profile(s) indicating the color space(s) of that digital camera in files containing photo images taken therewith and output such files (but note that the majority of the commonly available types of digital camera do not embed an ICC profile). Accordingly, by selecting policy A it is possible to use a color space of a digital camera 6 as a working color space for retouching. In other words, policy A represents settings for when it is desired to print as faithful as possible to the original color of photos taken with a digital camera 6; however, there is no guarantee that colors will be good approximations of each other in going between monitor and printer. Note further that this is the default setting.

Policy B represents settings for when it is desired to print so as to be faithful to the color displayed at monitor(s). For example, the ICC profile of the publicly known "sRGB" color space, corresponding to the color space of a typical monitor, might be set as a working ICC profile. This setting will permit color matching to be carried out between monitor and printer in comparatively proper fashion. In other words, this will allow printout color(s) to be made a good approximation of color(s) displayed at monitor(s).

Policy C causes a standard ICC profile widely employed in the industry—e.g., the ICC profile of the publicly known "AdobeRGB" color space, a wide-gamut standard which is close to printer color space and which has a wider gamut than monitor color space—to be set as a working ICC profile.

Furthermore, by selecting MANUAL at COLOR MANAGEMENT POLICY field 131 of FIG. 6, a user may use fields 132 through 135 therebelow to set desired ICC profile(s) as working ICC profile(s).

First, at WORKING RGB COLOR SPACE SETUP field 132, working ICC profile(s) may be specifically designated. Selecting DON'T EXCHANGE here causes ICC profile(s) previously embedded in such photo image(s) to be employed as working ICC profile(s). Furthermore, respectively selecting "sRGB," "AppleRGB," or "AdobeRGB" causes an ICC profile for the publicly known color space of same name to be set as a working ICC profile.

Furthermore, at NO PROFILE EMBEDDED FILE SETUP field 133, it is possible to set color space(s) to be assumed and used as if it or they were the original ICC profile(s) of photo image(s) in the event that ICC profile(s) is or are not yet embedded in file(s) containing such photo image(s) (e.g., there is often no ICC profile embedded in photo image files acquired from commonly available types of digital cameras). The default setting is "sRGB." "sRGB," "AppleRGB," "AdobeRGB," or any arbitrary ICC profile managed by a color management system at client system 5 may be selected and set in correspondence to user preference.

Furthermore, by placing a check mark in the box next to ASK PROFILE WHEN OPENING (this being the default setting), when any arbitrary photo image file(s) is or are opened (photo image file(s) selected while in BROWSE mode being, for example, opened when processing proceeds from BROWSE mode to TRIM mode), special photo retoucher 111 will force prescribed dialog box(es) for confirming and setting working ICC profile(s) to be displayed in popup fashion if ICC profile(s) is or are not yet embedded in such photo image file(s). This makes it possible for user(s) to never forget to confirm the type of working ICC profile(s) to be set for photo image(s) in which ICC profile(s) is or are not embedded.

As described above, special photo retoucher 11 always sets working ICC profiles for photo images at the initial BROWSE mode.

Figure 7:
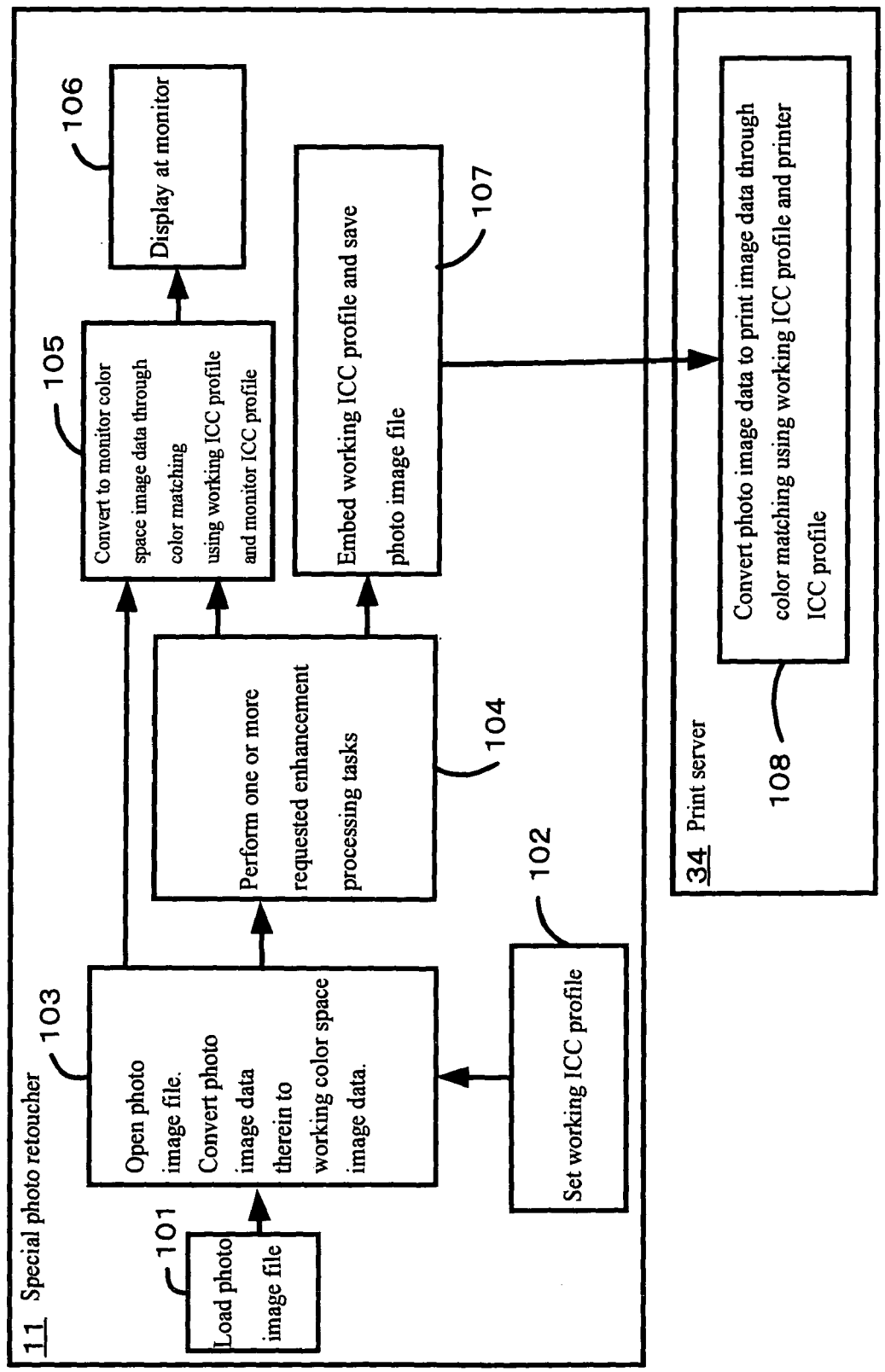
FIG. 7 is a flowchart showing flow of processing for setting of working ICC profile(s) at special photo retoucher 11 and for color matching using such working ICC profile(s).

FIG. 7 shows flow of processing for setting working ICC profile(s) at special photo retoucher 11 as described above, and for using such working ICC profile(s) during color matching between working color space(s) and color space(s) of monitor(s) and/or printer(s) which is carried out thereafter.

At FIG. 7, step 102 indicates setting of working ICC profile(s) in BROWSE mode, described above. Thereafter, when processing proceeds from BROWSE mode to TRIM mode, special photo retoucher 11 reads photo image file(s) selected while in BROWSE mode as indicated at step 101, and opens such photo image file(s) as indicated at step 103. When such photo image file(s) is or are opened, the photo image data thereof may be converted to image data belonging to working color space(s) defined by working ICC profile(s) set at BROWSE mode. At such time(s), if ICC profile(s) previously embedded in such photo image file(s) (or ICC profile(s) assumed as such by special photo retoucher 11) is or are set as working ICC profile(s), no special change is made to the photo image data thereof when such photo image file(s) is or are opened. In contradistinction hereto, if working ICC profile(s) is or are set which is or are different from ICC profile(s) previously embedded in such photo image file(s) (or assumed as such), perceptual color matching may be carried out on such photo image data based on such embedded ICC profile(s) and working ICC profile(s) when such photo image file(s) is or are opened. This color matching permits such photo image data to be adjusted such that color(s) most closely approximating color(s) represented in the color space defined by the previous ICC profile is or are representable in the working color space.

Furthermore, special photo retoucher 11 carries out processing for display of such photo image(s) at display monitor(s). More specifically, as indicated at step 105, special photo retoucher 11 converts such photo image data to image data belonging to monitor color space(s) defined by monitor ICC profile(s) previously prepared and made available at client system 5. At time or times of such conversion, special photo retoucher 11 carries out perceptual color matching for such photo image data making use of the foregoing working ICC profile(s) and the foregoing monitor ICC profile(s) for such photo image data. This permits such photo image data to be adjusted so that color(s) displayed on monitor(s) will be as close as possible to color(s) present in working color space(s). Furthermore, as indicated at step 106, special photo retoucher 11 displays, on monitor(s) (more specifically, at image display area 118 within window 110 shown in FIG. 5), monitor color space photo image data produced by such conversion.

Thereafter, as indicated at step 104, special photo retoucher 11 carries out various enhancements on such photo image(s) as requested by user(s) in TRIM, RETOUCH, COLOR/TONE, and/or EFFECT modes. With every enhancement which is carried out thereon, special photo retoucher 11 performs the foregoing steps 105 and 106 on the post-enhancement photo image(s), displaying such post-enhancement photo image(s) on monitor(s).

Lastly in EXPORT mode, as indicated at step 107, special photo retoucher 11 saves file(s) containing photo image(s) already incorporating various enhancements to photo folder(s) 12 designated by user(s), at which time working ICC profile(s) for such photo image(s) is or are embedded in and saved with such photo image file(s).

As already described with reference to FIG. 3, saved photo image file(s) and working ICC profile(s) embedded therein are thereafter sent to print server machine 2 following termination of print layout editing and are converted to print image data by print server(s) 34 at print server machine 2. At such time or times, as indicated at step 108 in FIG. 7, print server(s) 34 carries or carry out perceptual color matching on such photo image data using working ICC profile(s) embedded in photo image file(s) and printer ICC profile(s) corresponding to the output printer and output media combination. This permits respective such photo image data to be adjusted, this then being incorporated in print image data, so as to produce color(s) when printed out that will be as close as possible to color(s) present in working color space(s) of such photo image(s).

A series of color matching processing operations such as has been described above permits results such as the following to be obtained.

In the event that ICC profile(s) embedded in photo image(s) by digital camera(s) 6 is or are caused to be set as working ICC profile(s) at the foregoing BROWSE mode, this will result in printed output being obtained which has color(s) satisfactorily approximating color(s) present in subject(s) photographed with digital camera(s) 6. As this is in fact the basic default setting (corresponding to the setting(s) shown by way of example at field 131 and/or field 132 in FIG. 6), user(s) is or are able to automatically obtain the foregoing result even where no particular setting has been entered for ICC profile(s).

On the other hand, in the event that monitor ICC profile(s)—and/or ICC profile(s) like "sRGB" which is or are extremely close thereto—is or are caused to be set as working ICC profile(s), this will result in a printed output being obtained which has color(s) satisfactorily approximating color(s) as displayed on monitor(s). As this is in fact the default setting in the event that there is no previously existing ICC profile(s) (corresponding to the setting(s) shown by way of example at field 133 in FIG. 6), user(s) is or are able to automatically obtain the foregoing result even where no particular setting has been entered for ICC profile(s).

Repeated reference is now made to retoucher main window 110 of FIG. 5.

Upon pressing TRIM button 112 and entering TRIM mode, selected photo image(s) is or are displayed at image display area 118. By dragging cursor(s) over photo image(s) at image display area 118, user(s) may cause rectangular selection locus or loci of dimensions as defined by drag start and end points to be set on photo image(s), and may crop away region(s) outside such selection locus or loci so as to extract only region(s) inside such selection locus or loci. If desired aspect ratio(s) is or are previously chosen from control area(s), i.e., from therewithin, then no matter how a user might perform the foregoing drag operation the aspect ratio(s) of the rectangular selection locus or loci set thereby may be automatically controlled so as to have the foregoing chosen aspect ratio(s). Furthermore, control area 119 includes button(s) causing selection locus or loci to be rotated to the right and/or rotated to the left in one-degree increments, pressing which permits selection locus or loci to be rotated to the left and/or rotated to the right in one-degree increments. This permits facilitation of cropping operations.

Next, if RETOUCH button 113 is pressed and RETOUCH mode is entered, photo image(s) as cropped in TRIM mode may be displayed in image display area 118. Displayed at control area 119 there are, within the same screen(s), a number of selectable choices of prescribed retouching tools frequently used at photo studios; slider bar(s) for adjusting intensity or intensities of enhancement effect(s); list(s) of plurality or pluralities of brushes of different size, degree of blurring, shape, and angle; and a plurality of slider bars for adjusting size, degree of blurring, shape, and angle of respective brush(es). After choosing, at control area 119, desired tools(s), desired enhancement effect intensity or intensities, and brush(es) having desired size(s), degree(s) of blurring, shape(s), and angle(s), user(s) may place cursor(s) at desired location(s) in photo image(s) within image display area 118 and carry out desired enhancement(s) at such location(s). At such time or times, because cursor(s) is or are displayed on photo image(s) within image display area 118 as graphic(s) (e.g., a closed graphic accurately indicating the outline of a brush) having the same size, shape, and angle as brush(es) (i.e., region(s) at which enhancement(s) will be applied) used by user(s), user(s) can accurately ascertain location(s) in photo image(s) at which enhancement(s) will be applied.

Next, if COLOR/TONE button 114 is pressed and COLOR/TONE mode is entered, photo image(s) with enhancement(s) as applied in RETOUCH mode may be displayed in image display area 118. In this mode, photo image color may be adjusted. This mode comprises the three submodes EASY, VARIATION, and MANUAL. Desired mode(s) may be selected from among these three at control area 119.

Upon selection of the EASY submode, a plurality of selectable choices of preprepared color adjustment filters are displayed in control area 119. Such selectable choices might, for example, include STANDARD COLOR CORRECTION, PORTRAIT PHOTO COLOR CORRECTION, MAKE INTO MONOCHROME PHOTO, LIGHTEN, MAKE HEAVIER, SHARPEN, SOFTEN, and/or the like. By choosing desired selectable choice(s), it is possible to cause prescribed color adjustment filter(s) corresponding thereto to be applied to the entirety or entireties of photo image(s). It is also possible to manually alter parameter(s) of respective filter(s).

Upon selection of the VARIATION submode, parameter setting table(s) for allowing user(s) to freely set values of a prescribed plurality of major parameters (e.g., brightness, contrast, gray balance, saturation, sharpness, and/or the like) from among a variety of parameters for color adjustment filter(s) is or are displayed in control area 119. A desired parameter may be selected from among the foregoing plurality of parameters at such parameter setting table(s). Furthermore, displayed horizontally and vertically in arrayed fashion at image display area 118 there may be, within the same screen(s), a plurality of (e.g., 3, 9, 25, etc.) photo images which respectively represent results of application in trial fashion of a plurality of (e.g., 3, 9, 25, etc.) color adjustment filters having different parameter values to the same photo image(s). The photo image(s) centrally located thereamong represents or represent the result of application in trial fashion of color adjustment filter(s) having parameter value(s) as currently set at control area 119. Furthermore, respectively arrayed in order to either side of central photo image(s) are results of application in trial fashion of color adjustment filter(s) for which parameter(s) selected by user(s) at the foregoing parameter setting table(s) is or are decreased in step(s) of prescribed value(s) from currently set parameter value(s), and conversely, results of application in trial fashion of color adjustment filter(s) for which parameter(s) selected by user(s) at the foregoing parameter setting table(s) is or are increased in step(s) of prescribed value(s) from currently set parameter value(s). Accordingly, user(s) can compare such plurality of photo images differing with respect to color(s), and can easily determine which color(s) is or are most preferred. Upon selection by user(s) of photo image(s) having desired color(s), such selected photo image(s) may automatically be made to move to the center of image display area 118, and parameter value(s) for color adjustment filter(s) applied to to such selected photo image(s) may be caused to be set at control area 119. Upon proceeding to other mode(s) and/or other submode(s), color adjustment filter(s) having particular parameter value(s) as set at control area 119 may be automatically applied to photo image(s).

Upon selection of the MANUAL submode, various tools and indicators for even more detailed setting of color adjustment filter parameters than at VARIATION submode are displayed at control area 119, use of which permits more detailed adjustment of color to be carried out.

Upon termination of color adjustment in the foregoing COLOR/TONE mode, by next pressing EFFECT button 115, EFFECT mode is entered, wherein special effects filter(s) may be used to apply desired special effect(s) to entire photo image(s).

As described above, sequential execution of TRIM, RETOUCH, COLOR/TONE, and/or EFFECT modes makes it possible for all enhancements typically required at photo studios to be applied without omission to photo image(s).

Now, in the event that during the course of TRIM through EFFECT modes a user decides he or she wants to make use of ordinary photo retoucher 15, all the user need do is press PHOTO APPLICATION button 123 at retoucher main window 110 in FIG. 5. Upon so doing, special photo retoucher 11 saves, to photo folder(s) 12, file(s) containing photo image(s) incorporating results of enhancement(s) performed up to that point in time, and launches ordinary photo retoucher 15 using path(s) of such saved photo image file(s) as parameter(s) for launch command(s), with special photo retoucher 11 itself furthermore becoming inactive. As a result, because ordinary photo retoucher 15 is launched, opening that or those saved photo image file(s), user(s) may use ordinary photo retoucher 15 to carry out subsequent retouching operations. Upon termination of operations with ordinary photo retoucher 15, saving of photo image(s) incorporating the results of such operations to the same photo folder(s) 12 under the same file name(s), and termination of ordinary photo retoucher 15, special photo retoucher 11 automatically becomes active and reopens such photo image file(s), causing ICC profile(s) to again be set for such photo image file(s). As a result, user(s) is or are able to again use special photo retoucher 11 to carry out subsequent operations.

Proceeding finally to EXPORT mode, when user(s) requests or request that photo image(s) be saved, special photo retoucher 11 saves, to photo folder(s) 12, file(s) containing such photo image(s), working ICC profile(s) set at BROWSE mode being embedded therein.

With the foregoing, retouching operations carried out on one photo image using special photo retoucher 11 are ended. Retouching operations may thereafter be continued, such operations being carried out on other photo image(s).

Repeated reference is now made to FIG. 3. If print layout editing is to be done, user(s) launch layout editor 13. Layout editor 13 displays graphical user interface(s) (hereinafter "layout editor main window") 140 such as is shown at FIG. 8 at monitor(s) of client system 5.

Figure 8:
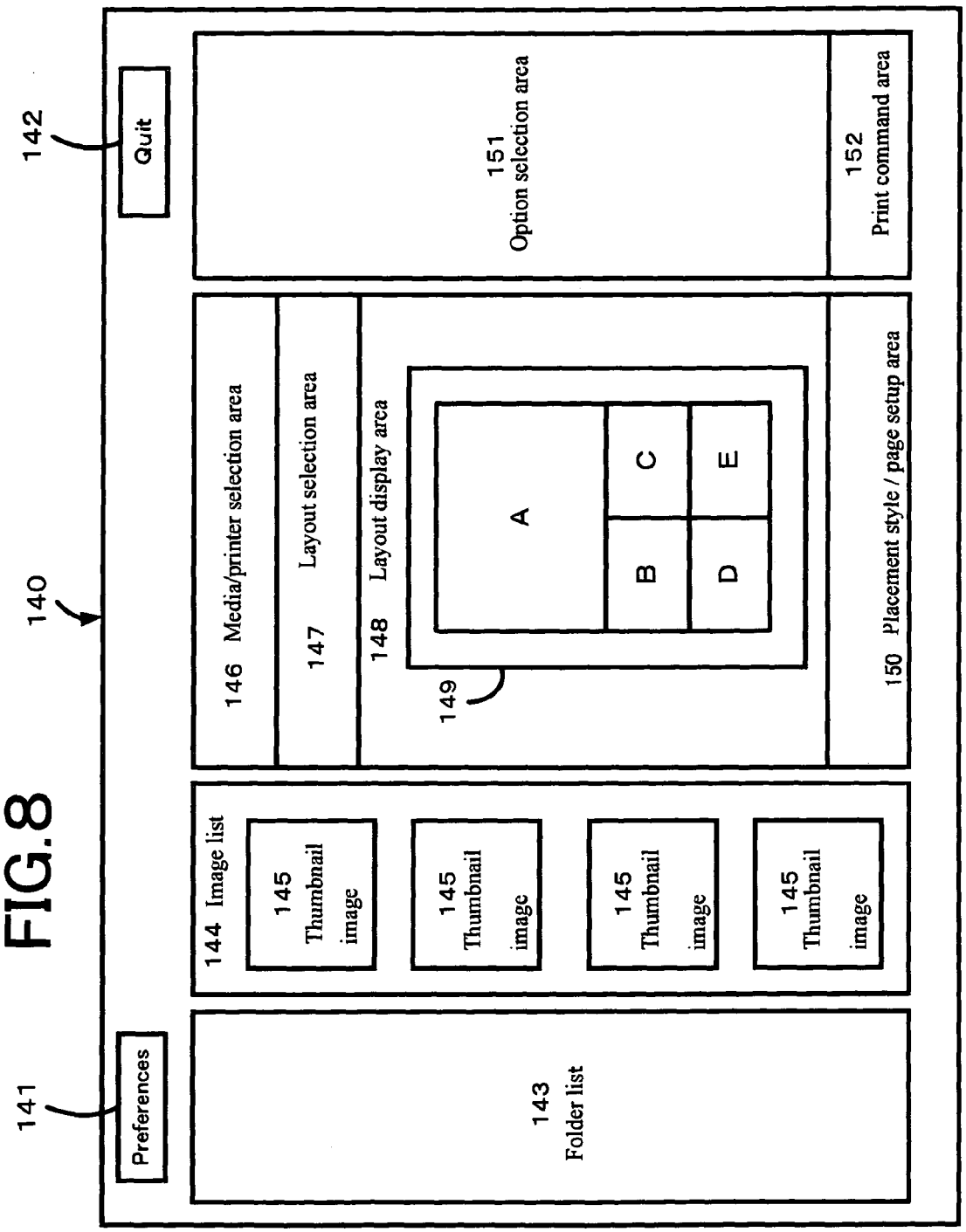
FIG. 8 is a drawing showing layout editor main window 140 of layout editor 13.

As shown at FIG. 8, layout editor main window 140 contains PREFERENCES button 141, folder list 143, image list 144, media/printer selection area 146, layout selection area 147, layout display area 148, placement style/page setup area 150, option selection area 151, print command area 152, and so forth.

Figure 9:
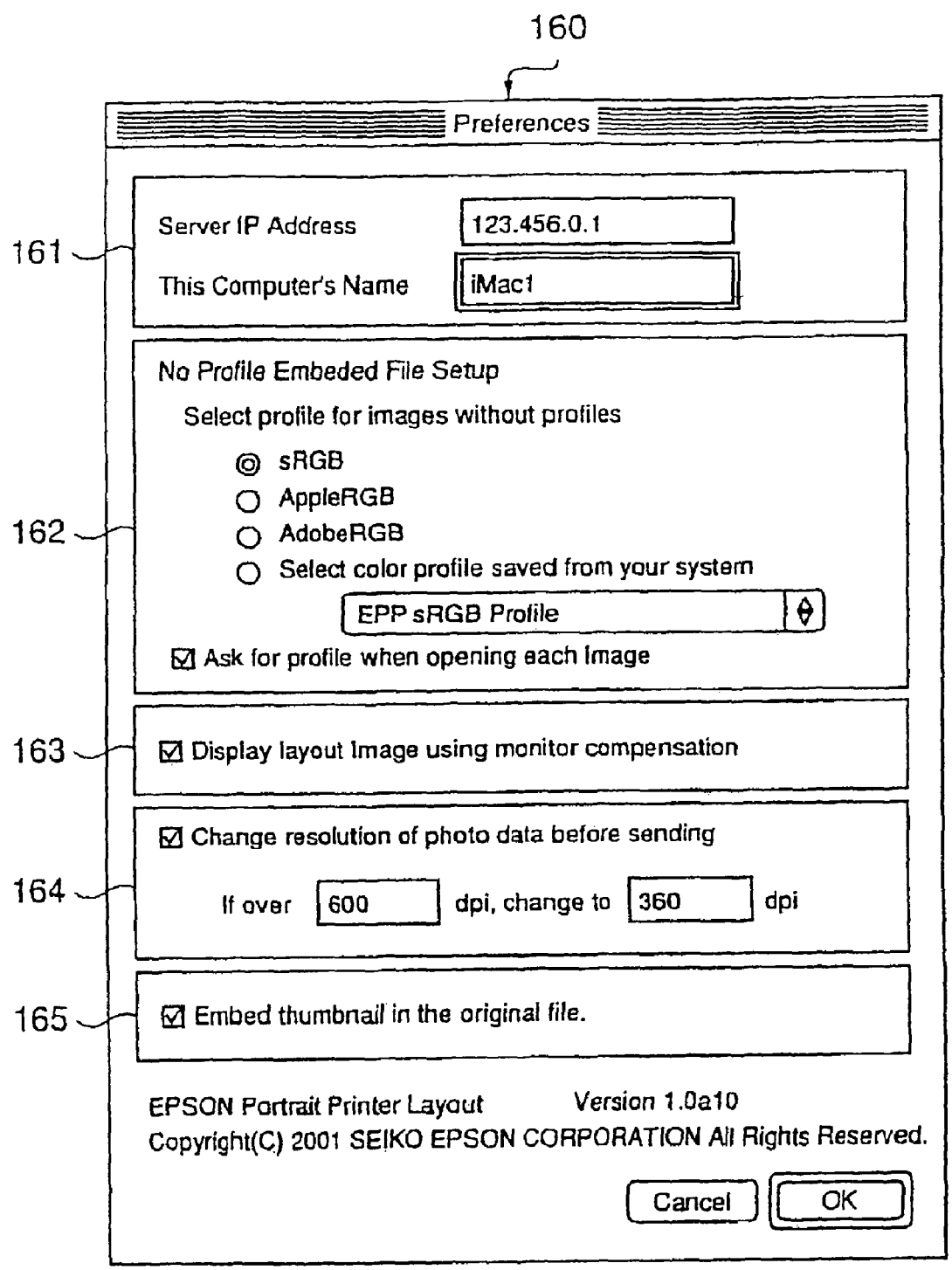
FIG. 9 is a drawing showing PREFERENCES dialog box 160 of layout editor 13.

If PREFERENCES button 141 is pressed (e.g., by left-clicking a mouse), a PREFERENCES dialog box 160 such as is shown in FIG. 9 is displayed in popup fashion. At NO PROFILE EMBEDDED FILE SETUP field 162 of this PREFERENCES dialog box 160, it is possible—just as was the case at field 133 of the same name shown in FIG. 6—to set ICC profile(s) automatically assumed and used as if it or they had been embedded in photo image file(s) in which ICC profile(s) is or are not yet embedded (e.g., the default setting being "sRGB"—corresponding to a typical monitor color space).

List(s) of all folders belonging to client system 5 is or are displayed at folder list 143 within layout editor main window 140. Upon selection by user(s) of desired folder(s) therefrom, thumbnail images 145, 145, . . . for all photo image files saved in such selected folder(s) are displayed at image list 144.

Furthermore, output printer(s) as well as type(s) and size(s) of print media to be used during printing may be specified at media/printer selection area 146. In specifying output printer(s), one of the plurality of printers 3A, 3B shown in FIG. 4 may be specified explicitly, or autoselect (whereby the system automatically selects the most suitable or convenient printer(s)) may be specified. In the event that user(s) specifies or specify particular printer(s) as output printer(s), the system carries out printing of all pages in such job(s) and all sets of copies thereof using only the particular printer(s) specified. On the other hand, in the event that user(s) specifies or specify autoselect, the system automatically selects printer(s) to carry out printing of respective pages and respective sets of copies thereof in correspondence to conditions at printers 3A, 3B. Where autoselect has been specified, it therefore possible that printing of a single job will be distributed across different printers.

Furthermore, at layout selection area 147, list(s) of multiple varieties of layout templates saved in template library folder 32 at print server machine 2 shown in FIG. 3 may be displayed in for example pulldown menu, dialog box, or other such fashion, permitting desired template(s) to be selected therefrom. Selected template(s) is or are acquired by layout editor 13 from template library folder 32 of print server machine 2 shown in FIG. 3 by way of file transfer server 31, and is or are displayed in layout display area 148 at layout editor main window 140 shown in FIG. 8.

Layout template(s) 149 displayed at layout display area 148 occupy space(s) of the same size(s) as print media size(s) selected at media/printer selection area 146, and arrayed therein pursuant to predefined layout(s) there may be one or a plurality of photo frame(s) A through E of standard size(s) standardly used for photo prints.

If desired thumbnail image(s) from image list 144 is or are dragged and dropped by user(s) onto desired photo frame(s) within template(s) 149 at layout display area 148, layout editor 13 will open file(s) containing photo image(s) corresponding to such thumbnail image(s), displaying such photo image(s) such that it or they are placed within such photo frame(s). When placing photo image(s) in photo frame(s), layout editor 13 carries out any required adjustment with respect to photo image dimensions and/or direction, such as changing photo image size and/or direction, cropping portion(s) extending beyond photo frame(s), or adding margin(s) to portion(s) falling short of photo frame size(s), in accordance with placement style(s) set at placement style/page setup area 150, described below. When user(s) have dragged and dropped onto desired photo frame(s) within template(s) 149 all photo images which the user(s) wants or want to print on the same media, print layout for that or those print page(s) is completed.

When placing respective photo image(s) in respective photo frame(s) within template(s) 149 as described above, layout editor 13 automatically (always, unless otherwise requested by the user) causes working ICC profile(s) to be set for such photo image(s) as described below. To wit, if ICC profile(s) has or have previously been embedded in such photo image file(s), such previous ICC profile(s) is or are caused to be set as working ICC profile(s). If, on the other hand, such photo image file(s) does or do not yet have ICC profile(s) embedded therein, ICC profile(s) set at NO PROFILE EMBEDDED FILE SETUP field 162 in dialog box 160 shown in FIG. 9, described above, is or are treated as if it or they had previously been embedded in such photo image file(s), and such ICC profile(s) treated as if it or they had been embedded therein is or are caused to be set as working ICC profile(s).

At placement style/page setup area 150, style(s) may be set for placement of photo image(s) within respective photo frame(s) at template(s) 149. Setup items include setting(s) pertaining to rotation and setting(s) pertaining to trimming to be carried out if aspect ratio(s) of photo frame(s) and photo image(s) do not match. With respect to trimming styles, either AUTOTRIM (i.e., a style such that photo image(s) is or are made to occupy photo frame(s) without production of margin(s) therebetween by automatically trimming excess regions at either end in the long direction of photo image(s) so as to cause dimension(s) in the short direction of photo image(s) to match dimension(s) in same direction of photo frame(s)) or FIT WITHIN (i.e., a style such that photo image(s) is or are made to occupy photo frame(s) without trimming of photo image(s) by automatically adding margins at either side in the short direction thereof so as to cause dimension(s) in the long direction of photo image(s) to match dimension(s) in same direction of photo frame(s)) may be selected. With respect to rotation styles, either AUTOCLOCKWISE and AUTOCOUNTERCLOCKWISE (i.e., styles such that photo image(s) is or are automatically rotated 90 degrees in respectively clockwise and counterclockwise directions so as to cause the long direction of photo image(s) and the long direction of photo frame(s) to be in the same direction) or MANUAL (i.e., a style permitting 90-degree manual rotation by user(s) in desired direction(s)) may be selected. Because layout editor 13 automatically causes photo image(s) dropped in respective photo frame(s) to be placed in such photo frame(s) using placement style(s) as set here, photo image size adjustment operations are very much facilitated.

At placement style/page setup area 150, where page(s) currently being edited using template(s) 149 will fall within print job(s); i.e., which page(s) therein it or they will correspond to, may also be set. When editing print layout(s) of print job(s) comprising a plurality of pages, one need only add page(s) at this placement style/page setup area 150, and, for each respective page, select template(s) as described above, dragging and dropping desired photo image(s) onto respective photo frame(s) therein. Layout editing is thus very much facilitated.

At option selection area 151, optional items may be set with respect to PRINTER OPTIONS, PRINT OPTIONS, and AFTER PRINTING With respect to PRINTER OPTIONS, when carrying out distributed printing such that the same job(s) is or are printed in distributed fashion across a plurality of printers (if autoselect is specified at media/printer selection area 146, because the system automatically assigns output printer(s) for respective pages and respective sets of copies of such job(s) in correspondence to conditions at printer(s) it is possible that distributed printing could occur), whether the same page(s) is or are to be printed at the same printer(s) and/or whether the same job(s) is or are to be printed at the same printer(s) (whether distributed printing is to be prohibited) may be set. If printing is carried out on the same printer(s), print quality will be the same throughout all sets of copies thereof.

With respect to PRINTER OPTIONS, moreover, whether it is okay to use print media of the same type(s) but of larger size(s) for printing when print media of the specified size(s) is or are not loaded at specified printer(s) may be set. If OKAY is set here, whether print media frame(s) of size(s) corresponding to print media of the specified size(s) should be printed together therewith may furthermore be set. Where it has been set that it is OKAY to use print media of larger size(s) for printing, in order to eliminate uneconomical use of print media the system automatically controls print layout at respective page(s) of print media so as to cause respective page(s) of such job(s) to print at location(s) toward the end(s) of such larger sized print media. If, for example, A4 size was specified for such job(s) but there is no A4 print media, printing instead being carried out on A3 print media which is twice the size thereof, the system would print page(s) of such job(s) in one of two A4-size regions produced as a result of bisection of that A3 print media by the centerline thereof.

Furthermore, with respect to the situation where printing is to be carried out on print media of size(s) larger than specified size(s) as described above, either of the print styles GIVE PRIORITY TO JOB or GIVE PRIORITY TO PRINT MEDIA may be caused to be set in selective fashion at print server machine 2 (or this setting may likewise be carried out at the layout editor). In the event that GIVE PRIORITY TO JOB is set at print server machine 2, because the system gives priority to finishing such job(s) as soon as possible, even if there is or are empty margin(s) remaining on print media of size(s) larger than specified size(s) sufficient to allow printing of other page(s) when printing of particular print job(s) on such larger-size print media is finished (e.g., even where the last page(s) of such job(s) is or are printed on only a region occupying one half of A3 print media, leaving a region in the other half unprinted and empty), such print media is immediately discharged and such print job(s) is or are immediately concluded. On the other hand, in the event that GIVE PRIORITY TO PRINT MEDIA is set at print server machine 2, because the system gives priority to eliminating uneconomical use of such print media, if there is or are empty margin(s) remaining on print media of size(s) larger than specified size(s) sufficient to allow printing of other page(s) when printing of particular print job(s) on such larger-size print media is finished (e.g., where the last page(s) of such job(s) is or are printed on only an A4 region occupying one half of A3 print media, leaving an A4 region in the other half unprinted and empty), other print job(s) of specified size(s) such as is or are capable of being printed in such margin(s) is or are awaited, such print media being discharged only after page(s) of such other print job(s) is or are printed in margin(s) of such print media (e.g., after the first page(s) of subsequent print job(s) is or are printed on A4 region(s) in the remaining half or halves of A3 print media).

Furthermore, with respect to PRINT OPTIONS, whether to print name(s) of file(s) containing respective photo image(s), alignment mark(s) for respective photo image(s), line(s) indicating external boundary or boundaries of respective photo image(s), studio name(s), client machine name(s), job ID(s), operator name(s), customer name(s), list(s) of name(s) of file(s) containing photo image(s) placed on page(s), print date(s), arbitrary comment(s), and/or other such supplemental information may be set (printing such supplemental information facilitates post-printing operations such as cutting and sorting of printed output by customer). In addition, with respect to any customer name(s) to be printed, list(s) of names of customers previously registered with the system may be displayed in popup fashion and customer name(s) selected therefrom.

Furthermore, with respect to AFTER PRINTING, whether to return job completion communication(s) to server status monitor 14 from print server(s) 34 shown in FIG. 3 after completion of execution of such print job(s) at printer(s), whether to leave data in connection with such print job(s) undeleted at print server machine 2 until deleted or altered by user(s), and other such optional operations to be carried out following completion of printing may be set. Absent a countermanding instruction for deletion from a user or presence of prescribed conditions causing deletion, print server machine 2 is such that print job data is as a rule left undeleted following completion of printing, being stored in disk storage at print server machine 2. Only in the event that the foregoing AFTER PRINTING setting has been set such that print job(s) is or are to be deleted following completion of printing does print server machine 2 delete such print job data, in which case it does so immediately after time or times when printing of such print job(s) is completed.

Moreover, with respect to the foregoing deletion of print job data, AVAILABLE SPACE and TIME PERIOD may be set as conditions for automatic deletion of stored print job data at print server machine 2. Where AVAILABLE SPACE has been set, if available disk storage space at print server machine 2 decreases to such set value(s) or less, print server machine 2 causes deletion of stored print job data, in order of oldness, recovering available disk storage space until it is the foregoing set value(s) or greater. Where TIME PERIOD has been set, print server machine 2 stores print job data for a time period corresponding to such set value(s) (e.g., 7 days), automatically deleting such print job data at time or times when stored time period(s) reach such set value(s).

At print command area 152, number(s) of copies to be printed and printing priority or priorities may be specified and execution of printing may be requested. When execution of printing is requested, layout editor 13 generates print job data for print job(s) currently being edited and sends same to file transfer server 31 of print server machine 2 shown in FIG. 3. As has already been described, print job data includes job script(s), layout script(s) for all print page(s) included in such job(s), everything placed within photo frame(s) at layout template(s) on such print page(s), and working ICC profile(s) caused to be set for such photo image(s). Note that photo image file(s) included within this print job data is or are not original photo image file(s) but is or are file(s) containing photo image(s) which has or have been subjected to adjustment with respect to dimension and/or direction during placement in photo frame(s) at layout template(s).

With the foregoing, print layout editing operations carried out on one print job are ended. Print layout editing operations may thereafter be continued, such operations being carried out on other print job(s).

Repeated reference is now made to FIG. 3 and FIG. 4.

At print server machine 2, print job data sent from layout editor 13 of client system 5 is accepted by file transfer server 31 and stored within job folder 33, and furthermore, print job data within job folder 33 is read by print server(s) 34. Based on such print job data, print server 34 creates print image data for all print page(s) making up such print job(s). At such time or times, by carrying out perceptual color matching on such photo image data using working ICC profile(s) for respective photo image(s) and printer ICC profile(s) corresponding to the output printer and output media combination, print server(s) 34 adjusts such photo image data included within print image data so as to produce color(s) when printed out that will most nearly approximate the color(s) present in working color space(s) of such photo image(s). In addition, print server 34 sends the created print image data for respective print page(s) to printer driver(s) 35A and/or 35B for output printer(s). This permits printing to take place at such printer(s).

With respect to output printer selection, print server(s) 34 carries or carry out control as follows based on setting(s) entered at media/printer selection area 146 of layout editor main window 140 shown in the aforementioned FIG. 8 and PRINTER OPTIONS setting(s) entered at option selection area 151 (these settings being written to job script(s)). To wit, if specific printer(s) has or have been specified at media/printer selection area 146, print server(s) 34 uses or use only such specified printer(s) as output printer(s). On the other hand, if AUTOSELECT has been entered for the printer specification at media/printer selection area 146, print server(s) 34 is or are free to select output printer(s) in correspondence to conditions existing at printer(s) at any given time. Furthermore, even where distributed printing is to be carried out, if setting has been made at the aforementioned PRINTER OPTIONS in option selection area 151 to the effect that the same page(s) and/or the same job(s) is or are to be printed at the same printer(s), then print server(s) 34 selects or select the same printer(s) as output printer(s) for all sets of copies of the same page(s) and/or the same job(s).

As has already been described, print server(s) 34 ascertains or ascertain execution status of respective print job(s) and/or status of printer(s) 3A, 3B, recording same at print information database 36. Information pertaining to user(s) at such studio(s) is also recorded at print information database 36.

Status monitor 14 of client system 5 requests information pertaining to errors generated by printer(s) 3A, 3B and/or completion of execution of respective print job(s) from print server machine 2 at time intervals (e.g., every 10 minutes, etc.) previously set by user(s). Responsive to this request, print server(s) 34 at print server machine 2 reads or read from print information database 36 new history information, not yet sent to client system 5, pertaining to completion of execution of print job(s) and/or printer error(s), sending same to status monitor 14 of client system 5 by way of file transfer server 31, and status monitor 14 displays that information on monitor(s) at client system 5.

Print job execution history or histories, status of printer(s) 3A, 3B, and/or user information at print information database 36 may be accessed at any time(s) by means of WWW browser 17 at client system 5. Moreover, administrator(s) at such studio(s) may use WWW browser 17 to register new user(s) at print information database 36.

Furthermore, by putting log uploader 38 of print server machine 2 into WATCHDOG MODE, regardless of whether user(s) is or are present thereat, upon occurrence of error(s) at printer(s) 3A, 3B or other such abnormality or abnormalities, electronic mail to such effect may be sent substantially in real time from center server machine 8 to email address(es) 93 of user(s). Various information managed at center database 84 of center server machine 8 may also be accessed at any time(s) by means of WWW browser 17 at client system 5.

Figure 10:
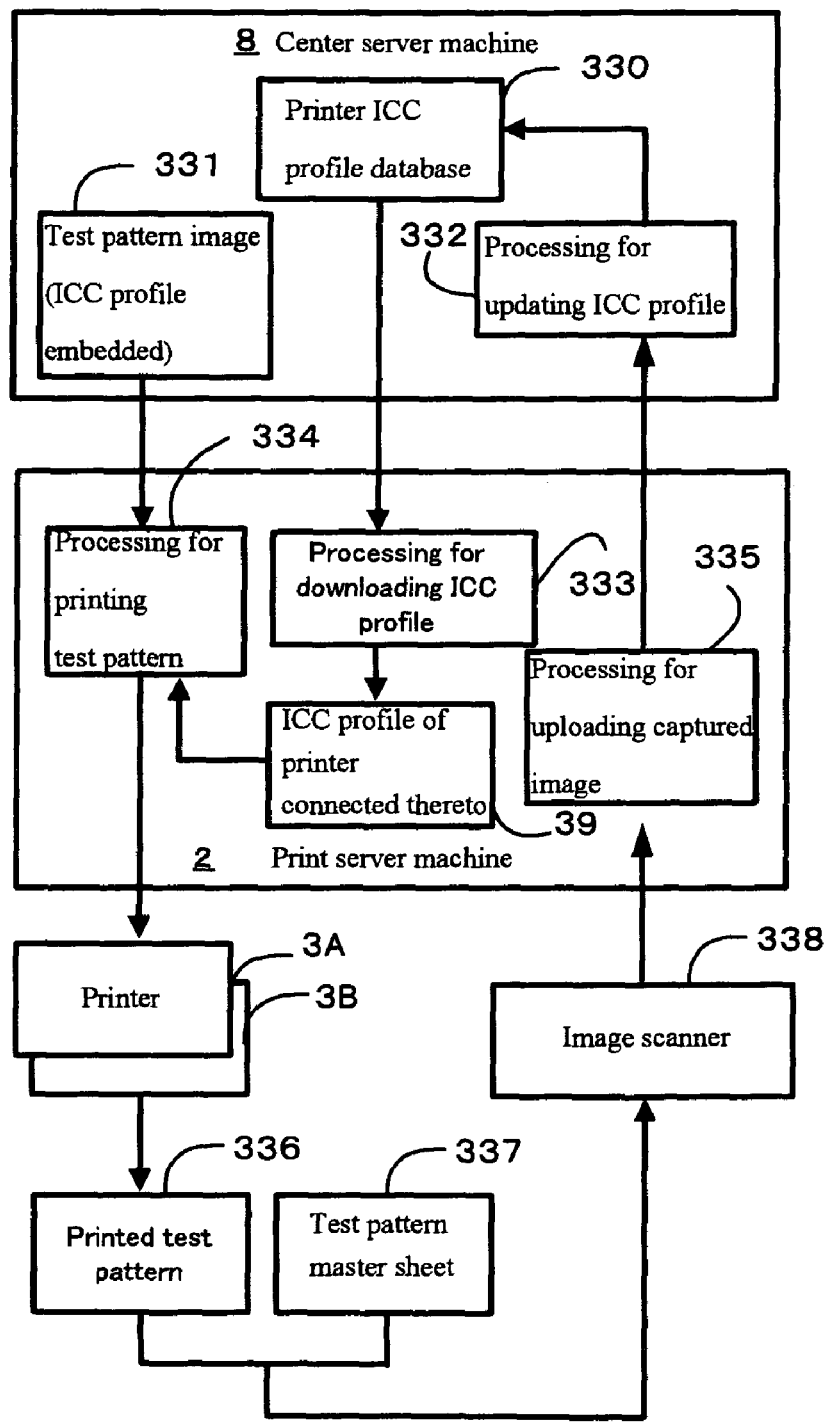
FIG. 10 is a block diagram showing functional constitution of print server machine 2 and center server machine 8 for updating printer ICC profile(s).

FIG. 10 shows functional constitution of print server machine 2 and center server machine 8 for updating printer ICC profile(s).

As shown in FIG. 10, center server machine 8 possesses printer ICC profile database 330, which stores printer ICC profile(s) for all printers respectively installed at all photo studio(s). Stored therein for each respective printer are a plurality of printer ICC profiles respectively corresponding to a plurality of usable types of print media. Printer ICC profile(s) for respective printer(s) are associated with machine number(s) of respective printer(s). At time or times when studio system(s) 1 of respective studio(s) is or are installed, print server machine 2 carries out ICC profile download processing 333. ICC profile download processing 333 is such that machine number(s) of printer(s) 3A, 3B of such studio(s) is or are communicated to center server machine 8, printer ICC profile(s) for such printer(s) 3A, 3B is or are downloaded from center server machine 8, and such downloaded printer ICC profile(s) is or are stored in prescribed folder(s) 39. Thereafter, when creating print image(s), printer ICC profile(s) stored within such folder(s) 39 may be used for color matching.

In order to investigate changes in printer(s) 3A, 3B with time, user(s) may whenever appropriate or at regular internals execute test pattern printing processing 334, which is installed at print server machine 2. Test pattern printing processing 334 is such that image data for prescribed test pattern(s) is downloaded from center server machine 8. Embedded in downloaded test pattern image data is or are ICC profile(s) indicating color space(s) of such test pattern image data. Test pattern printing processing 334 is such that printer ICC profile(s) corresponding to combination(s) of print media and printer(s) 3A and/or 3B being investigated is or are read from folder(s) 39, perceptual color matching is carried out using such printer ICC profile(s) and test pattern image data ICC profile(s), adjusting such test pattern image data, and such adjusted test pattern image data is used to carry out printing of test pattern(s) at printer(s) 3A and/or 3B being investigated.

Test pattern printout(s) 336 obtained as a result thereof may be sent from studio(s) to the center by mail, for example. At the center, colorimetry may be carried out on such test pattern printout(s) 336, and based on results of such colorimetry new printer ICC profile(s) may be created which indicates or indicate the present color space(s) of printer(s) 3A and/or 3B being investigated, such new printer ICC profile(s) being input to center server machine 8. At center server machine 8, printer ICC profile(s) for printer(s) 3A and/or 3B being investigated which is or are present at printer ICC profile database 330 may be updated to such new printer ICC profile(s). Print server machine 2 thereafter downloads, from center server machine 8, new printer ICC profile(s) for printer(s) 3A and/or 3B being investigated, and updates printer ICC profile(s) for printer(s) 3A and/or 3B being investigated which is or are present within folder(s) 39 to such downloaded new printer ICC profile(s). Print server machine 2 can then use such new printer ICC profile(s).

Moreover, electronic method(s) such as the following may be used as method(s) for sending test pattern printout(s) 336 to the center.

To wit, as shown in FIG. 10, a user at a photo studio mounts test pattern printout(s) 336 and preprepared test pattern master sheet(s) 337 on the platen of image scanner 388, and causes image scanner 388 to scan in such test pattern printout(s) 336 and master sheet(s) 337 in a single image scanning run. What is here referred to as a test pattern master sheet 337 is a sheet on which a test pattern is printed with accurate color(s), same being distributed in advance to respective photo studio(s). Image data captured from printout(s) 336 and master sheet(s) 337 which is output from image scanner 388 may be acquired by print server machine 2, and may be uploaded to center server machine 8 by means of captured image data uploading processing 335. At center server machine 8, ICC profile updating processing 332 is such that any difference in color(s) between test pattern printout(s) 336 and master sheet(s) 337 is detected based on such uploaded captured image data; furthermore, based on results of such detection, new printer ICC profile(s) is or are created which indicates or indicate the present color space(s) of printer(s) 3A and/or 3B being investigated, and corresponding printer ICC profile(s) within printer ICC profile database 330 is or are updated.

The foregoing represents overall description of the present embodiment(s). Next, focusing attention on that portion of the foregoing embodiment(s) represented by special photo retoucher 11 installed at client system 5, detailed description will be provided with respect to the function thereof. In the description that follows, description will in particular be provided with respect to BROWSE, TRIM, RETOUCH, and COLOR/TONE modes, which are included among the foregoing 6 modes which special photo retoucher(s) has or have. Note that while user(s) may carry out a variety of types of editing at such respective modes, description will emphasis the more typical thereamong.

First, BROWSE mode will be described.

Figure 11:
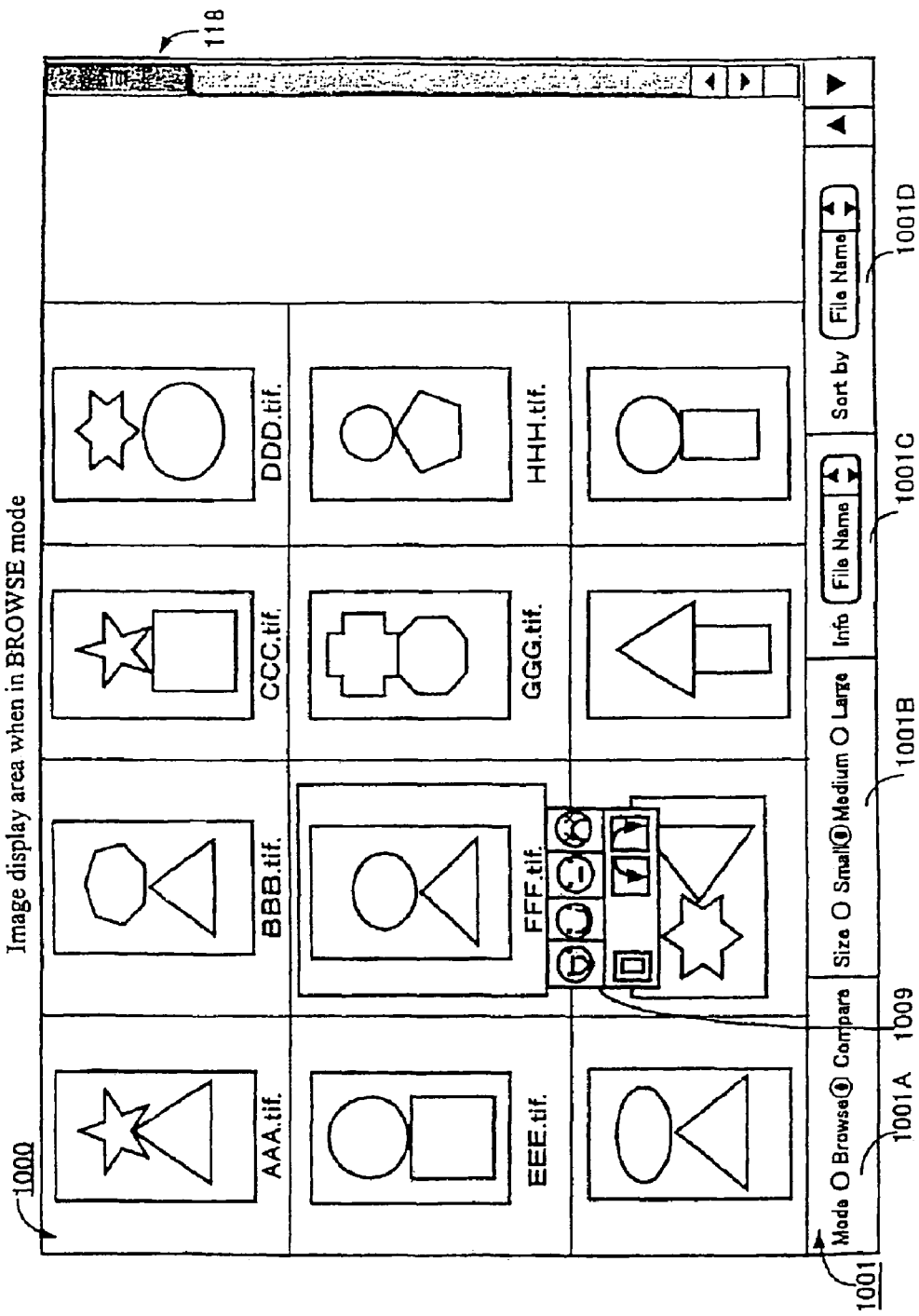
FIG. 11 is a drawing showing image display area 118 of retoucher main window 110 when in BROWSE mode.
Figure 12:
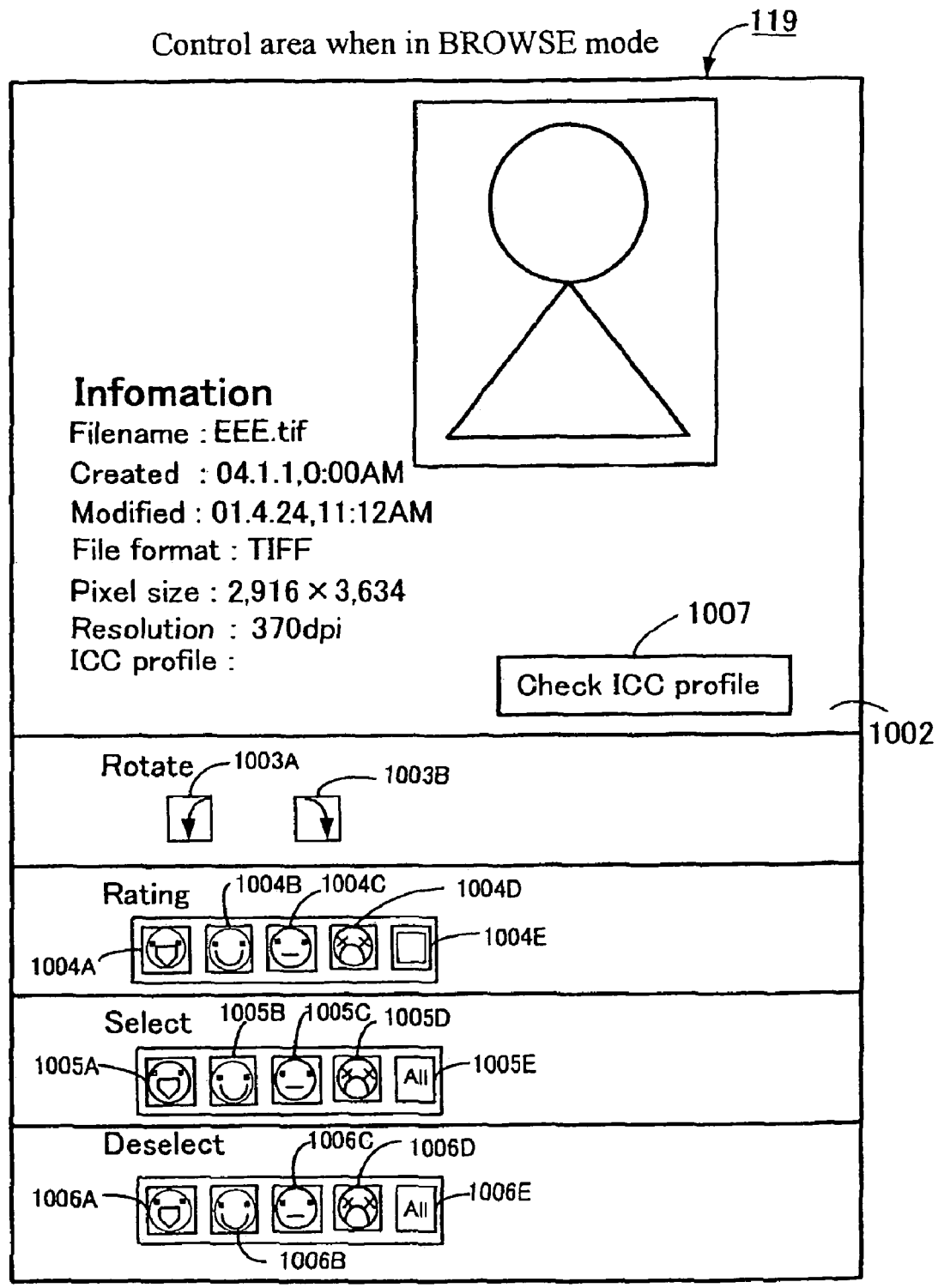
FIG. 12 is a drawing showing control area 119 when in BROWSE mode.

FIG. 11 shows image display area 118 of retoucher main window 110 when in BROWSE mode, and FIG. 12 shows control area 119 when in BROWSE mode.

Upon instruction from a user to launch special photo retoucher 11, special photo retoucher 11 is launched, a screen such as is shown at FIG. 11 being displayed at image display area 118 of retoucher main window 110 (see FIG. 5), and a screen such as is shown at FIG. 12 being displayed at control area 119. Describing this in more specific terms, special photo retoucher 11 opens thumbnail view 1000 and thumbnail toolbar 1001 at image display area 118 as shown at FIG. 11, and opens information view 1002, ROTATE buttons 1003A and 1003B, RATING buttons 1004A through 1004E, SELECT buttons 1005A through 1005E, and DESELECT buttons 1006A through 1006E at control area 119 as shown at FIG. 12.

Thumbnail view 1000 is an area wherein photo image(s) is or are displayed in thumbnail fashion. The first time that it launched, special photo retoucher 11 displays nothing at thumbnail view 1000; the second and subsequent times that it is launched, it reads thumbnail file(s) created as described below to display, at thumbnail view 1000 as shown at FIG. 11, thumbnail image(s) which was or were displayed at the time of the preceding termination (i.e., the preceding time that QUIT button 124 was clicked) of special photo retoucher 11 (selection of folder(s) from which photo image(s) is or are to be read during browse may be accepted by prescribed method(s) from user(s); e.g., by way of an image input selection view (not shown) displayed when an OPEN/CLOSE toggle button, not shown, at retoucher main window 110 is clicked). Upon selection of particular thumbnail image(s) at thumbnail view 1000 by user(s) (e.g., by single-clicking a mouse or placing a mouse-directed cursor on thumbnail image(s)), special photo retoucher 11 causes rotate/rating window 1009 to be displayed in popup fashion in the vicinity of such selected thumbnail image(s) as shown in FIG. 11, and moreover, causes enlarged image(s) of such selected thumbnail image(s) and information pertaining to such image(s) (e.g., file name(s), file creation date(s), file modification date(s), etc.) to be displayed at information view 1002 as shown in FIG. 12. Note that a plurality of thumbnail images may be caused to be selected at thumbnail view 1000 by employing prescribed method(s) (e.g., by clicking on thumbnail images one after the other while pressing the CTRL key at a keyboard).

At rotate/rating window 1009 which is displayed in popup fashion, upon selection by user(s) of any of four face emblems for facilitating determination of whether image(s) is or are wanted/unwanted (in other words, for setting importance (a.k.a. priority) of image(s)), special photo retoucher 11 causes selected face emblem(s) to be set for currently selected image(s) (face emblem(s) caused to be set may be displayed together with thumbnail image(s) at thumbnail view 1000). Furthermore, if either of the two arrow-shaped marks at rotate/rating window 1009 is selected, special photo retoucher 11 causes currently selected thumbnail image(s) to be rotated in place in the direction indicated by the arrow of the foregoing selected arrow-shaped mark (rotated to the right or rotated to the left) through prescribed rotational angle(s) (e.g., 90 degrees).

Now, when special photo retoucher 11 reads photo image file(s) from folder(s) selected by user(s) and creates thumbnail image(s) which it displays at thumbnail view 1000, it creates thumbnail file(s) containing such thumbnail image(s) and saves created thumbnail file(s) to folder(s) (hereinafter referred to as "thumbnail folder(s)") other than the folder(s) (hereinafter "original folder(s)") in which the foregoing original image file(s) was or were stored. Hereafter, if selection is made pursuant to the same original folder(s), reading is carried out not from such selected original folder(s), thumbnail file(s) corresponding to the foregoing selected original folder(s) being read instead from thumbnail folder(s), and thumbnail image(s) contained within thumbnail file(s) which was or were read is or are displayed (where original photo image(s) has or have not been edited, thumbnail image(s) displayed here is or are the same as thumbnail image(s) for such photo image(s)). Because this permits elimination of the need to create thumbnail image(s) each time that photo image(s) is or are to be displayed in thumbnail fashion, the second and subsequent times that photo image(s) from the same original folder(s) is or are displayed in thumbnail fashion it is possible to carry out thumbnail display faster than would be the case if thumbnail image(s) had to be created. Moreover, thumbnail file(s) which is or are created may contain not only thumbnail image(s) but also specific type(s) of information; e.g., thumbnail image source ICC profile(s) and working ICC profile(s) (displayed thumbnail image(s) may be subjected to color conversion based on such ICC profile(s)), information reflecting enhancement(s) (e.g., cropping information, rotational information, retouch mask layer(s), APF parameter(s), etc.) applied to photo image(s) corresponding to such thumbnail image(s), and so forth.

Repeated reference is now made to FIG. 11.

Thumbnail toolbar 1001 is a user interface by means of which special photo retoucher 11 is able to accept request(s) from user(s) for toggling between or among styles in connection with display at image display area 118. Thumbnail toolbar 1001 possesses MODE selection area 1001A, SIZE selection area 1001B, INFO selection area 1001C, and SORT BY selection area 1001D.

Figure 13:
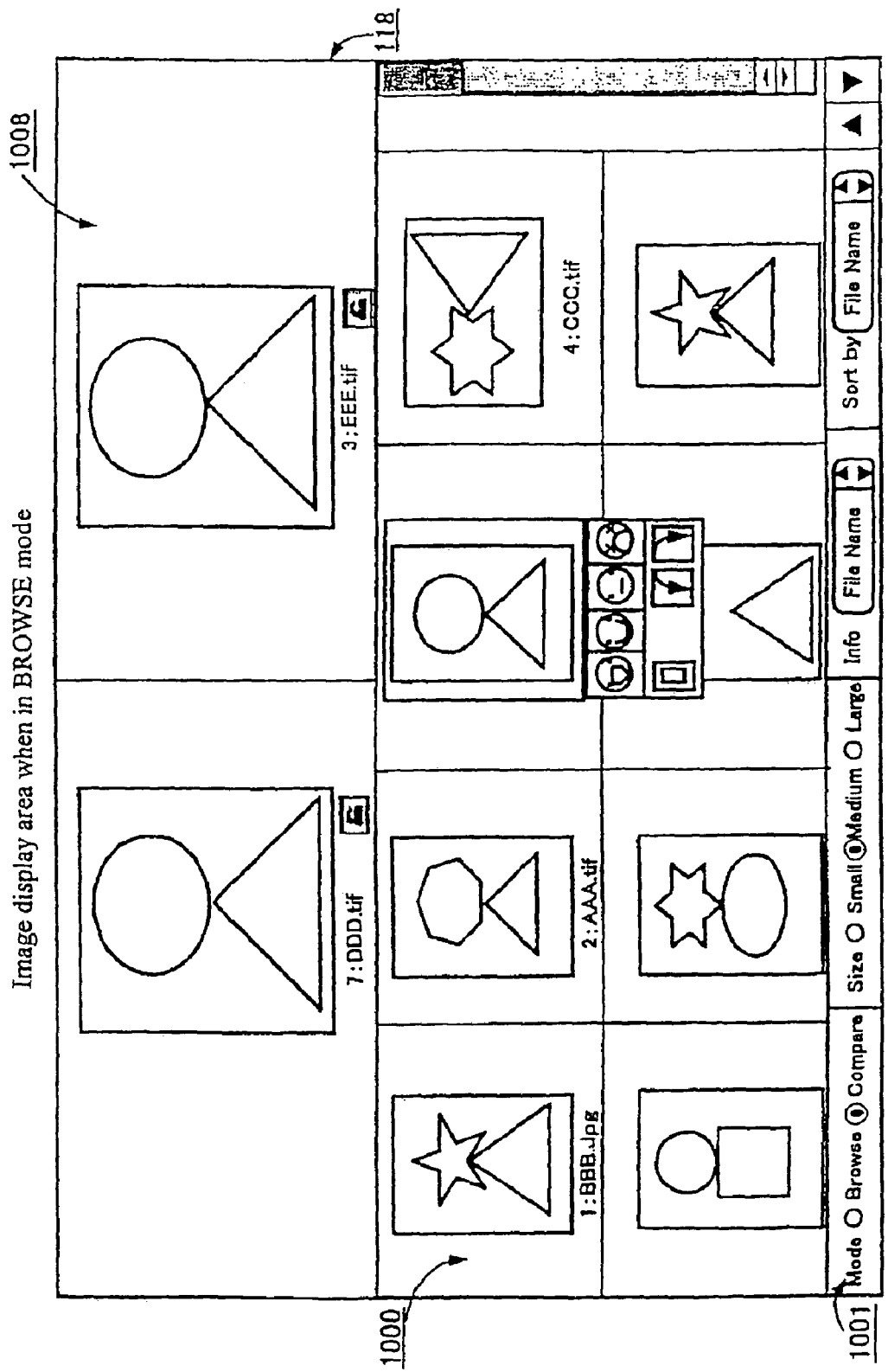
FIG. 13 is a drawing showing image display area 118 when in BROWSE mode at a time when COMPARE mode is selected from within BROWSE mode.

At MODE selection area 1001A, user(s) may select particular thumbnail display style(s) from among a plurality of thumbnail display styles. In more specific terms, if a user selects BROWSE mode, special photo retoucher 11, as shown in FIG. 11, opens thumbnail view 1000 to substantially fill image display area 118, depicting thumbnail image(s) therein (this being the default setting). On the other hand, if a user selects COMPARE mode, special photo retoucher 11, as shown in FIG. 13, opens thumbnail view(s) (hereinafter compare view) 1008 other than thumbnail view 1000 (editing processing carried out using compare view 1008 will be described below).

At SIZE selection area 1001B, user(s) may select desired image size(s) from among a plurality of image sizes for displayed thumbnail image(s). In more specific terms, if a user selects SMALL size, special photo retoucher 11 displays thumbnail image(s) such that it or they are of small size (e.g., 80×80 pixels). Alternatively, if a user selects MEDIUM size, special photo retoucher 11 displays thumbnail image(s) such that it or they are of medium size (e.g., 160×160 pixels) (this being the default size). Or alternatively again, if a user selects LARGE size, special photo retoucher 11 displays thumbnail image(s) such that it or they are of large size (e.g., 320×320 pixels).

At INFO selection area 1001C, user(s) may select, from among a plurality of types (e.g., file name, file creation date, file modification date, display nothing), type(s) of image information to be displayed together with thumbnail image(s) at thumbnail view 1000. As a specific example, if, as shown in FIG. 11, a user selects FILE NAME, special photo retoucher 11 displays respective file name(s) beneath respective thumbnail image(s) depicted at thumbnail view 1000 (the default being set to FILE NAME).

At SORT BY selection area 1001D, user(s) may, from among a plurality of types of image information (e.g., file name, file creation date, file modification date, importance), select type(s) to be used as basis or bases for arrayal of thumbnail image(s) displayed at thumbnail view 1000. As a specific example, if, as shown in FIG. 11, a user selects FILE NAME, special photo retoucher 11 arrays thumbnail image(s) based on file name(s) (the default being set to FILE NAME); or if IMPORTANCE is selected, thumbnail image(s) is or are arrayed based on the foregoing thumbnail image importance setting (e.g., in order of height).

As has already been noted, enlarged image(s) of thumbnail image(s) selected at thumbnail view 1000 and image information for such image(s) (e.g., file name(s), file creation date(s), file modification date(s), image size(s), etc.) are displayed at information view 1002 shown in FIG. 12. In addition, CHECK ICC PROFILE button 1007 may also be displayed. If this CHECK ICC PROFILE button 1007 is clicked, special photo retoucher 11 displays the contents of ICC profile(s) set for currently selected thumbnail image(s).

ROTATE buttons 1003A and 1003B are buttons for causing one or more thumbnail image(s) currently selected at thumbnail view 1000 to be rotated in place to the right or to the left through prescribed rotational angle(s) (e.g., 90 degrees).

Buttons 1004A through 1004D, included among RATING buttons 1004A through 1004E, are buttons for causing importance(s) desired by user(s) to be set for one or more thumbnail image(s) currently selected at thumbnail view 1000, and button 1004E is a button for clearing any importance(s) that may have been set for selected thumbnail image(s) (i.e., for making it or them such that no importance is set therefor).

Buttons 1005A through 1005D, included among SELECT buttons 1005A through 1005E, are buttons for simultaneously selecting all thumbnail image(s), from among one or a plurality of thumbnail image(s) currently selected at thumbnail view 1000, for which face emblem(s) shown on respective button(s) 1005A through 1005D (importance(s) corresponding thereto) is or are set. Button 1005E is a button for simultaneously selecting all thumbnail image(s) displayed at thumbnail view 1000.

Buttons 1006A through 1006D, included among DESELECT buttons 1006A through 1006E, are buttons for simultaneously deselecting all thumbnail image(s), among one or a plurality of thumbnail image(s) currently selected at thumbnail view 1000, for which face emblem(s) shown on respective button(s) 1006A through 1006D (importance(s) corresponding thereto) is or are set. Button 1006E is a button for simultaneously deselecting all thumbnail image(s) displayed at thumbnail view 1000.

Responsive to button(s) selected by user(s) among these buttons 1003A and 1003B, 1004A through 1004E, 1005A through 1005E, and/or 1006A through 1006E, special photo retoucher 11 may cause thumbnail image(s) desired by user(s) among thumbnail image(s) displayed at thumbnail view 1000 to be selected (or deselected), may cause such thumbnail image(s) to be rotated, and/or may cause importance(s) to be set for such thumbnail image(s). Also, while not especially shown in the drawings, special photo retoucher 11 may be designed such that special photo retoucher 11 is capable of displaying a user interface (button(s), combination box(es), etc.) for accepting instruction(s) from user(s) for rotational angle(s) desired by user(s) and/or for causing thumbnail image(s) desired by user(s) to be displayed in inverted fashion such that top and bottom, and/or left and right, are flipped, and is capable of causing thumbnail image(s) desired by user(s) to be rotated through rotational angle(s) desired by user(s) and/or displayed in inverted fashion such that top and bottom, and/or left and right, are flipped based on content of input obtained by way of that user interface.

Now, by using special photo retoucher 11 and selecting COMPARE mode in area 1001A at thumbnail toolbar 1001, a user may view and compare at the same screen any two desired images among thumbnail image(s) displayed at thumbnail view 1000.

That is, as shown in FIG. 13, upon selection of the foregoing COMPARE mode by a user, special photo retoucher 11 relocates the display locus or loci of thumbnail view 1000 to a region in the lower half of image display area 118, and displays compare view 1008 in a region in the upper half of image display area 118. Immediately after displaying compare view 1008 there is nothing displayed therein, but when thumbnail image(s) is or are selected at thumbnail view 1000, special photo retoucher 11 displays selected thumbnail image(s) in a region in the right half of compare view 1008 at prescribed size(s) (hereinafter "image size(s) for comparison") larger than that or those of the selected thumbnail image(s) (image(s) displayed at compare view 1008 is or are hereinafter referred to as "image(s) subject to comparison"). When other thumbnail image(s) is or are thereafter selected at thumbnail view 1000, special photo retoucher 11 displays selected other thumbnail image(s) in a region in the left half of compare view 1008 at image size(s) for comparison, relocating and displaying in the right half region any image(s) subject to comparison which was or were being displayed in the left half region prior thereto. Then, each time that thumbnail image(s) is or are selected at thumbnail view 1000, special photo retoucher 11 ordinarily (e.g., if the lock functionality described below is not in use) displays the most recently selected image(s) in the left half region at image size(s) for comparison, and in accompaniment thereto, relocates and displays in the right half region any image(s) subject to comparison which was or were being displayed in the left half region, in first-in first-out fashion (but of course this need not be limited to first-in first-out fashion). Moreover, when thumbnail image(s) is or are displayed at compare view 1008 as image(s) subject to comparison, special photo retoucher 11 displays such thumbnail image(s) such that it or they is or are corrected based on the foregoing specific type(s) of information (e.g., source ICC profile(s), working ICC profile(s), retouch mask layer(s), APF parameter(s)) contained in thumbnail file(s) wherein such thumbnail image(s) is or are recorded.

In the vicinity or vicinities of bottom(s) of image(s) subject to comparison, special photo retoucher 11 displays information pertaining to such image(s) (e.g., file name(s)) and LOCK button(s) (button(s) showing picture(s) of lock(s)) (and also displays image importance(s) (face emblem(s)) where it or they has or have been set for image(s)). LOCK button(s) is or are for locking image(s) subject to comparison so as to prevent location(s) at which image(s) subject to comparison is or are displayed from being relocated in first-in first-out fashion, and for releasing such lock (there are two image(s) subject to comparison shown in FIG. 13, both of which are in an unlocked state (the lock is in its released state)). In the event that particular image(s) displayed at compare view 1008, e.g., an image displayed in the left half region, is or are clicked when LOCK button(s) thereof is or are in the unlocked state, special photo retoucher 11 will lock such image(s) such that it or they assume a locked state (at which time(s), picture(s) of lock(s) shown on LOCK button(s) will be toggled to picture(s) of lock(s) in its or their locked state). Until such LOCK button(s) is or are again clicked, special photo retoucher 11 maintains displayed location(s) of image(s) subject to comparison in the left half region so as to prevent image(s) subject to comparison from being relocated to the right half region, causing the most recently selected image(s) at thumbnail view 1000 to be displayed in the right half region only. In addition, when such LOCK button(s) (i.e., LOCK button(s) when in its or their locked state) is or are again clicked, special photo retoucher 11 releases it or them from their locked state, causing image(s) selected at thumbnail view 1000 to be displayed at compare view 1008 in the aforementioned first-in first-out fashion.

Note that whereas the number of image(s) subject to comparison that are capable of being displayed at compare view 1008 is two in the present embodiment, it is of course also possible to design special photo retoucher 11 such that two or more images subject to comparison are arrayed and compared.

Above, BROWSE mode has been described. As already described, when processing proceeds from BROWSE mode to TRIM mode, special photo retoucher 11 reads photo image file(s) selected while in BROWSE mode, opening such photo image file(s). When such photo image file(s) is or are opened, special photo retoucher 11 converts such photo image data to image data belonging to working color space(s) defined by working ICC profile(s) set while in BROWSE mode. At such time(s), if ICC profile(s) previously embedded in such photo image file(s) (or ICC profile(s) assumed as such) is or are set as working ICC profile(s), special photo retoucher 11 makes no special change to the photo image data thereof when it opens such photo image file(s). In contradistinction hereto, if working ICC profile(s) is or are set which is or are different from ICC profile(s) previously embedded in such photo image file(s) (or assumed as such), special photo retoucher 11 carries out perceptual color matching on such photo image data based on such embedded ICC profile(s) and working ICC profile(s) when it opens such photo image file(s). Moreover, by means of this color matching, such photo image data is adjusted so as to cause color(s) most closely approximating color(s) represented in the color space defined by the previous ICC profile to be represented in the working color space (hereafter, with every application of an enhancement at TRIM, RETOUCH, COLOR/TONE, and EFFECT modes, this processing is carried out on the post-enhancement photo image(s) resulting therefrom).

Furthermore, after BROWSE mode, it is often the case that progress from one mode to another follows the order in which buttons 111 through 116 are arrayed from left to right at retoucher main window 110 (i.e., the order of retouching operations typically carried out by a user), and when special photo retoucher 11 proceeds from one mode to another pursuant to this order (i.e., when going from the current mode to a mode downstream therefrom) image(s) subjected to editing in the preceding mode enters or enter the subsequent mode such that the results of editing applied thereto are incorporated therein (i.e., image(s) displayed immediately after entering the subsequent mode is or are such that image(s) subjected to editing in the preceding mode incorporates or incorporate the results of editing applied therein). If, for example, responsive to user request in BROWSE mode, special photo retoucher 11 proceeds to TRIM mode having rotated selected image(s) 90 degrees to the right, in displaying image(s) subjected to editing when TRIM mode is entered, such image(s) will be rotated 90 degrees to the right.

In contradistinction hereto, when going from one mode to another in an order reverse with respect to the order in which buttons 111 through 116 are arrayed from left to right (i.e., when proceeding from the current mode to a mode upstream therefrom), special photo retoucher 11 causes the results of editing applied to image(s) subjected to editing in the preceding mode to be reset (i.e., to be such that the results of editing are not incorporated therein) upon entering the subsequent mode. However, when again returning to the immediately preceding mode preceding the transition from mode to mode, image(s) displayed incorporate results of editing applied in such mode(s).

Special photo retoucher 11 saves results of editing performed in respective mode(s) (values of parameters set therein) notwithstanding transition(s) to other mode(s). Results of editing performed in respective mode(s) are at prescribed time or times, e.g., both/either (1) when nothing is selected at BROWSE mode (when switching editing screens) and/or (2) upon termination of special photo retoucher 11, results of editing performed in respective mode(s) which had been saved are deleted (as a specific example hereof, at both/either the foregoing time(s) (1) and/or (2) a dialog box might be displayed asking a user whether it alright to carry out deletion, with results of editing performed in respective mode(s) being deleted in the event of input to the effect that it is alright to do so, or with results of editing performed in respective mode(s) being left undeleted in the event of input to the effect that deletion should not be carried out and that such results should be left undeleted). Furthermore, where results of editing are saved, if previously created thumbnail file(s) contain thumbnail image(s) for pre-editing version(s) of image(s) to which such results of editing have been applied, special photo retoucher 11 uses such results of editing to update such thumbnail file(s).

Next, TRIM mode will be described.

Figure 14:
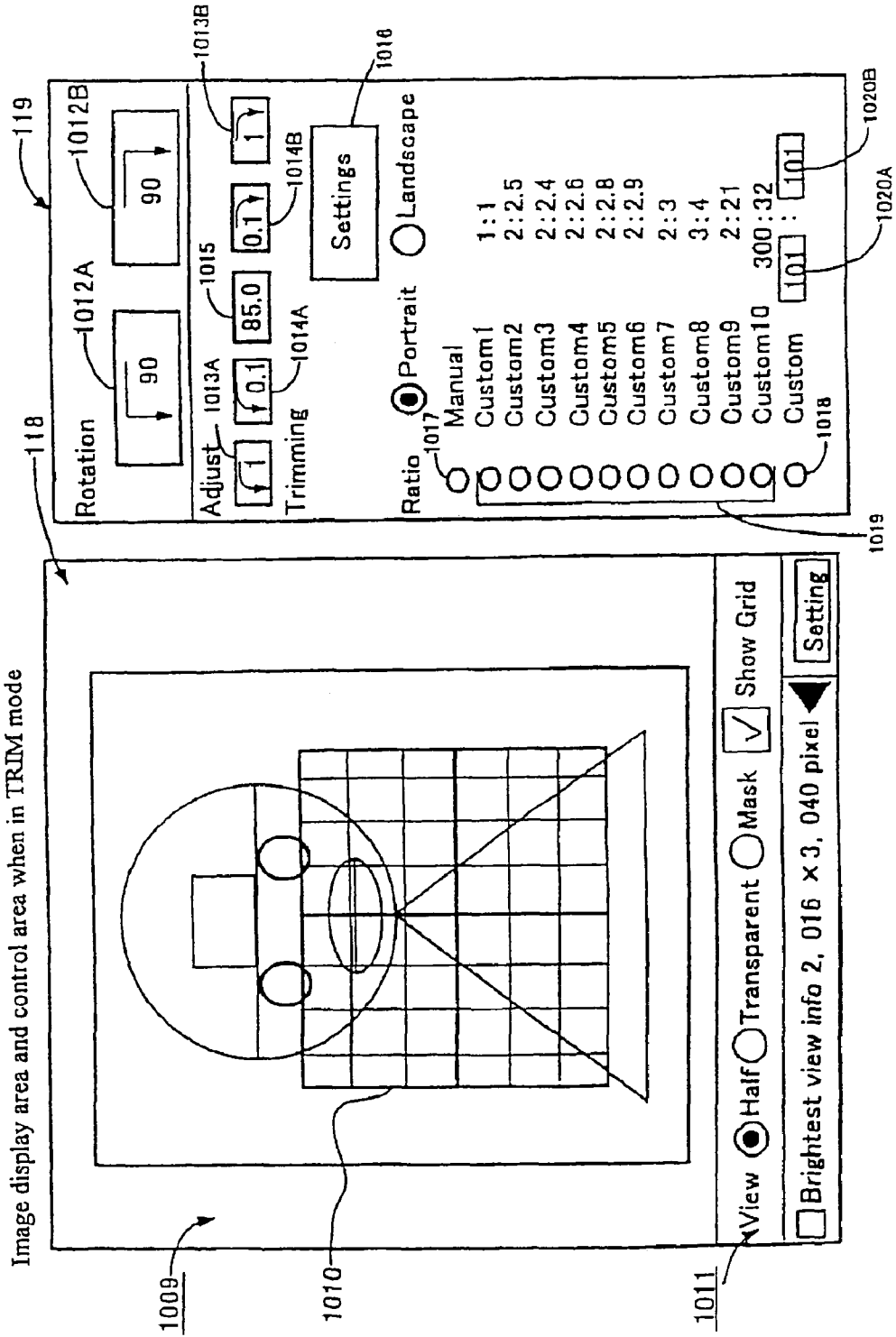
FIG. 14 is a drawing showing an image display area and a control area when in TRIM mode.

FIG. 14 shows an image display area and a control area when in TRIM mode.

Upon entering TRIM mode, special photo retoucher 11 opens trim view 1009 and cropping toolbar 1011 in image display area 118, and displays in control area 119 various buttons 1012A through 1014B and 1016, radio button(s) for specifying aspect ratio(s) (hereinafter "cropping aspect ratio(s)") of cropping frame(s) 1010, described below, and so forth. Furthermore, special photo retoucher 11 displays, at trim view 1009 in image display area 118, photo image(s) selected while in BROWSE mode (if rotation was caused to be set while in BROWSE mode, display will incorporate same).

By default (immediately after entering TRIM mode), special photo retoucher 11 causes rectangular cropping frame(s) 1010 to be set such that it or they overlap the upper periphery of trim view 1009. By placing mouse cursor(s) on cropping frame(s) 1010 and dragging, user(s) may specify locus or loci to be extracted from photo image(s), and furthermore, by placing cursor(s) within specified locus or loci (e.g., at time(s) when such a cursor might switch to a picture of a person's hand) and dragging, specified locus or loci may be moved. Special photo retoucher 11 crops away region(s) outside cropping frame(s) 1010 specified by user(s) so as to extract only region(s) inside such cropping frame(s) 1010.

Furthermore, throughout this processing, special photo retoucher 11 displays region(s) outside cropping frame(s) 1010 in color(s) as set at cropping toolbar 1011 (e.g., in a color as desired by a user and at a transparency of 50%, in a shade of gray, etc.).

Moreover, if the SHOW GRID check box at cropping toolbar 1011 is selected, special photo retoucher 11 will display grid line(s) within cropping frame(s) 1010 as shown in FIG. 14. This facilitates adjustment of size and position of cropping frame(s) 1010. Note that positional fiduciaries for assisting in positioning of cropping frame(s) 1010 are not limited to grid line(s), it also being possible for example to employ ruler(s), center mark(s) indicating center(s) of region(s) enclosed by cropping frame(s) 1010, and/or other such fiduciaries. Furthermore, inasmuch as "positioning" as used here refers not to positioning of particular point(s) on cropping frame(s) 1010 but to overall positioning of cropping frame(s) 1010, the foregoing grid line(s) may also serve to assist in setting of inclination and/or size of cropping frame(s) 1010.

In addition, each time that rotation button 1012A or 1012B at control area 119 is clicked, special photo retoucher 11 causes image(s) displayed at trim view 1009 to be rotated 90 degrees to the left or to the right (note that at such time(s) cropping frame(s) 1010 is or are also caused to be rotated together with image(s)). Furthermore, if image inclination adjustment button 1013A, 1013B, 1014A, and/or 1014B is or are clicked, special photo retoucher 11 maintains cropping frame(s) 1010, shown in the foreground, such that current settings thereof (i.e., current display position(s), size(s), and angle(s)) are left unchanged while only image(s), shown in the background, is or are rotated in 1-degree or 0.1-degree steps to the left or to the right (conversely, image(s) may be maintained unchanged while only cropping frame(s) 1010 is or are rotated). At such time(s), if cropping frame(s) 1010 extend beyond image(s), special photo retoucher 11 reduces the size(s) of cropping frame(s) 1010 so as to prevent cropping frame(s) 1010 from extending beyond such image(s). Special photo retoucher 11 displays at image inclination display field 1015 the number of degrees that displayed image(s) is or are rotated to the right (in other words, the inclination(s) of the current image(s)).

Also, if cropping aspect ratio(s) has or have previously been specified by user(s) at control area 119, no matter how user(s) might perform the foregoing drag operation special photo retoucher 11 controls the aspect ratio(s) of the cropping frame(s) 1010 set thereby so as to have the foregoing specified aspect ratio(s). Here, when image(s) displayed at trim view 1009 is or are long vertically (or when displayed as long horizontally due to rotation), special photo retoucher 11 places mark(s) in PORTRAIT radio button(s) at control area 119, setting the shape(s) of cropping frame(s) 1010 so as to be rectangle(s) which is or are long vertically. On the other hand, when image(s) displayed at trim view 1009 is or are long horizontally (or when displayed as long vertically due to rotation), special photo retoucher 11 places mark(s) in LANDSCAPE radio button(s) at control area 119, setting the shape(s) of cropping frame(s) 1010 so as to be rectangle(s) which is or are long horizontally. Following such setting, user(s) may freely choose and set shape(s) of cropping frame(s) 1010 so as to be long vertically and/or long horizontally.

Specification of cropping aspect ratio(s) may be carried out by means of any of (A) manual specification, (B) direct specification, and/or (C) selective specification.

If (A) manual specification is to carried out, user(s) places or place mark(s) in MANUAL radio button(s) 1017 at control area 119. By thereafter dragging cropping frame(s) with a mouse, user(s) may freely change cropping aspect ratio(s) of cropping frame(s) 1010 (i.e., shape(s) of cropping frame(s) 1010 may be made long vertically and/or long horizontally).

If (B) direct specification is to carried out, user(s) places or place mark(s) in the bottommost radio button(s) 1018 at control area 119. User(s) thereafter enter value(s) for one term or set of terms for desired cropping aspect ratio(s) at input field(s) 1020A, and enter value(s) for the other such term or set of terms at input field(s) 1020B, these fields being located in the same row(s) as such radio button(s). As a result hereof, no matter how user(s) might thereafter change the size(s) of cropping frame(s) 1010 by dragging with mouse(s), special photo retoucher 11 controls the cropping aspect ratio(s) of cropping frame(s) 1010 so as to maintain cropping aspect ratio(s) entered at input field(s) 1020A and/or input field(s) 1020B. In more specific terms, if for example cropping aspect ratio is "3:4" and the shape of cropping frame 1010 is set so as to be long vertically (portrait), special photo retoucher 11 constantly controls the rectangular shape of cropping frame 1010 such that it is maintained at "vertical dimension:horizontal dimension=4:3"; or alternatively, if the shape of cropping frame 1010 is set so as to be long horizontally (landscape), the rectangular shape of cropping frame 1010 is controlled such that it is maintained at "vertical dimension: horizontal dimension=3:4".

If (C) selective specification is to carried out, user(s) places or place mark(s) in that or those radio button(s) 1018 corresponding to desired cropping aspect ratio(s) among plurality of radio buttons(s) 1019. As a result hereof, no matter how user(s) might thereafter change the size of cropping frame(s) 1010 by dragging with mouse(s), special photo retoucher 11 controls the cropping aspect ratio(s) of cropping frame(s) 1010 so as to maintain cropping aspect ratio(s) selected by user(s) in correspondence to whether the shape(s) of cropping frame(s) 1010 was or were set so as to be long vertically and/or long horizontally.

As a result of specification by user(s) of cropping aspect ratio(s) by means of such method(s) (B) and/or (C), it is possible to make the aspect ratio(s) of image region(s) which is or are left as a result of cropping always be desired aspect ratio(s).

Moreover, choices for cropping aspect ratio(s) may be preprepared in default fashion or may be furnished by the user(s) him/herself or selves. Where choices for cropping aspect ratio(s) is or are to be furnished by the user(s) him/herself or selves, user(s) clicks or click SETTINGS button 1016. Upon so doing, special photo retoucher 11 displays CUSTOM TRIM SETTINGS dialog box 1021 shown in FIG. 15. At CUSTOM TRIM SETTINGS dialog box 1021, user(s) may input desired cropping aspect ratio(s) and name(s) for identification thereof (e.g., "regular photo", "panorama size", etc.) (clicking the DEFAULT button makes it possible to revert to cropping aspect ratio(s) preprepared in default fashion). Thereafter clicking on OK causes special photo retoucher 11 to display at control area 119 the cropping aspect ratio(s) and identifying name(s) which were input at that dialog box 1021.

Figure 16:
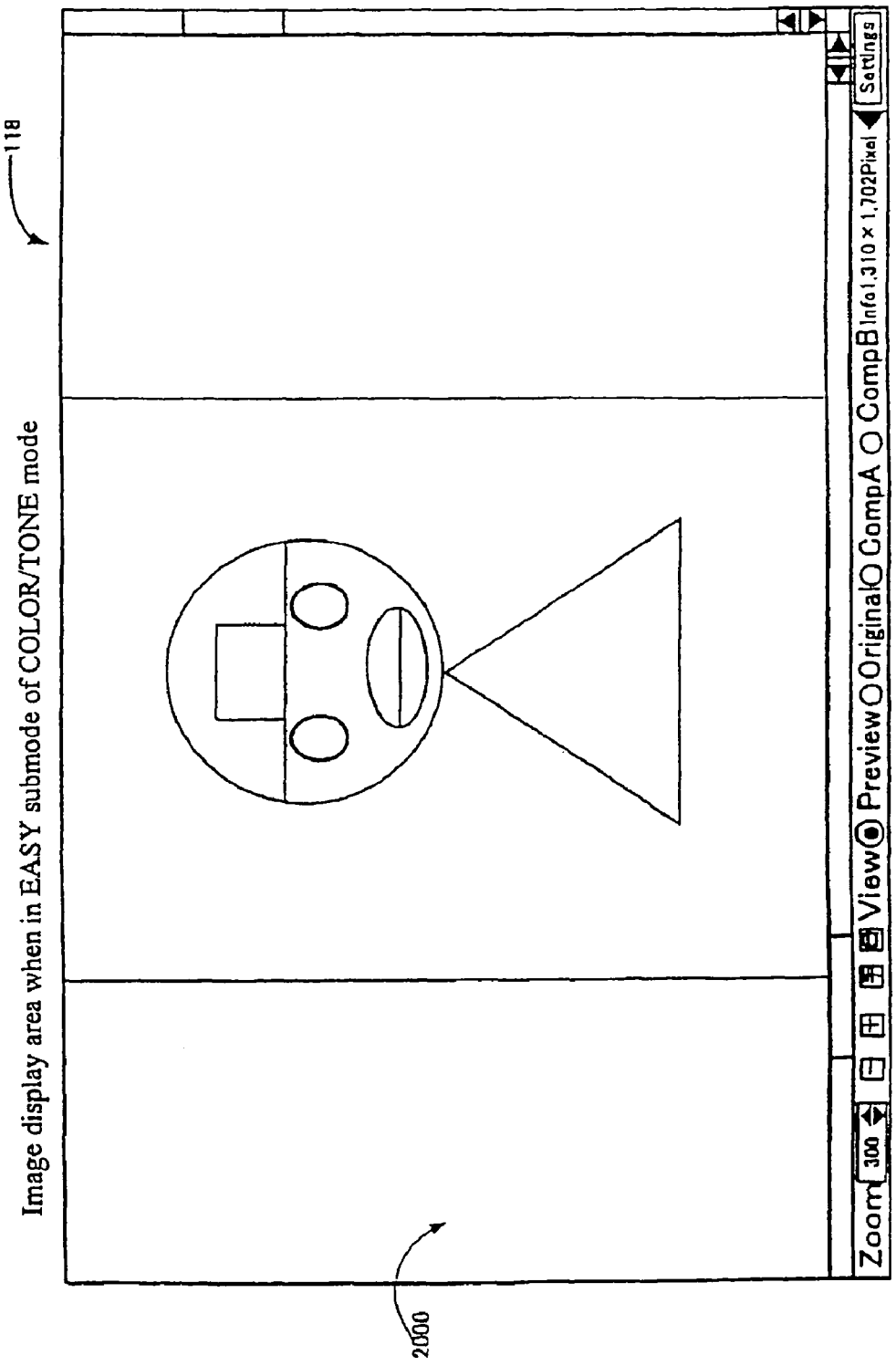
FIG. 16 is a drawing showing SLIDE TABLE window 1022.

Above, TRIM mode has been described. Furthermore, special photo retoucher 11 is such that thumbnail image(s) browsed during BROWSE mode may also be viewed responsive to user request during the course of editing operations performed while in TRIM mode (or alternatively not only there but also during the course of editing operations performed while in other mode(s)). In more specific terms, special photo retoucher 11 is such that when the aforementioned OPEN/CLOSE toggle button, not shown, is clicked while in TRIM mode, SLIDE TABLE window 1022 is displayed at image display area 118 as shown in FIG. 16, thumbnail image(s) displayed at thumbnail view in BROWSE mode being displayed in list fashion at this window 1022 (Note that the image(s) displayed here need not include all of the thumbnail image(s) which was or were displayed at BROWSE mode. Any type(s) of image(s) may be used, such as, for example, image(s) having comparatively high importance setting(s); or, where reservation request(s) is or are received from user(s), image(s) requested to be reserved pursuant to such request(s); etc.).

Next, RETOUCH mode will be described.

Figure 17:
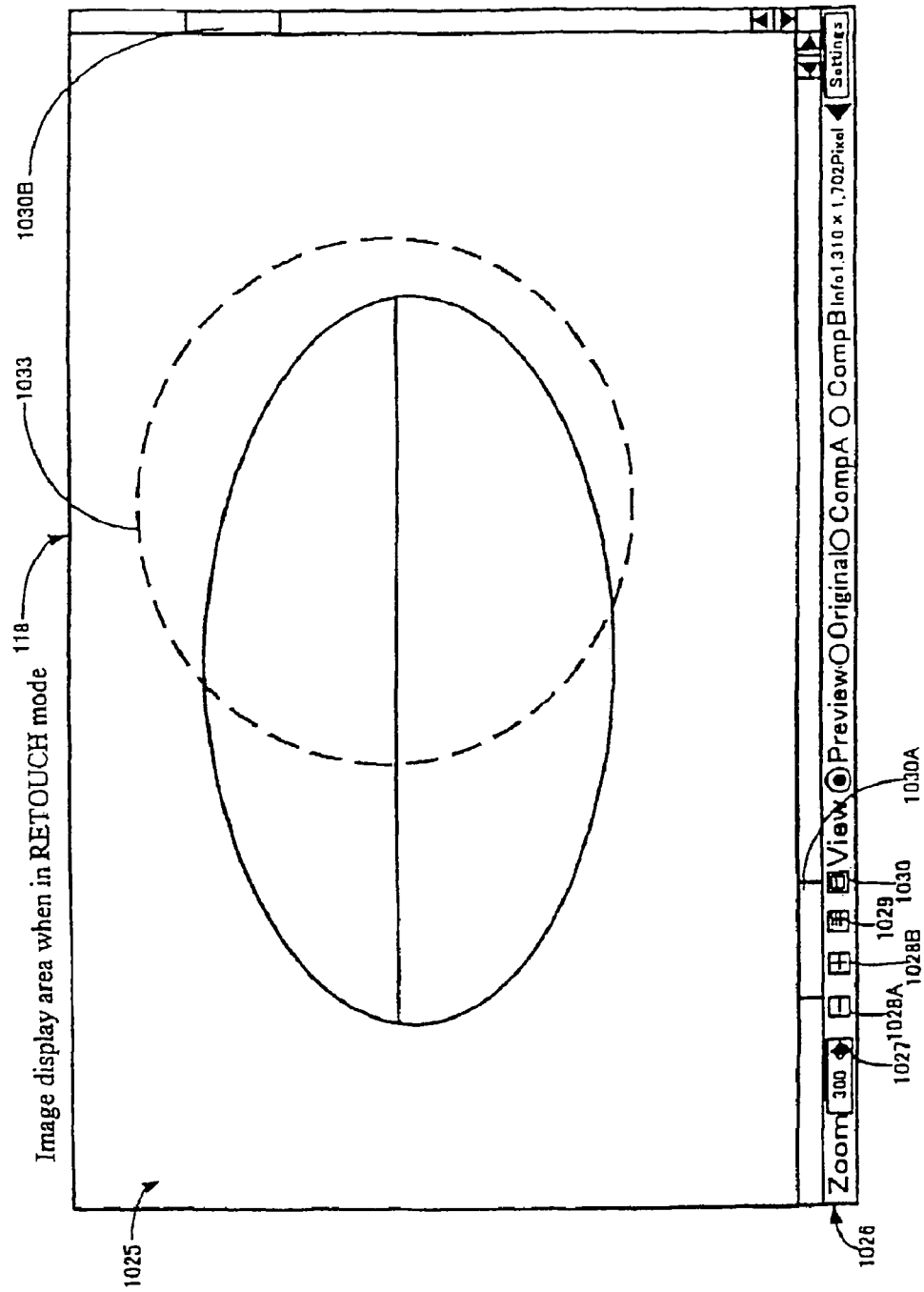
FIG. 17 is a drawing showing image display area 118 when in RETOUCH mode.
Figure 18:
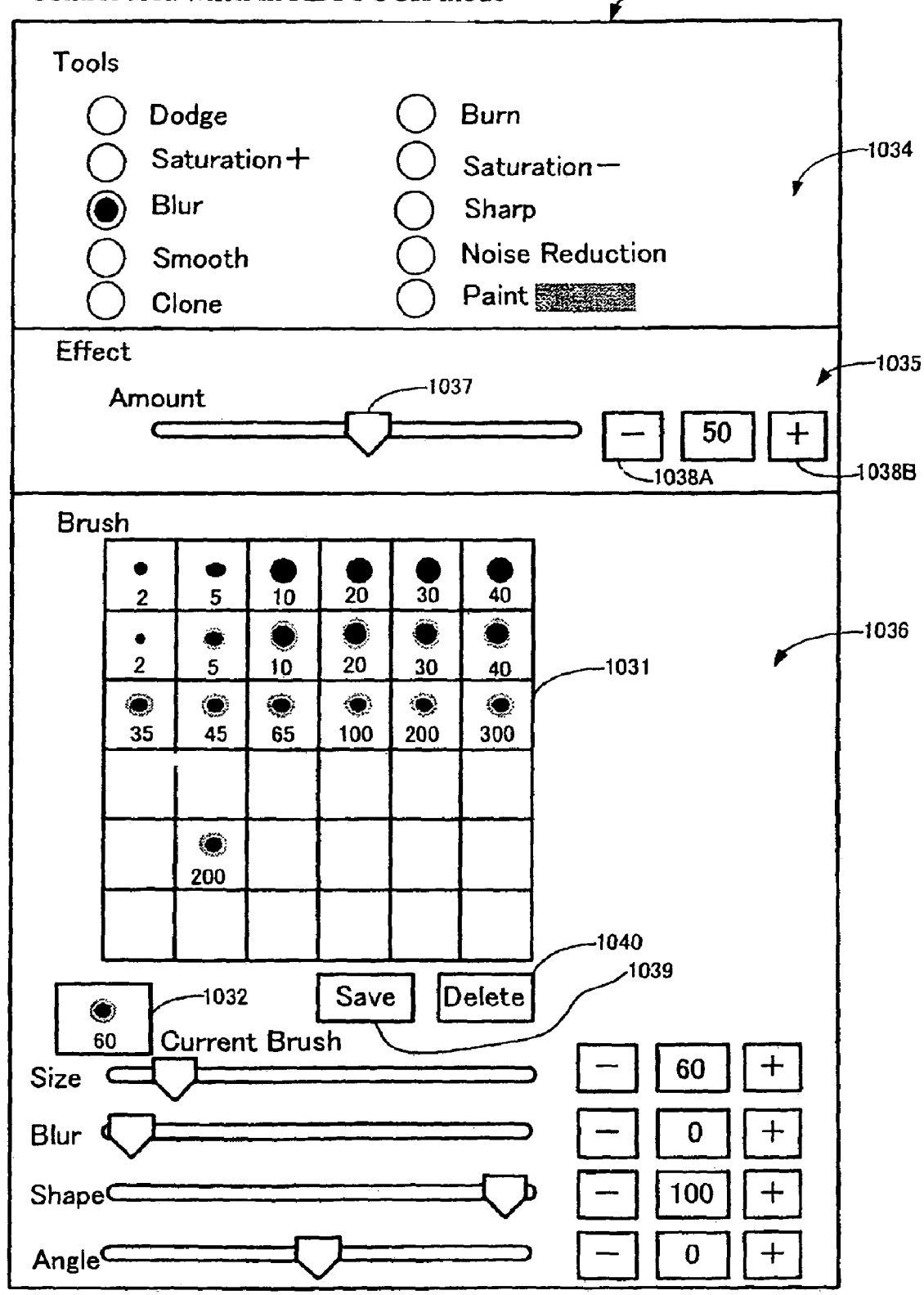
FIG. 18 is a drawing showing control area 119 when in RETOUCH mode.

FIG. 17 shows image display area 118 when in RETOUCH mode, and FIG. 18 shows control area 119 when in same mode.

Upon entering RETOUCH mode, special photo retoucher 11 opens retouch view 1025 and retouch toolbar 1026 in image display area 118 as shown in FIG. 17, and as shown in FIG. 18 displays in control area 119 a number of selectable choices of prescribed retouching tools frequently used at photo studios; slider bar(s) for adjusting intensity or intensities of enhancement effect(s); list(s) of plurality or pluralities of brushes of different size, degree of blurring, shape, and angle; and a plurality of slider bars for adjusting size, degree of blurring, shape, and angle of respective brush(es).

First, special photo retoucher 11 displays at retouch view 1025 of image display area 118 the full extent of photo image region(s) (hereinafter "extracted image region(s)") extracted in TRIM mode. Here, special photo retoucher 11 is such that when combination box 1027 and/or button(s) 1027A and/or 1027B is or are actuated by user(s), extracted image region(s) displayed at retouch view 1025 is or are enlarged and/or reduced in correspondence to such actuation. Furthermore, special photo retoucher 11 is such that when button 1029 is clicked and mouse(s) is or are dragged at retouch view 1025, and/or slider bar(s) 1030A and/or 1030B is or are actuated, extracted image region(s) displayed at retouch view 1025 is or are scrolled in correspondence thereto. Also, when button 1030 is clicked, special photo retoucher 11 accepts specification from user(s) of image display locus or loci to be displayed at variation view (described in detail below) in the COLOR/TONE mode which follows (in more specific terms, scrollable image view(s), not shown, is or are opened, wherein the full extent of extracted image region(s) is or are shown and wherein, at such view(s), specification via mouse of field(s) to be displayed at variation view is solicited from user(s)), specified field(s) being displayed at variation view.

Furthermore, responsive to user request, special photo retoucher 11 changes the manner in which extracted image region(s) is or are displayed at retouch view 1025. Describing this in more specific terms, when the PREVIEW radio button is selected at retouch toolbar 1026, special photo retoucher 11 causes extracted image region(s) currently being edited to be displayed at retouch view 1025. But when the ORIGINAL radio button is selected, special photo retoucher 11 causes original image(s) (image(s) to which no editing processing has been applied; hereinafter "original image(s)") corresponding to extracted image region(s) to be displayed at retouch view 1025. And when the COMPARE A radio button is selected, special photo retoucher 11 causes retouch view 1025 to be split into two sections, original image(s) being displayed in one section and extracted image region(s) being displayed in the other section such that the two sections are respectively independent (i.e., such that if original image(s) in the one is or are for example scrolled responsive to user request, extracted image regions(s) in the other is or are not scrolled). But when the COMPARE B radio button is selected, special photo retoucher 11 causes retouch view 1025 to be split into two sections, original image(s) being displayed in one section and extracted image region(s) being displayed in the other section such that the two sections move in tandem (i.e., such that if original image(s) in the one is or are for example scrolled responsive to user request, simultaneously therewith extracted image regions(s) in the other is or are scrolled by the same amount and in the same direction as the one is scrolled).

As described above, special photo retoucher 11 is capable of controlling display of image(s) at retouch view 1025. Responsive to user request, special photo retoucher 11 permits application, on image(s) displayed at retouch view 1025 (but not on original image(s)), of enhancement processing through employment of brush(es) of size(s), degree(s) of blurring, shape(s), and angle(s) as desired by user(s). As shown in FIG. 18, special photo retoucher 11 displays tool(s) for creating and/or selecting brush(es) desired by user(s) in control area 119.

In more specific terms, special photo retoucher 11 is provided with TOOLS field 1034, EFFECT field 1035, and BRUSH field 1036 at control area 119, and a plurality of radio buttons for selecting a number of prescribed retouching tools are displayed at TOOLS field 1034. At TOOLS field 1034, in correspondence to selected radio button(s), special photo retoucher 11 applies, at brush(es) selected by user(s) and/or at locus or loci designated by user(s) at retouch view 1025, processing for any of (1) increasing brightness by prescribed value(s), (2) decreasing brightness by prescribed value(s), (3) increasing saturation by prescribed value(s), (4) decreasing saturation by prescribed value(s), (5) applying blurring pursuant to prescribed algorithm(s) (e.g., Gaussian blur algorithm(s)), (6) increasing sharpness, (7) increasing smoothness, (8) noise and/or color fringing artifact reduction (e.g., restoring to its or their original color(s) the color(s) of pixel(s) in particular region(s) which has or have acquired color(s) other than its or their original color(s)).

Furthermore, when the CLONE radio button at TOOLS field 1034 is clicked, special photo retoucher 11 carries out processing for copying locus or loci at retouch view 1025 as desired by user(s) to arbitrary user location(s) (where particular pixel(s) is or are specified by user(s), color(s) of such pixel(s) may also be sampled). Moreover, when the PAINT radio button is selected, special photo retoucher 11 solicits selection from the user of desired color(s) among a plurality of colors, and applies selected color(s) to brush(es) selected and/or newly created by user(s). And when mouse(s) is or are thereafter dragged over image(s) by user(s), special photo retoucher 11 carries out enhancement processing making use of such brush(es).

At EFFECT field 1035, special photo retoucher 11 displays slider bar 1037 and button(s) 1038A, 1038B. In correspondence to user actuation of such slider bar 1037 and/or button(s) 1038A, 1038B, special photo retoucher 11 sets degree(s) to which enhancement processing making use of brush(es) selected and/or newly created by user(s) is to be applied and have effect (enhancement effectiveness; or expressed differently, enhanced portion and extracted image region application mixture ratio). Special photo retoucher 11 applies enhancement processing within locus or loci affected by brush(es) wielded by user(s) on image(s) at retouch view 1025 in correspondence to degree(s) so set.

Special photo retoucher 11 displays, at control area 119, palette 1031 comprising a prescribed number of, e.g., 6×6, subpalettes at BRUSH field 1036. Respective subpalettes in the top three rows of this palette 1031 are subpalettes for fixed brushes (brushes which cannot be deleted), and respective subpalettes in the bottom three rows are subpalettes for brushes created by user(s) in the manner described below. At respective subpalettes, special photo retoucher 11 shows brush shape and/or radius respectively saved thereat (size, degree of blurring, shape, and/or angle respectively differ for respective brushes (though they may of course be the same)). Special photo retoucher 11 is such that when a subpalette desired by a user is selected at palette 1031, if such subpalette already has a brush then such brush is displayed at CURRENT BRUSH display field 1032, and moreover, brush preview cursor (e.g., a closed graphic accurately indicating the outline of a brush such as shown in FIG. 17) 1033, indicating in preview-like fashion the locus of application of the enhancement performed by that brush, is displayed, to scale, on image(s) at retouch view 1025 (because enhancement locus is a function of pixels, enlargement or reduction of image(s) displayed at retouch view 1025 will cause the size of the brush preview cursor to change in accordance therewith). This makes it possible for a user to ascertain the portion(s) (locus or loci) of image(s) at which enhancement(s) will be applied before actually carrying out enhancement processing.

Furthermore, special photo retoucher 11 displays at BRUSH field 1036 a plurality of slider bars and/or button(s) for adjusting brush(es) displayed at CURRENT BRUSH display field 1032. In correspondence to slider bar(s) and/or button(s) actuated by user(s), special photo retoucher 11 changes the size(s), degree(s) of blurring, shape(s), and/or angle(s) of brush(es) displayed at CURRENT BRUSH display field 1032. Furthermore, in correspondence hereto, special photo retoucher 11 changes the size(s), shape(s), and/or angle(s) of brush preview cursor(s) 1033.

Responsive to request(s) from user(s) (when SAVE button 1039 is pressed), special photo retoucher 11 saves, at subpalette(s) of palette 1031 designated by user(s), brush(es) whose size(s), degree(s) of blurring, shape(s), and/or angle(s) has or have been adjusted in this fashion. Brush(es) saved herein remain saved until such time as it or they is or are selected by user(s) and DELETE button 1040 is pressed.

Above, RETOUCH mode has been described. Next, COLOR/TONE mode will be described.

Upon entering COLOR/TONE mode, special photo retoucher 11 displays, at image display area 118, photo image(s) with enhancement(s) as applied in RETOUCH mode. As has already been described, this mode comprises the three submodes EASY, VARIATION, and MANUAL. Below, the respective submodes will be described in detail.

First, EASY submode will be described.

Figure 19:
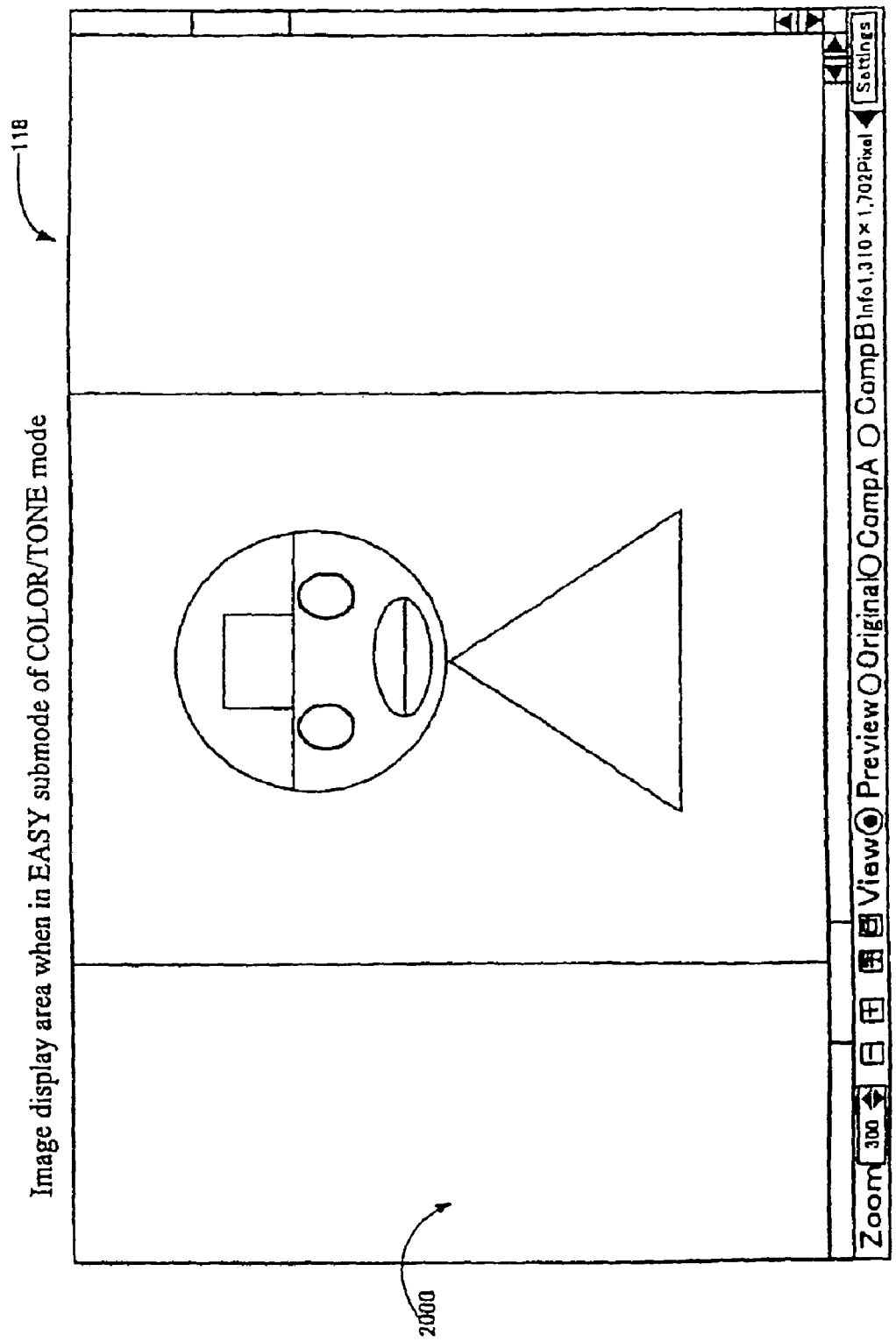
FIG. 19 is a drawing showing image display area 118 when in EASY submode of COLOR/TONE mode.
Figure 20:
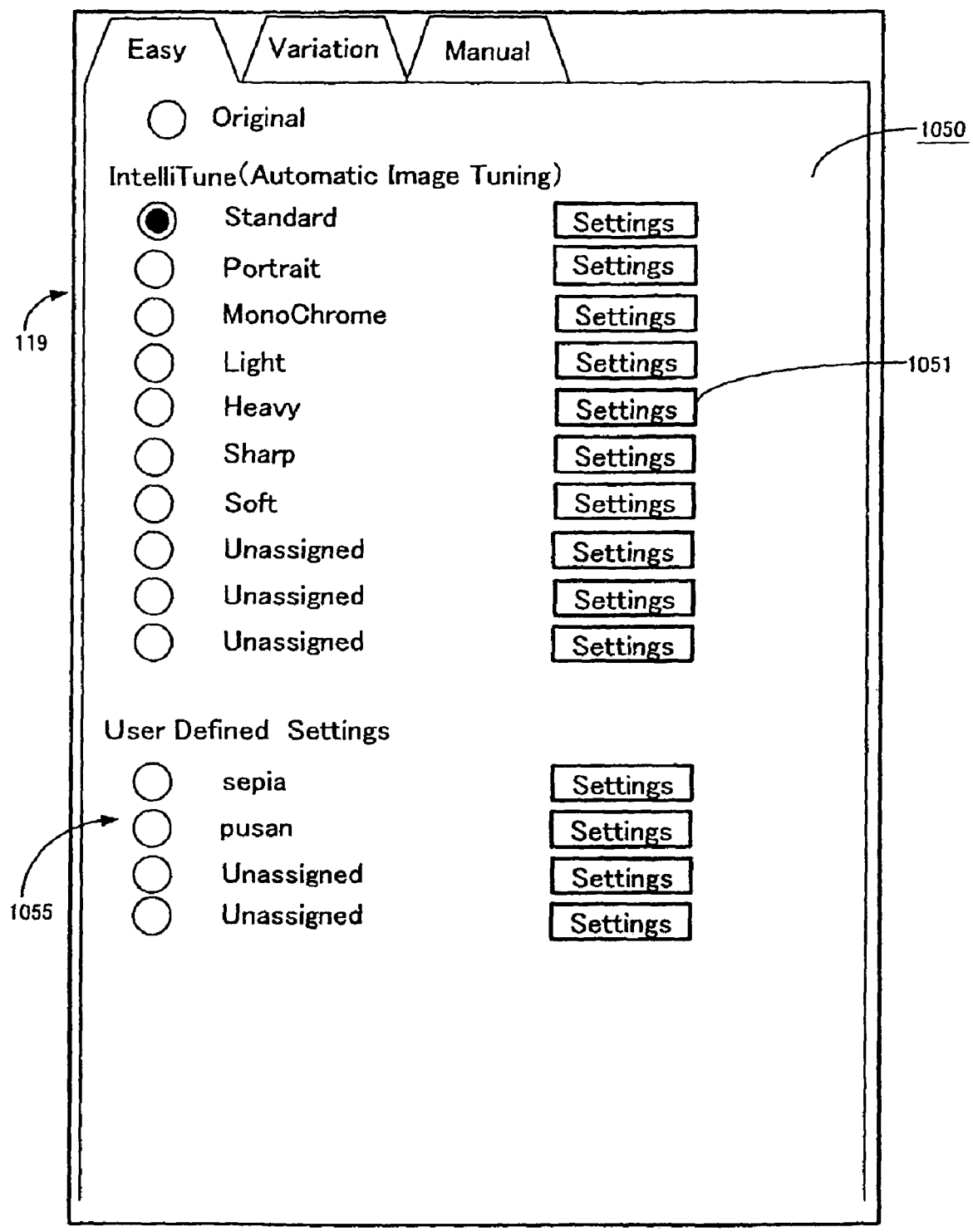
FIG. 20 is a drawing showing control area 119 when in EASY submode of COLOR/TONE mode.

FIG. 19 shows image display area 118 when in EASY submode, and FIG. 20 shows control area 119 when in same submode.

When the EASY tab at control area 119 is clicked, special photo retoucher 11 enters EASY submode, displaying EASY control screen 1050 in front layer(s).

Displayed at EASY control screen 1050 are a plurality of radio buttons respectively corresponding to a plurality of preprepared color adjustment filters. Special photo retoucher 11 causes color adjustment filter(s) corresponding to selected radio button(s) to be applied to the entirety or entireties of photo image(s) (extracted image region(s) and/or original image(s); hereinafter "image(s) subject to color/tone editing") displayed at easy view 2000 of FIG. 19. In more specific terms, special photo retoucher 11 might for example carry out STANDARD COLOR CORRECTION, PORTRAIT PHOTO COLOR CORRECTION, MAKE INTO MONOCHROME PHOTO, LIGHTEN, MAKE HEAVIER, SHARPEN, SOFTEN, and/or other such processing on image(s) subject to color/tone editing in correspondence to selected radio button(s). This makes it possible for desired type(s) of color/tone adjustment to be carried out in one-click fashion.

Figure 21:
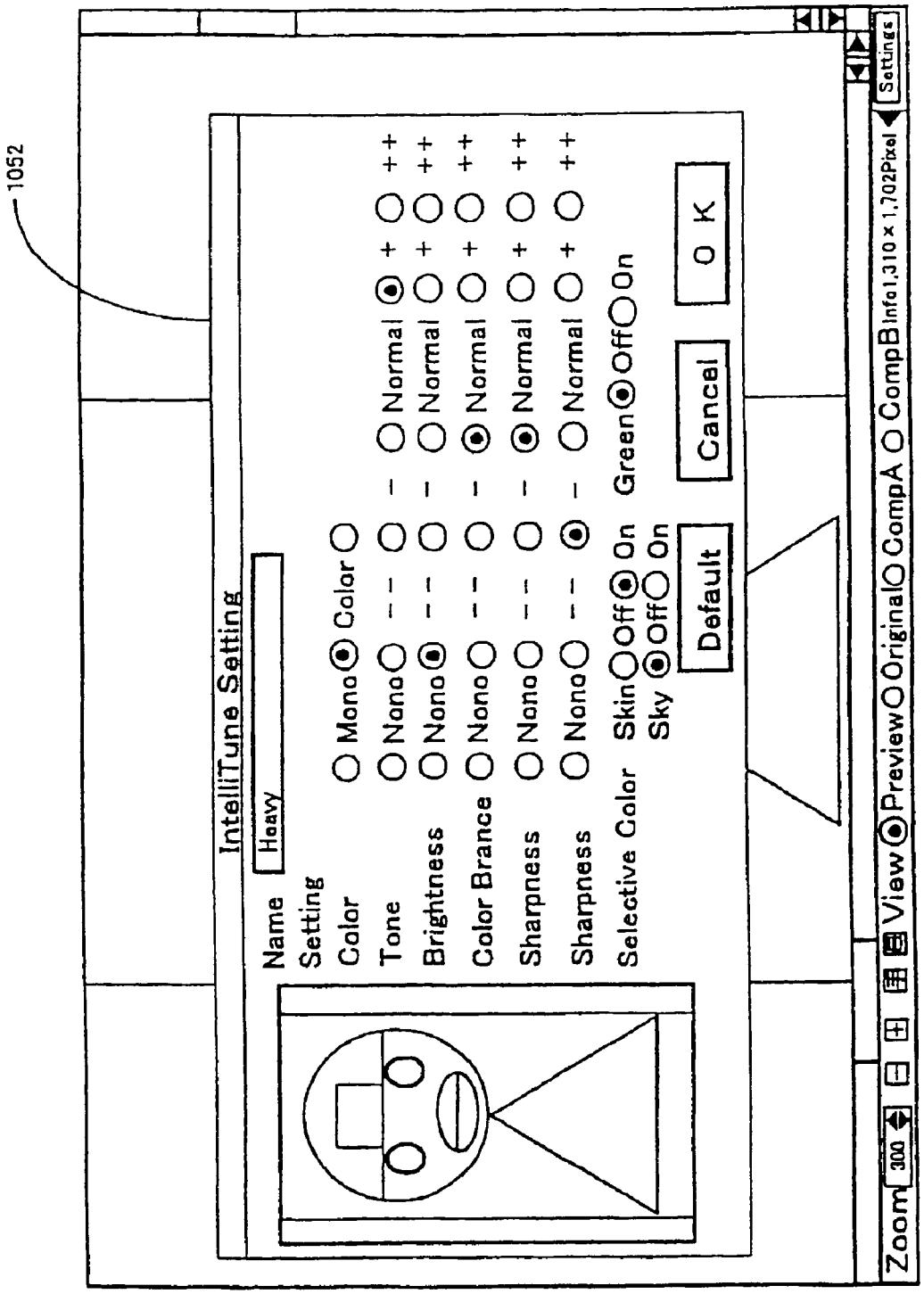
FIG. 21 is a drawing showing dialog box 1052 for changing parameter(s) when in EASY submode.

Moreover, at this EASY submode, it is possible to manually change color adjustment filter parameter(s) of respective selectable color adjustment filters. For example, if a change in the parameter(s) of the HEAVY color adjustment filter were desired, a user might click SETTINGS button 1051 corresponding to the HEAVY filter. Upon so doing, special photo retoucher 11 displays, in frontmost layer(s), dialog box 1052 for changing parameter(s) as shown in FIG. 21. At this dialog box 1052, user(s) can adjust the effect of enhancement(s) applied by the HEAVY color adjustment filter (e.g., whether to make color or monochrome and/or how strongly to cause color tone, brightness, color balance, saturation, and/or sharpness to have its or their effect(s)). Special photo retoucher 11 causes the HEAVY color adjustment filter to reflect the results of adjustments made at this dialog box 1052.

Furthermore, at this EASY submode, it is possible for user(s) to create and increase the number of types of selectable color adjustment filters. In more specific terms, it is for example possible to increase the number of types of selectable color adjustment filters by loading color adjustment filter(s) created and saved in MANUAL submode (name(s) of such additional color adjustment filter(s) is or are displayed at USER DEFINED SETTINGS field 1055). Parameter(s) for such additional color adjustment filter(s) may be changed at the aforementioned dialog box for changing parameter(s) which is displayed in frontmost layer(s) as a result of clicking the SETTINGS button displayed at EASY control screen 1050.

Above, EASY submode has been described. Next, VARIATION submode will be described.

Figure 22:
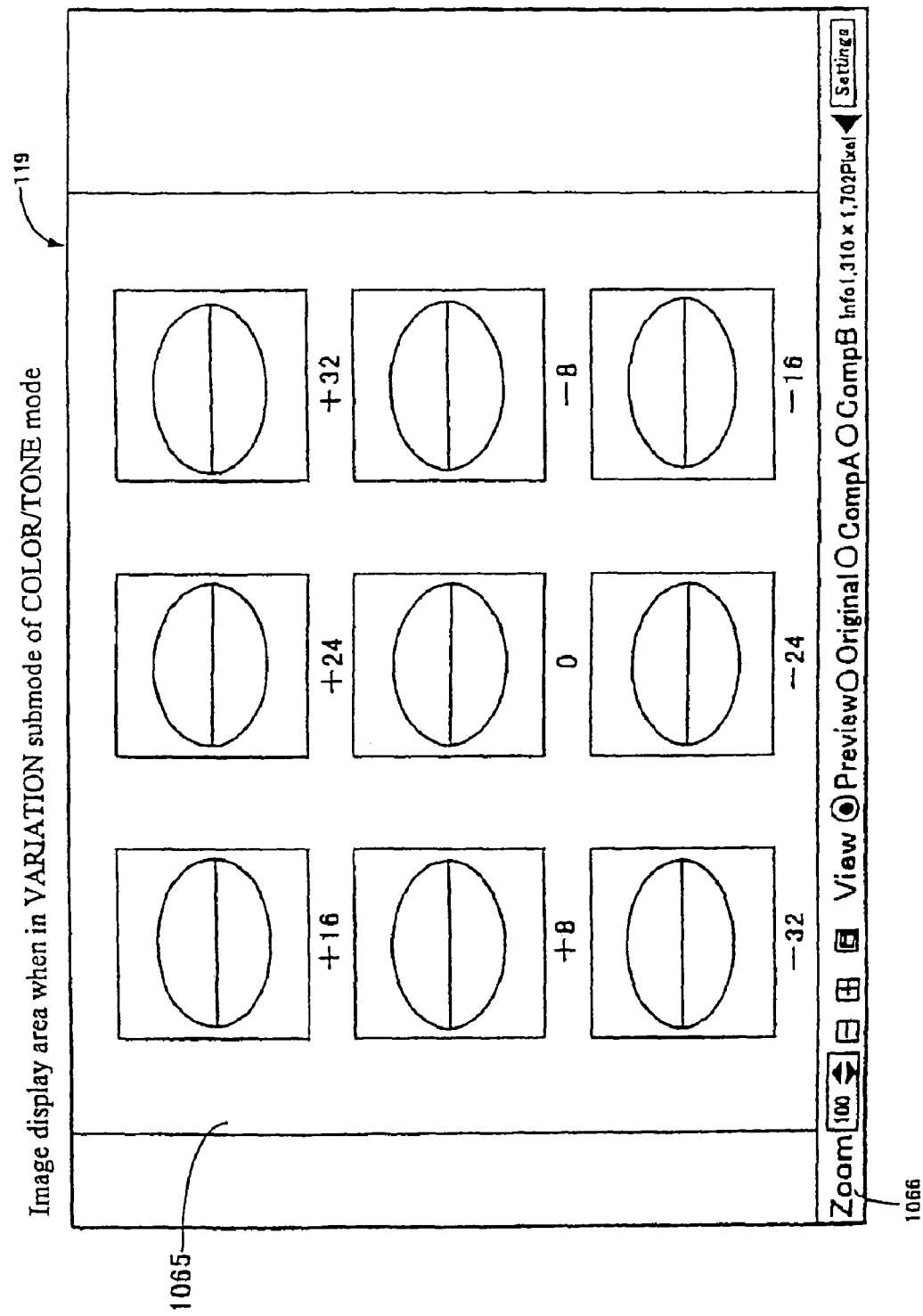
FIG. 22 is a drawing showing image display area 118 when in VARIATION submode of COLOR/TONE mode.
Figure 23:
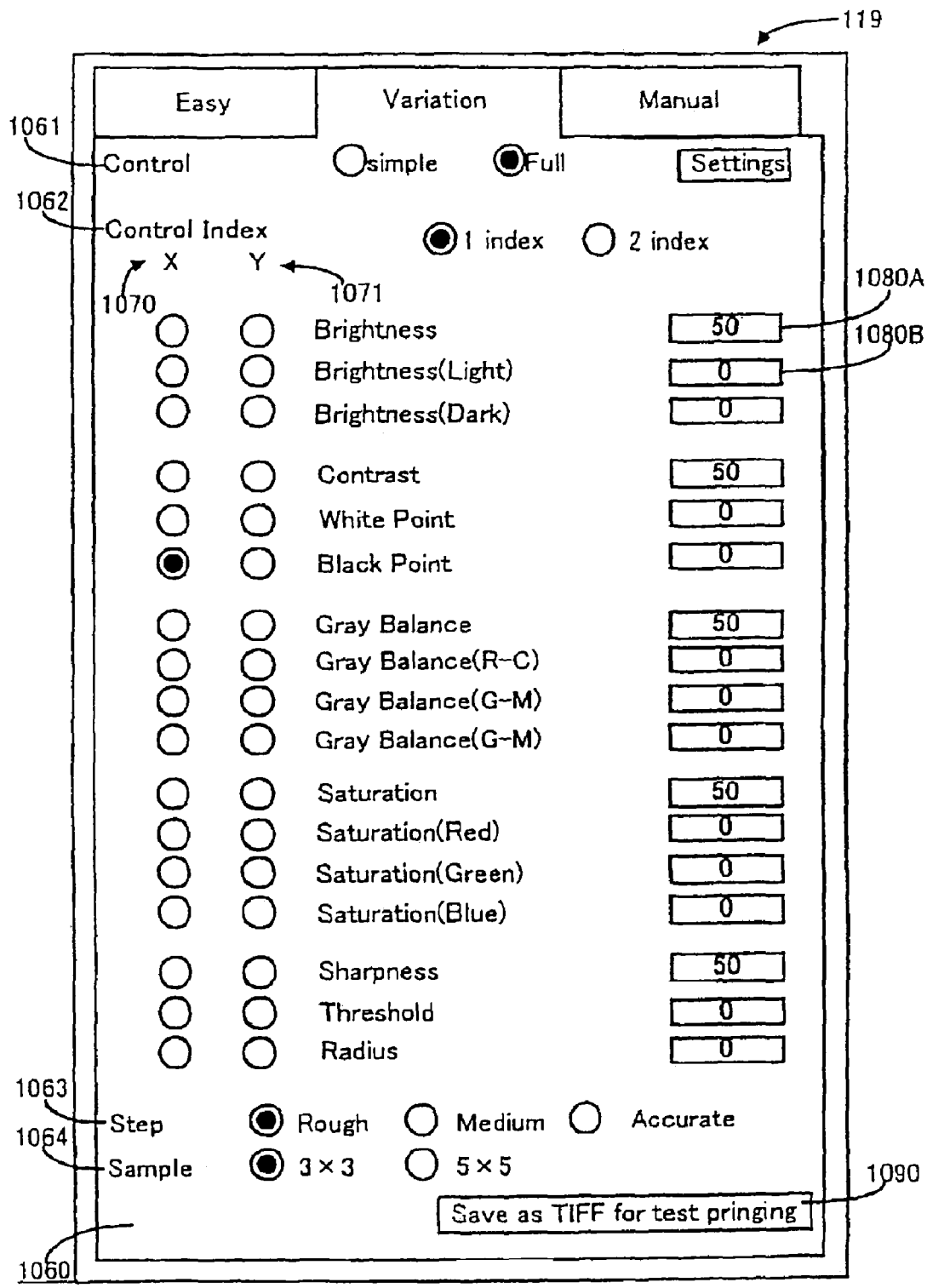
FIG. 23 is a drawing showing control area 119 when in VARIATION submode of COLOR/TONE mode.
Figure 24A:
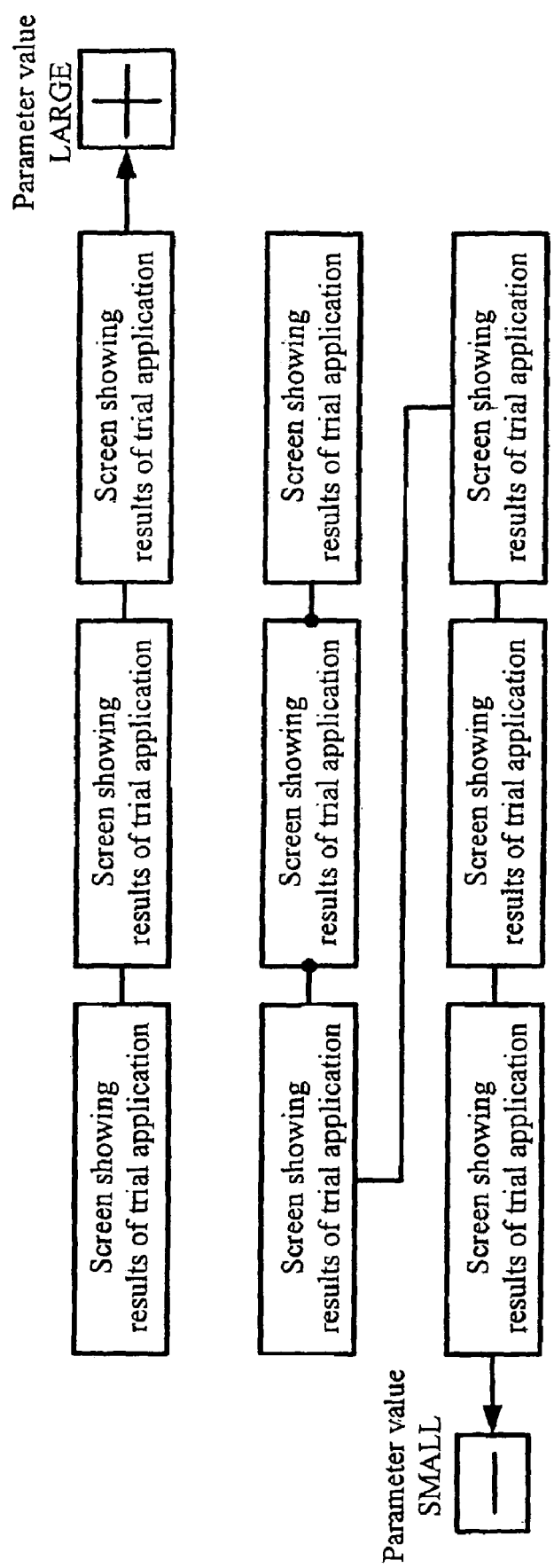
FIG. 24 is a drawing showing examples of conventions that may be employed for arraying a ONE-INDEX plurality of results of trial application.
Figure 24B:
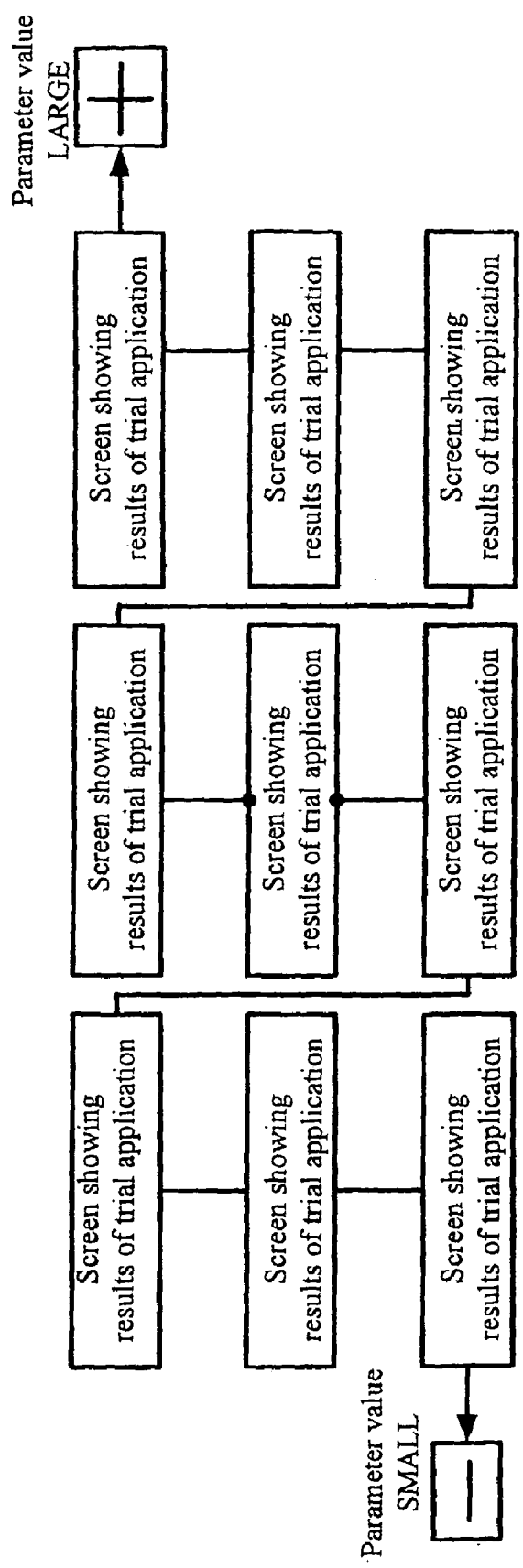
Figure 24C:
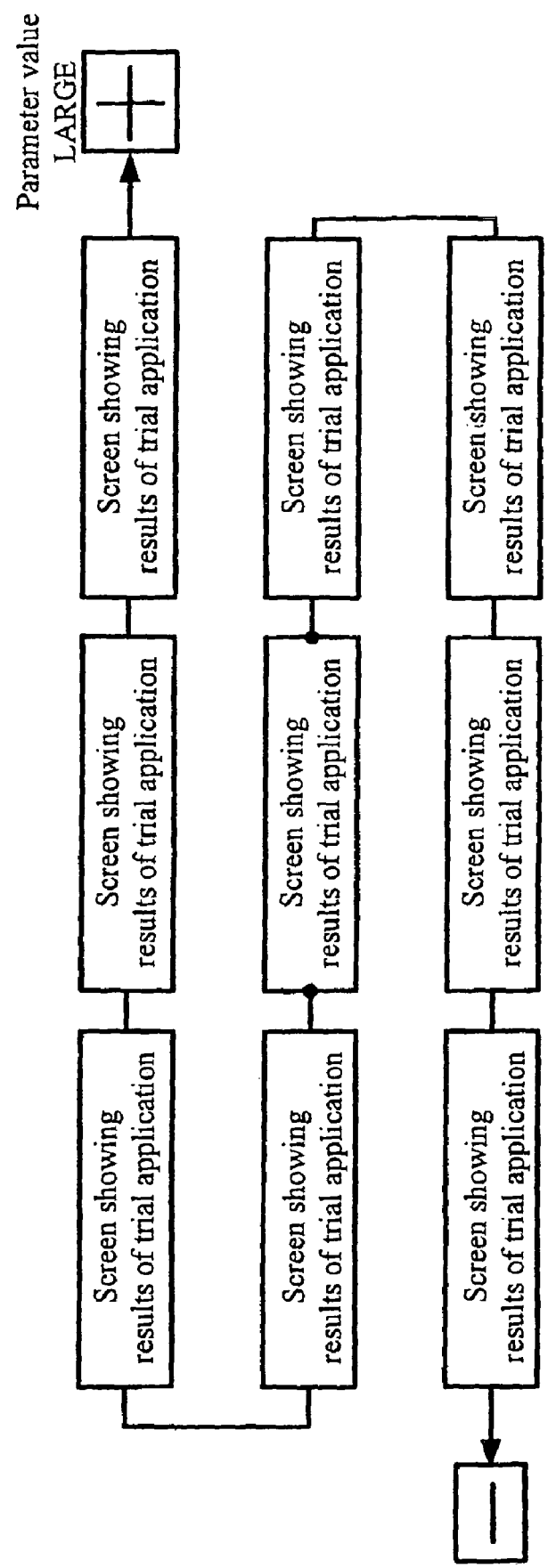
Figure 24D:
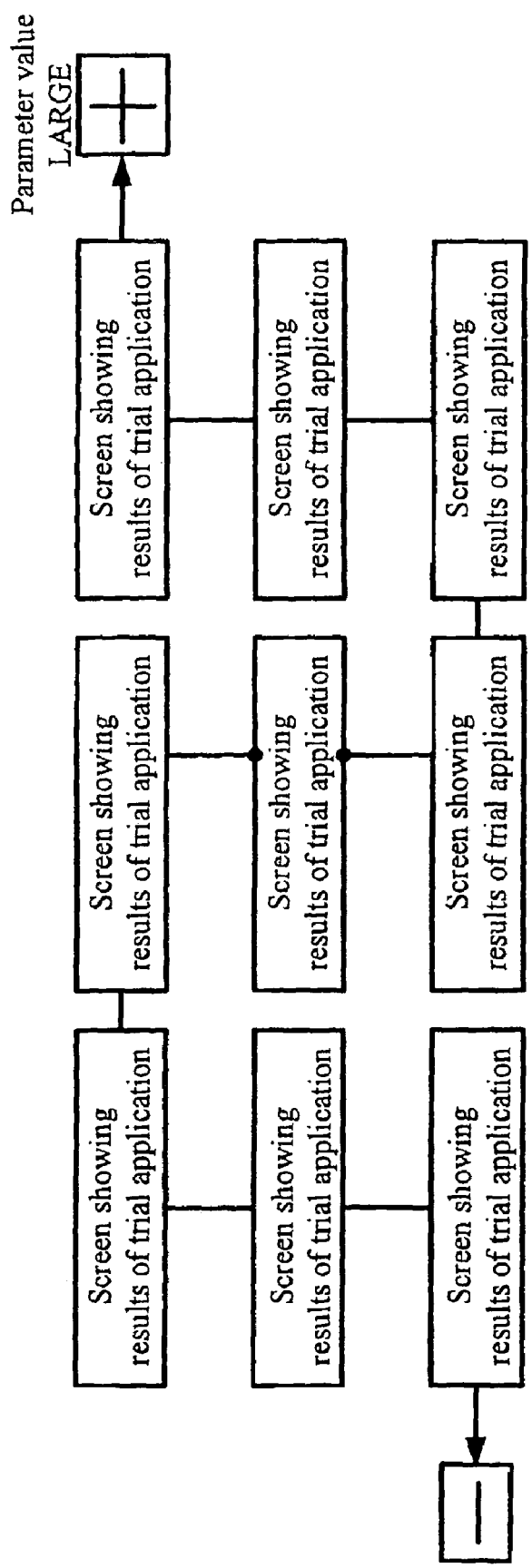

FIG. 22 shows image display area 118 when in VARIATION submode, and FIG. 23 shows control area 119 when in same submode.

When the VARIATION tab at control area 119 is clicked, special photo retoucher 11 enters VARIATION submode, displaying VARIATION control screen 1060 in front layer(s).

As shown in FIG. 22, upon entering VARIATION submode, special photo retoucher 11 displays, horizontally and vertically in arrayed fashion at variation view 1065 of image display area 118, a plurality of (e.g., 9 or 25) photo images which respectively represent results of application in trial fashion of a plurality of (e.g., 9 or 25) color adjustment filters having different parameter values to the same photo image(s). The photo image(s) centrally located thereamong represents or represent the result of application in trial fashion (thumbnail image(s)) of color adjustment filter(s) having parameter value(s) as currently set at control area 119 (immediately after entering VARIATION submode, such image(s) representing results of enhancement processing applied up to that point). Furthermore, respectively arrayed in order to either side of central photo image(s) are results of application in trial fashion of color adjustment filter(s) representing decrease(s) in step(s) of prescribed value(s) from currently set parameter value(s) (i.e., parameter value(s) of color adjustment filter(s) applied to photo image(s) centrally located thereamong), and conversely, results of application in trial fashion of color adjustment filter(s) representing increase(s) in step(s) of prescribed value(s) from currently set parameter value(s). Moreover, displayed beneath those respective trial application results are amounts of increments in parameter value(s) as measured relative to parameter value(s) applied to central photo image(s) (more specifically, when the ONE-INDEX radio button, described below, is selected, a single increment might be displayed in prescribed color(s) for a single photo image; and when the TWO-INDEX radio button is selected, two increments might be displayed in arrayed fashion in respectively different colors for a single photo image).

Special photo retoucher 11 is such that when photo image(s) desired by user(s) is or are selected from among this plurality of photo images (trial application results), such selected photo image(s) is or are made to move to the center of variation view 1065, in accompaniment to which display location(s) of other photo image(s) is or are also made to move, a plurality of photo image(s) being displayed as described above such that selected photo image(s) is or are at the center thereof (i.e., display at variation view 1065 is updated), and in addition, parameter value(s) for color adjustment filter(s) applied to such chosen photo image(s) is or are caused to be set at control area 119. Furthermore, when proceeding to other mode(s) and/or other submode(s), special photo retoucher 11 applies color adjustment filter(s) having particular parameter value(s) as set at control area 119 to photo image(s) displayed after entering such mode(s) and/or submode(s).

Special photo retoucher 11 is such that in correspondence to user operations carried out at color/tone toolbar 1066, photo image(s) selected by user(s) from among a plurality of photo image(s) displayed at variation view 1065 may be displayed in enlarged and/or reduced fashion, the aforementioned central photo image(s) may be scrolled by itself or themselves, and/or image region(s) to be displayed as photo image(s) at variation view 1065 may be set.

Display format at variation view 1065 may be altered pursuant to content of user input at VARIATION control screen 1062 shown in FIG. 23 (display format at variation view 1065 may be updated each time that new content is input).

That is, in correspondence to radio button(s) selected at CONTROL field 1061 of VARIATION control screen 1062, special photo retoucher 11 determines which of a plurality of parameters displayed at CONTROL INDEX field 1062, described below, is or are to be selectable parameter(s). In more specific terms, special photo retoucher 11 is such that when the SINGLE radio button is selected, that or those parameter(s) among the foregoing plurality of parameters which is or are basic parameter(s) (e.g., only brightness, contrast, gray balance, saturation, and sharpness) is or are set so as to be selectable; in contrast to which, when the FULL radio button is selected, all parameters other than gray balance(s) are set so as to be selectable. If the FULL radio button is selected, more detailed setting of basic parameter(s) may be carried out (e.g., taking the case of brightness, detailed adjustment, such as through highlight zone filtering and/or dark zone filtering, is made possible).

Furthermore, in correspondence to radio button(s) selected at CONTROL INDEX field 1062, special photo retoucher 11 determines the number of parameters which is or are to have effect during a single iteration of the foregoing trial application (hereinafter "filtering").

In more specific terms, if for example the 1 INDEX radio button is selected, only one parameter will be allowed to have its effect during a single filtering iteration; and in still more specific terms, only radio button(s) in X column 1070 will be enabled, radio button(s) in Y column 1071 being disabled. When particular radio button(s) is or are selected from among radio button(s) in X column 1070, special photo retoucher 11 causes a plurality of instances of trial application results, representing results of filtering as described above with respect to parameter(s) corresponding to such radio button(s), to be displayed in arrayed fashion pursuant to prescribed convention(s), e.g., convention(s) selected by user(s) from among conventions (A) through (D) shown in FIG. 24.

Figure 25:
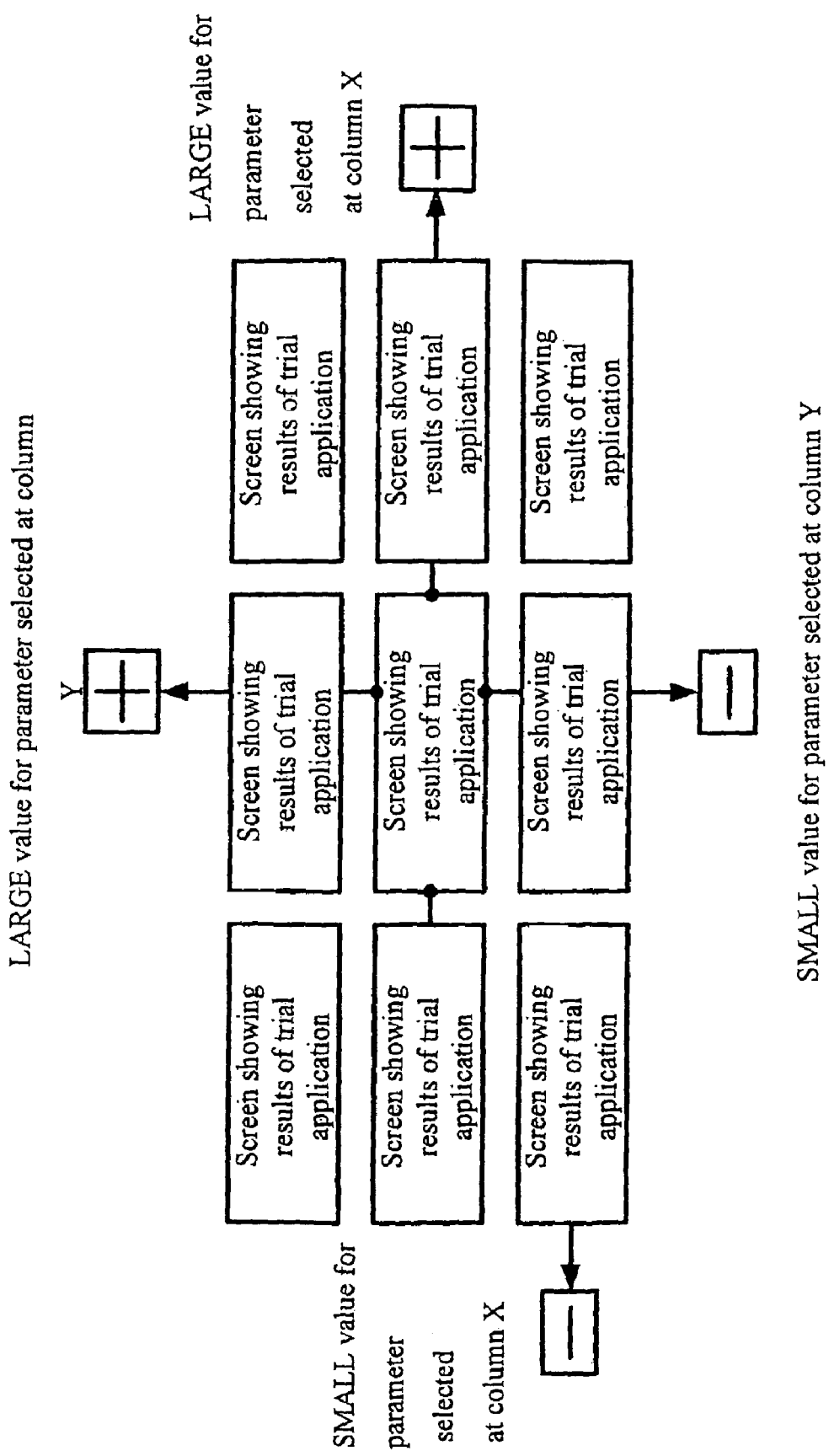
FIG. 25 is a drawing showing examples of conventions that may be employed for arraying a TWO-INDEX plurality of results of trial application.
Figure 26:
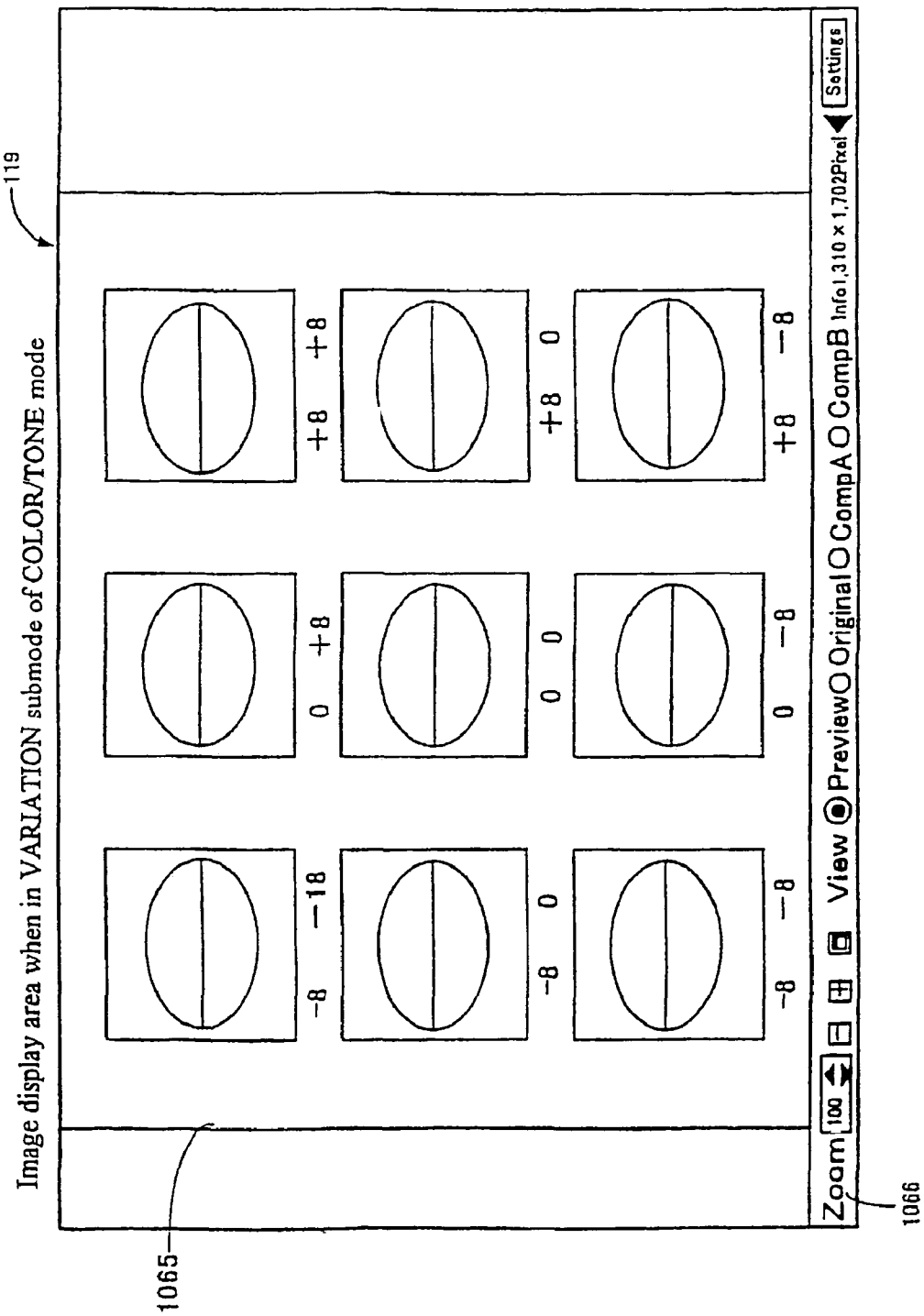
FIG. 26 is a drawing showing a screen in which a plurality of results of trial application have been arrayed according to the exemplary convention shown in FIG. 25.

In contrast, when the 2 INDEX radio button is selected, two parameters will be allowed to have their effect during a single filtering iteration; and in still more specific terms, radio button(s) in X column 1070, as well as radio button(s) in Y column 1071, will be enabled. When particular radio buttons are respectively selected at X column 1070 and Y column 1071, special photo retoucher 11 employs color adjustment filter(s) for which two parameters corresponding to the two selected radio buttons differ in step(s) of prescribed value(s), carrying out filtering as described above, to obtain a plurality of instances of trial application results. Moreover, special photo retoucher 11 causes such plurality of instances of trial application results to be displayed in arrayed fashion pursuant to prescribed convention(s), e.g., the convention shown in FIG. 25, in correspondence to which of X column 1070 and Y column 1071 each of the two parameters was selected from. As a result, a plurality of photo images (trial application results) are displayed as shown for example in FIG. 26.

At CONTROL INDEX field 1062, special photo retoucher 11 causes parameter values applicable to the foregoing central image(s) to be respectively displayed in a plurality of edit boxes 1080A, 1080B, . . . respectively corresponding to a plurality of parameters. Furthermore, when entering this VARIATION submode from other mode(s) and/or other submode(s), special photo retoucher 11 causes parameter(s) set for photo image(s) up to that point to be displayed at edit boxes 1080A, 1080B, . . . . In addition, when user(s) enter parameter value(s) directly at edit boxes 1080A, 1080B, . . . , special photo retoucher 11 uses such entered parameter value(s) to update the foregoing central photo image(s) and to update the plurality of photo images displayed at variation view 1065 in accompaniment thereto.

Furthermore, in correspondence to radio button(s) selected at STEP field 1063, special photo retoucher 11 determines the size(s) of the unit parameter increment(s) and/or decrement(s) at the aforementioned plurality of instances of application of color adjustment filter(s) (i.e., the amount(s) by which parameter value(s) is or are stepped). For example, parameter value(s) of color adjustment filter(s) might be increased and/or decreased in large increments and/or decrements (e.g., by 8 units) when the ROUGH radio button is selected, might be increased and/or decreased in medium-sized increments and/or decrements (e.g., by 4 units) when the MEDIUM radio button is selected, and might be increased and/or decreased in small increments and/or decrements (e.g., by 2 units) when the ACCURATE radio button is selected.

Furthermore, in correspondence to radio button(s) selected at SAMPLE field 1064, special photo retoucher 11 determines the number of photo images displayed at variation view 1065. For example, when the "3×3" radio button is selected, a total of 9 photo images—3 in the vertical direction and 3 in the horizontal direction—are displayed as shown in FIG. 22; when the "5×5" radio button is selected, a total of 25 photo images—5 in the vertical direction and 5 in the horizontal direction—are displayed (note that whereas in the present embodiment the same number of images are thus displayed in the vertical direction and horizontal direction, these of course need not be the same number).

Furthermore, when button 1090 is clicked, special photo retoucher 11 saves the display screen at variation view 1065 as a single image to a file of prescribed format (e.g., TIFF format). Image(s) recorded in such file(s) may be printed. This permits confirmation of actual results of printing of each of the plurality of photo images displayed at variation view 1065, allowing more precise enhancement settings to be carried out in correspondence to those results. In addition, when a display screen at variation view 1065 is saved as a single image, prescribed information (e.g., value(s) of respective parameter(s) for photo image(s) centrally located therein) may be affixed to such image; and when such image is printed, prescribed information affixed thereto may be caused to be printed together therewith.

Above, VARIATION submode has been described. Lastly, the MANUAL submode will be described.

Figure 27:
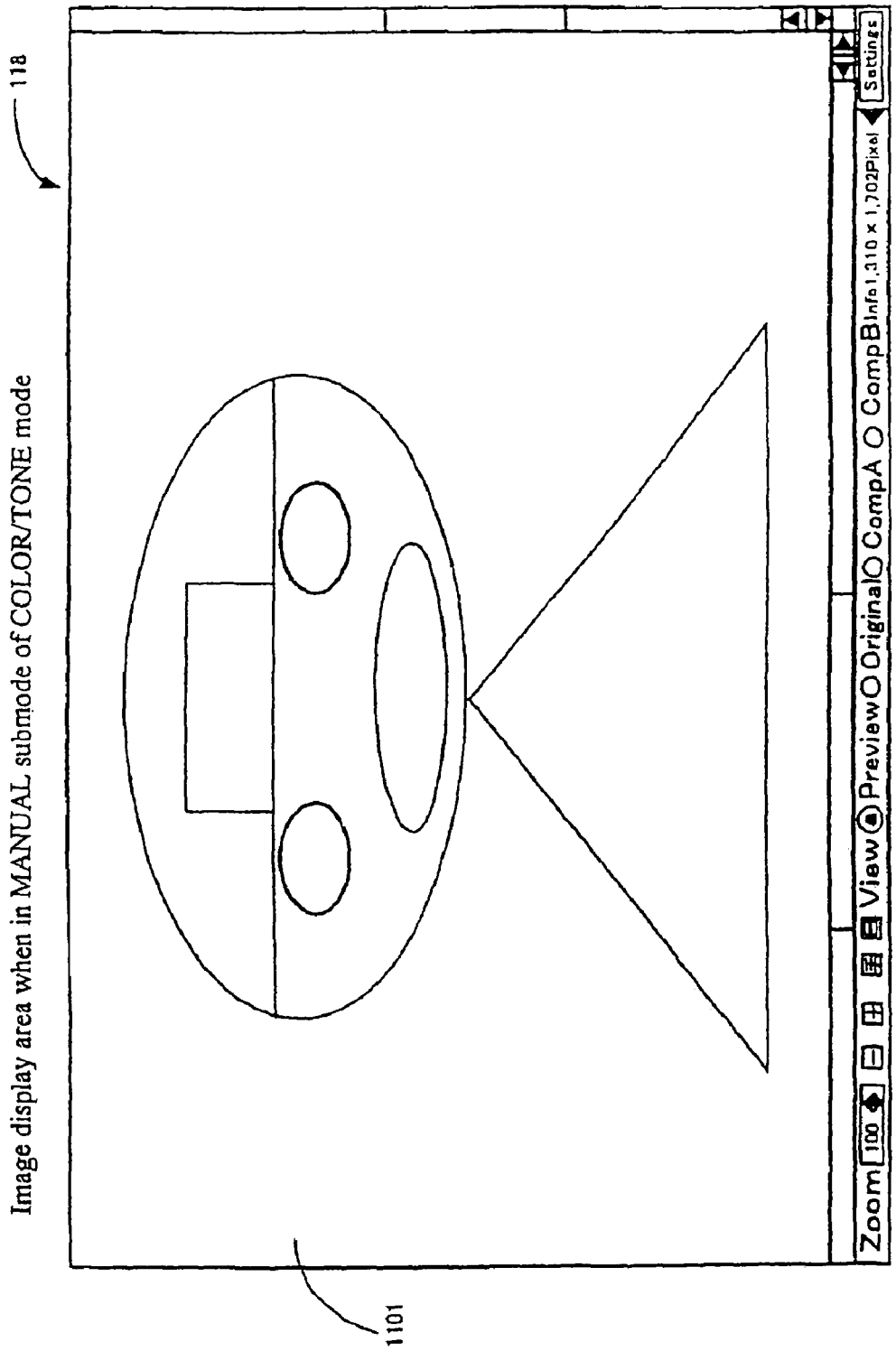
FIG. 27 is a drawing showing image display area 118 when in MANUAL submode of COLOR/TONE mode.
Figure 28:
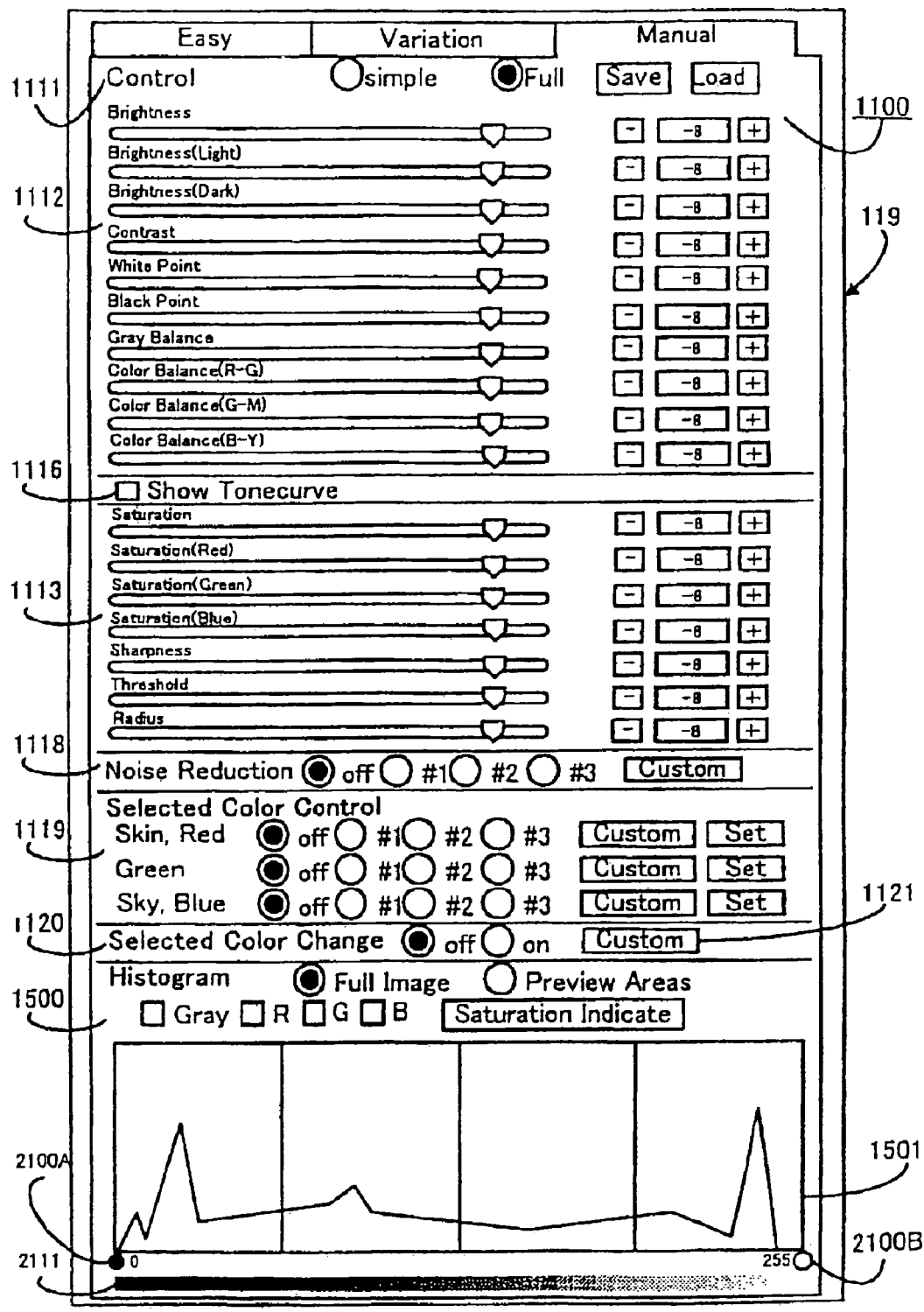
FIG. 28 is a drawing showing control area 119 when in MANUAL submode of COLOR/TONE mode.

FIG. 27 shows image display area 118 when in MANUAL submode, and FIG. 28 shows control area 119 when in same submode.

As shown in FIG. 28, when the MANUAL tab at control area 119 is clicked, special photo retoucher 11 enters MANUAL submode. Upon entering VARIATION submode, special photo retoucher 11 displays photo image(s) (original image(s) and/or image(s) wherein enhancement processing performed up to this point in other mode(s) and/or other submode(s) has been applied) at manual view 1101 of image display area 118 as shown in FIG. 27, and moreover, displays MANUAL control screen 1100 in front layer(s) at control area 119 as shown in FIG. 28.

Special photo retoucher 11 displays at MANUAL control screen 1100 various tools and indicators for even more detailed setting of color adjustment filter parameters than at VARIATION submode.

In correspondence to whether the SIMPLE or FULL radio button is selected at CONTROL field 1111 of this screen 1100, special photo retoucher 11 determines whether to make only the basic parameter(s) among the parameters displayed at fields 1112 and 1113 adjustable or whether to make all of the parameters adjustable. If FULL is selected, more detailed setting of basic parameter(s) (e.g., brightness, contrast, gray balance, etc.) may be carried out (e.g., taking the case of brightness, detailed adjustment, such as through highlight zone filtering and/or dark zone filtering, is made possible).

Furthermore, when the SAVE button at this screen 1100 is clicked, special photo retoucher 11 saves parameter(s) currently applied to image(s) displayed at manual view 1101 and the value(s) thereof (and/or color adjustment filter(s) having such value(s)). When saving such parameter(s) and value(s) thereof, special photo retoucher 11 displays dialog box(es), not shown, in frontmost layer(s), accepts input from user(s) at such dialog box(es) of name(s) for identifying parameter(s) and value(s) thereof which have been or are to be saved, and, responsive to user request, saves identifying name(s) which has or have been input such that it or they is or are linked to parameter(s) and value(s) thereof which have been or are to be saved.

Furthermore, when the LOAD button at this screen 1100 is clicked, special photo retoucher 11 loads parameter(s) and value(s) thereof saved at time or times when the SAVE button was clicked, displays dialog box(es) (not shown) listing identifying name(s), and causes value(s) of parameter(s) linked to identifying name(s) selected by user(s) at such dialog box(es) to be applied to photo image(s) displayed at manual view 1101.

Furthermore, in correspondence to user actuation at a plurality of parameter adjustment slider bars (shown without reference numerals) and/or parameter adjustment buttons (buttons displaying "+" and "−" symbols) displayed at fields 1112 and 1113, special photo retoucher 11 updates value(s) of parameter(s) reflected in currently displayed photo image(s). Furthermore, special photo retoucher 11 displays, in respective edit box(es) (fields between buttons displaying "+" symbols and buttons displaying "−" symbols) corresponding to respective parameter(s), respective parameter value(s) reflected in currently displayed photo image(s). In addition, when parameter value(s) is or are directly input at edit box(es), special photo retoucher 11 applies such parameter value(s) to currently displayed photo image(s).

Figure 29:
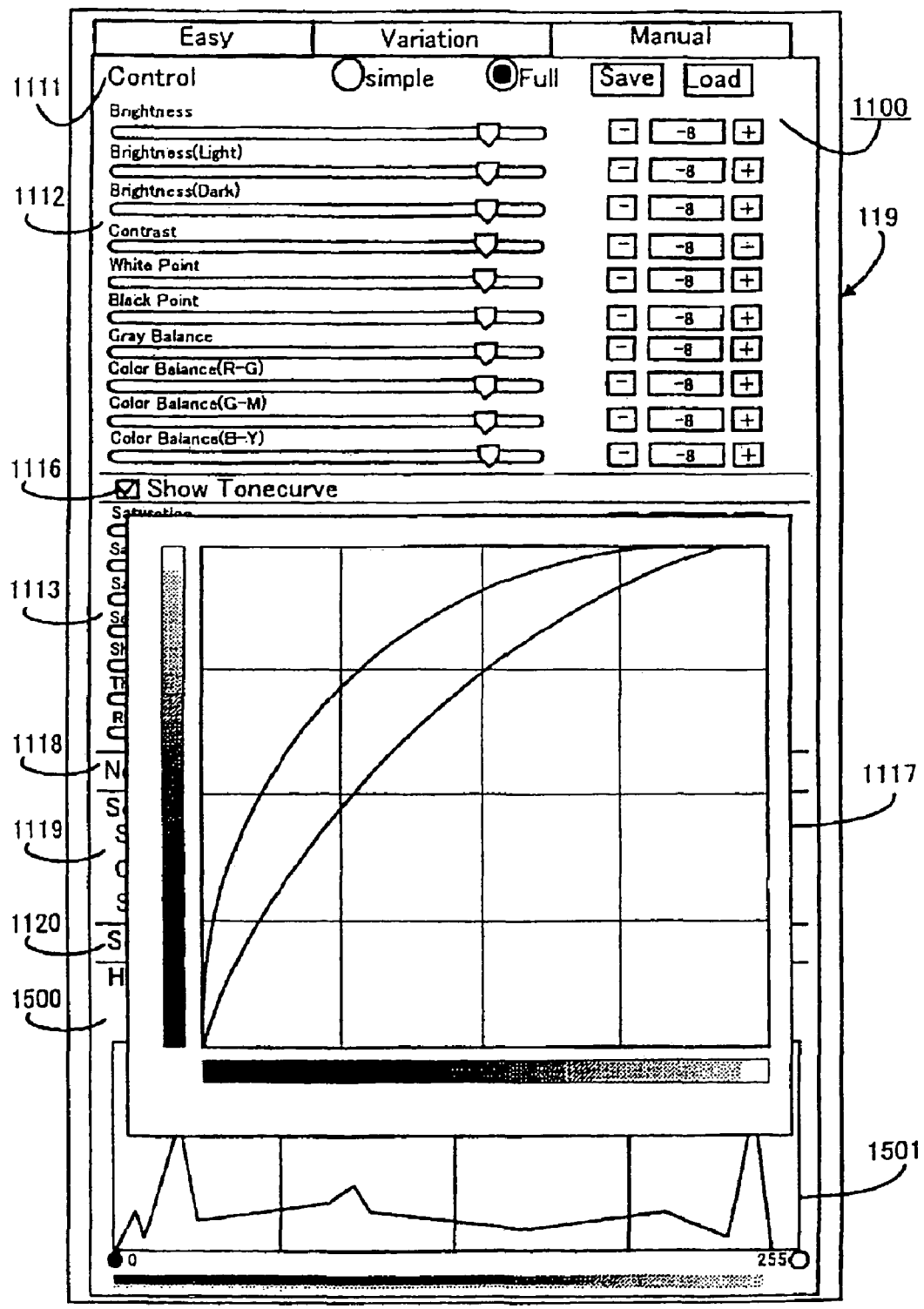
FIG. 29 is a drawing showing tonecurve view 1117 as displayed in frontmost layer(s) of control area 119.

Furthermore, when the SHOW TONECURVE check box 1116 at this screen 1100 is clicked, special photo retoucher 11 displays tonecurve view 1117 displaying tonecurve(s) in frontmost layer(s) as shown in FIG. 29. When mouse cursor(s) is or are placed at specific location(s) within this tonecurve view 1117 and is or are dragged, special photo retoucher 11 alters tonecurve(s) in correspondence to such dragging, and also applies parameter(s) pursuant to such tonecurve(s) to currently displayed photo image(s).

Furthermore, in correspondence to button(s) selected by user(s) from among a plurality of buttons displayed at NOISE REDUCTION field 1118 of this screen 1100, special photo retoucher 11 carries out reduction of noise and/or color fringing artifacts (e.g., restoring to its or their original color(s) the color(s) of pixel(s) in particular region(s) which has or have acquired color(s) other than its or their original color(s)).

Furthermore, in correspondence to button(s) selected by user(s) from among a plurality of buttons displayed at SELECTED COLOR CONTROL field 1119 of this screen 1100, special photo retoucher 11 corrects specific color component(s) in currently displayed photo image(s) (such correction may for example employ APF-type stored color correction functionality (multiple-tonecurve-type correction functionality). In more specific terms, special photo retoucher 11 applies specific parameter value(s) corresponding to selected button(s) from among a plurality of specific prepared parameter (e.g., skin color (red) component(s), green component(s), sky (blue) component(s)) values, and/or specific parameter value(s) manually set by user(s), to currently displayed photo image(s). This permits editing such as correction for brightening of skin color only (emphasizing the redness thereof) to be carried out.

Figure 30:
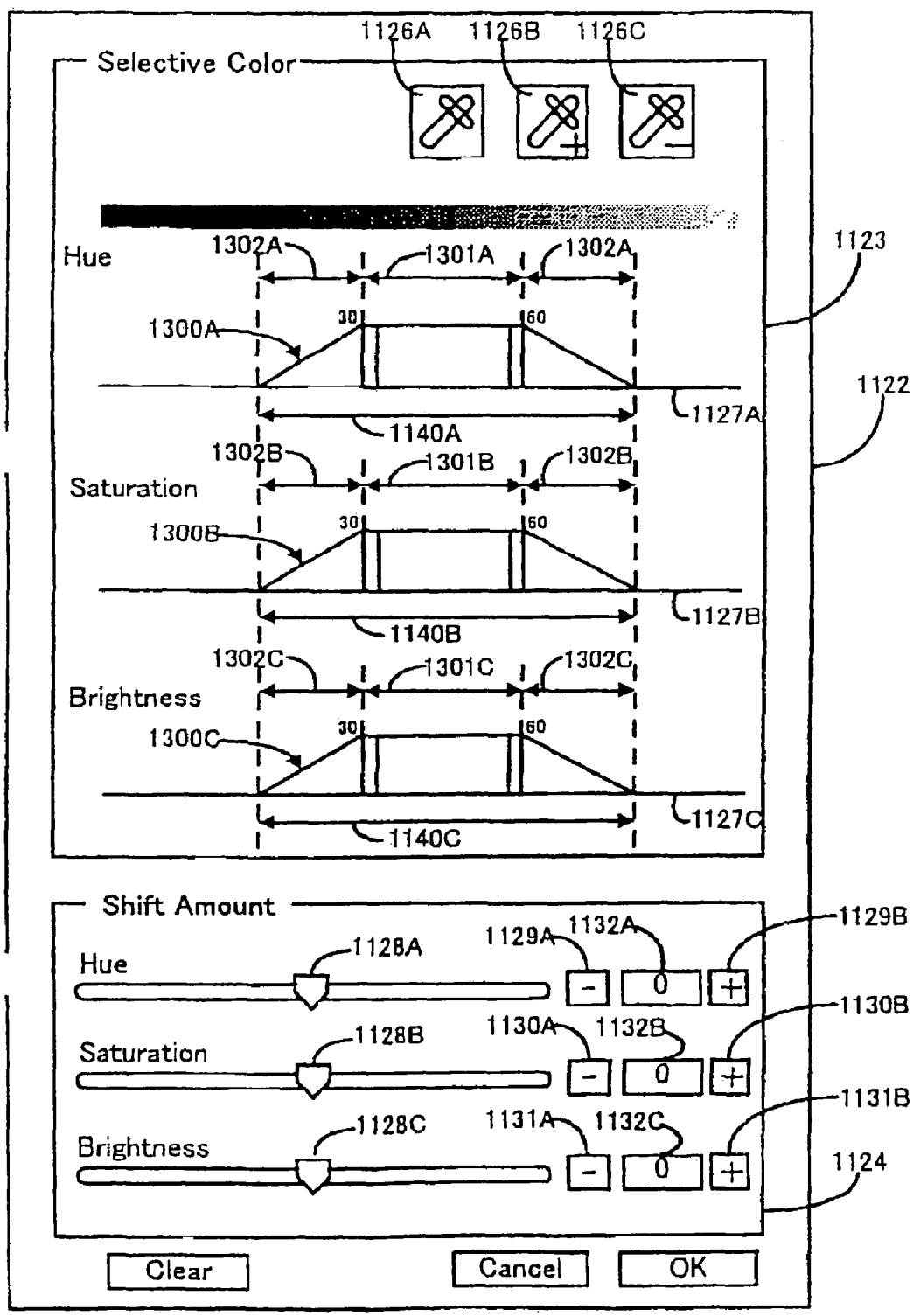
FIG. 30 is a drawing showing COLOR CHANGE dialog box 1122 as displayed in frontmost layer(s) of control area 119.

Furthermore, when the ON radio button is selected at SELECTED COLOR CHANGE field 1120 of this screen 1100 (OFF being selected by default), special photo retoucher 11 toggles CUSTOM button 1121 from its disabled state to its enabled state, and, when this CUSTOM button 1121 is clicked, displays COLOR CHANGE dialog box 1122 in frontmost layer(s) as shown in FIG. 30.

At this dialog box 1122, special photo retoucher 11 displays, in SELECTIVE COLOR field 1123, medicine dropper buttons 1126A through 1126C as well as color locus or loci subject to color/tone adjustment, or more specifically, control axes 1127A through 1127C for controlling enhancement effectiveness and locus or loci of application of enhancement(s) with respect to hue, saturation, and brightness. Furthermore, special photo retoucher 11 displays, in SHIFT AMOUNT field 1124, slider bars 1128A through 1128C, buttons 1129A through 1131B, and edit boxes 1132A through 1132C for respective adjustment of hue, saturation, and brightness at recently selected pixel(s) in current image(s).

When medicine dropper button 1126A at SELECTIVE COLOR field 1123 is clicked, special photo retoucher 11 samples and holds color(s) (hereinafter, stored color(s)) belonging to pixel(s) at location(s) of mouse cursor(s) on currently displayed photo image(s) (hereinafter referred to as "current image(s)") when mouse(s) is or are clicked (i.e., pixel(s) selected by user(s)). Moreover, special photo retoucher 11 displays, at edit boxes 1132A through 1132C, respective values for hue, saturation, and brightness belonging to stored color(s) which was or were sampled. Special photo retoucher 11 carries out this series of operations each time that mouse(s) is or are clicked over current image(s). In other words, only one stored color may be held.

In contradistinction hereto, when medicine dropper button 1126B is clicked, special photo retoucher 11 samples and holds a plurality of stored colors in correspondence to mouse clicks performed over current image(s). At such time or times, special photo retoucher 11 determines maximum value(s) and minimum value(s) for each of hue, saturation, and brightness from stored color(s) sampled up to the present time, and plots on corresponding control axes 1127A through 1127C the maximum values and minimum values so determined. Moreover, in correspondence hereto, special photo retoucher 11 widens and/or narrows locus or loci of application of enhancement(s) 1140A through 1140C for each of hue, saturation, and brightness.

Furthermore, when medicine dropper button 1126C is selected, special photo retoucher 11 narrows current loci of application of enhancement(s) 1140A through 1140C so as to prevent hue(s), saturation(s), and brightness(es) belonging to stored color(s) at pixel(s) selected by user(s) on current image(s) from falling within respective current loci of application of enhancement(s) 1140A through 1140C.

Components in directions of axes at control axes 1127A through 1127C signify values for hue, saturation, and brightness; components perpendicular to directions of axes signify enhancement effectiveness (degree to which applied enhancement(s) is or are to have effect). Curves 1300A through 1300C indicating loci of application of enhancement(s) as well as enhancement effectiveness are indicated at control axes 1127A through 1127C.

Loci of application of enhancement(s) 1140A through 1140C, indicated by curves 1300A through 1300C, respectively have main loci of application 1301A through 1301C, where enhancement effectiveness is 100%, at the central portions thereof, and have subordinate loci of application 1302A through 1302C, where enhancement effectiveness is less than 100%, to either side thereof. Curves 1300A through 1300C exhibit linearly decreasing slope at subordinate loci of application 1302A through 1302C as one goes from the endpoints of main loci of application 1301A through 1301C to the endpoints of loci of application of enhancement(s) 1140A through 1140C (i.e., enhancement effectiveness at subordinate loci of application 1302A through 1302C goes from 100% to 0%, decreasing continuously at constant rate, as one goes from the endpoints of main loci of application 1301A through 1301C to the endpoints of loci of application of enhancement(s) 1140A through 1140C). As a result, because enhancement effect is such that application goes continuously from 100% to 0% over loci of application of enhancement(s) 1140A through 1140C, high-quality image(s) may be obtained wherein it is not possible to distinguish location(s) at which enhancement(s) has or have been performed from location(s) at which enhancement(s) has or have not been performed.

In correspondence to mouse drag operation(s) having specific location(s) on control axes 1127A through 1127C and/or specific location(s) on curves 1300A through 1300C as start point(s), special photo retoucher 11 changes loci of application of enhancement(s) 1140A through 1140C, and/or main loci of application 1301A through 1301C and/or subordinate loci of application 1302A through 1302C present therein.

Furthermore, at SHIFT AMOUNT field 1124, when any of slider bars 1128A through 1128C and/or buttons 1129A through 1131B is or are actuated, and/or when numeric value(s) is or are entered at edit boxes 1132A through 1132C, special photo retoucher 11 alters hue, saturation, and/or brightness of recently selected pixel(s) in current image(s) in correspondence thereto.

Enhancement(s) may be applied to current image(s) based on hue, saturation, and/or brightness as described above.

Repeated reference is now made to FIG. 28.

Of the two radio buttons displayed at HISTOGRAM field 1500 on MANUAL control screen 1100, in correspondence to whether the FULL IMAGE or PREVIEW AREAS radio button is selected thereat, special photo retoucher 11 determines whether the locus or loci of current image(s) to be displayed in histogram fashion should be the entirety or entireties of current image(s) or should be limited to locus or loci currently displayed at manual view 1101 (see FIG. 27). Special photo retoucher 11 displays, at histogram view 1501, histogram(s) for current image locus or loci as determined above for current image(s).

Furthermore, in correspondence to which check box(es) is or are selected among the four check boxes displayed at HISTOGRAM field 1500, special photo retoucher 11 displays histogram(s) with respect to gray, red, green, and/or blue for current image locus or loci as determined above. When a plurality of check boxes are selected, special photo retoucher 11 divides the histogram display region at histogram view 1501 into equal horizontally long zones in correspondence to the number thereof so selected, displaying histogram(s) in the respective zonal regions obtained thereby.

Furthermore, in correspondence to mouse drag operation(s) by user(s) of saturation preview tools 2100A, 2100B and/or saturation locus adjustment slider 2111 displayed at HISTOGRAM field 1500, special photo retoucher 11 may cause saturation range(s) to be set and/or cause display to be emphasized (e.g., by causing shading to be applied) at specific region(s) of current image(s) (e.g., region(s) at which RGB=0, 0, 0 and/or 255, 255, 255). When saturation range(s) is or are set, clicking SATURATION INDICATE button 2200 (which is enabled only when the GRAY check box is selected) causes special photo retoucher 11 to cause current image region(s) comprising the set of pixel(s) having saturation outside saturation range(s) set as described above to flash such that the pixel(s) thereof is or are intermittently displayed in, for example, complementary color(s) (e.g., region(s) comprising the set of pixel(s) having saturation from 251 through 255 might be made to flash when saturation range is set to 0 through 250).

Whereas embodiments of the present invention have been described above, these have been presented as examples for purposes of describing the present invention and without intent to limit the scope of the present invention to these embodiments alone. The present invention may accordingly be carried out in the context of a wide variety of other embodiments without departing from the essence thereof.

Whereas in the foregoing embodiments functionality for editing photographs and creating print job and functionality for sending print jobs to printers and managing print information were split between separate computer machines, these being a client machine and a print server machine, such constitution wherein functionalities are split between or among separate machines has been presented only by way of example and it is possible to carry out the present invention in the context of other machine constitutions. For example, all of the foregoing functionalities may be carried out by a single computer machine. Printer(s) may also split a portion of the foregoing functionalities. Or the foregoing functionalities may be split even more finely among even more computer machines.

Furthermore, at FIG. 30, loci of application of enhancement(s) 1140A through 1140C need not necessarily be made up of main loci of application 1301A through 1301C and subordinate loci of application 1302A through 1302C. Expressing this differently, curves 1300A through 1300C need not be linear, it being possible to design and/or modify special photo retoucher 11 so as to permit free alteration thereof by user(s) through mouse drag operation(s)

The invention claimed is:

1. An image displaying method comprising:
   displaying thumbnail images represented by image data in a storage;
   associating, based on a user selection from a plurality of types of marks, a selected mark with at least one of the displayed thumbnail images;
   displaying the selected mark with the displayed thumbnail image that is associated with the selected mark;
   storing displayed thumbnail images in the form of thumbnail image data different from original image data; and
   if a thumbnail image previously displayed is displayed again, reading the stored thumbnail image data and displaying the thumbnail image.

2. An image displaying method comprising:
   displaying images represented by image data in a storage;
   associating, based on a user selection from a plurality of types of marks, a selected mark with at least one of the displayed images;
   displaying the selected mark with the displayed image that is associated with the selected mark; and
   arraying the images according to the associated marks.

3. An image displaying method comprising:
- displaying images represented by image data in a storage;
- associating, based on a user selection from a plurality of types of marks, a selected mark with at least one of the displayed images;
- displaying the selected mark with the displayed image that is associated with the selected mark; and
- selecting all of the displayed images associated with the selected mark selected by the user.

4. An image displaying method comprising:
- displaying images represented by image data in a storage;
- associating, based on a user selection from a plurality of types of marks, a selected mark with at least one of the displayed images;
- displaying the selected mark with the displayed image that is associated with the selected mark; and
- deselecting all of the displayed images associated with the selected mark selected by the user.

5. A computer-readable medium storing a computer program for image displaying, the computer program being capable of causing a computer to carry out operations comprising:
- displaying, on a display unit, images represented by image data in a storage;
- associating, based on a user selection from a plurality of types of marks, a selected mark with one of the displayed images;
- displaying, on the display unit, the selected mark with the displayed image that is associated with the selected mark; and
- arraying the images according to the associated marks.

6. A computer-readable medium storing a computer program for image displaying, the computer program being capable of causing a computer to carry out operations comprising:
- displaying, on a display unit, images represented by image data in a storage;
- associating, based on a user selection from a plurality of types of marks, a selected mark with one of the displayed images;
- displaying, on the display unit, the selected mark with the displayed image that is associated with the selected mark; and
- selecting all of the displayed images associated with the selected mark selected by the user.

7. A computer-readable medium storing a computer program for image displaying, the computer program being capable of causing a computer to carry out operations comprising:
- displaying, on a display unit, images represented by image data in a storage;
- associating, based on a user selection from a plurality of types of marks, a selected mark with one of the displayed images;
- displaying, on the display unit, the selected mark with the displayed image that is associated with the selected mark; and
- deselecting all of the displayed images associated with the selected mark selected by the user.

8. An apparatus for image displaying comprising:
- a display component configured to display images represented by image data in a storage;
- an association component configured to associate, based on a user selection from a plurality of types of marks, a selected mark with at least one of the displayed images;
- a display component configured to display the selected mark with the displayed image that is associated with the selected mark; and
- an arraying component configured to array the images according to the associated marks.

9. An apparatus for image displaying comprising:
- a display component configured to display images represented by image data in a storage;
- an association component configured to associate, based on a user selection from a plurality of types of marks, a selected mark with at least one of the displayed images;
- a display component configured to display the selected mark with the displayed image that is associated with the selected mark; and
- a selection component configured to select all of the displayed images associated with the selected mark selected by the user.

10. An apparatus for image displaying comprising:
- a display component configured to display images represented by image data in a storage;
- an association component configured to associate, based on a user selection from a plurality of types of marks, a selected mark with at least one of the displayed images;
- a display component configured to display the selected mark with the displayed image that is associated with the selected mark; and
- a deselection component configured to deselect all of the displayed images associated with the selected mark selected by the user.

11. An apparatus for image displaying, the apparatus comprising:
- a storage component;
- a display component configured to display thumbnail images represented by image data stored in the storage component;
- an association component configured to associate, based on a user selection from a plurality of types of marks, a selected mark with at least one of the displayed thumbnail images;
- a display component configured to display the selected mark with the displayed thumbnail image that is associated with the selected mark; and
- a reading component;
- wherein the storage component is configured to store displayed thumbnail images in the form of thumbnail image data different from original image data; and
- wherein the reading component and the display component are configured such that, if a thumbnail image previously displayed is displayed again, the reading component reads the stored thumbnail image data and the display component displays the thumbnail image.

12. A computer-readable medium storing a computer program for image displaying, the computer program being capable of causing a computer to carry out operations comprising:
- displaying, on a display unit, thumbnail images represented by image data in a storage;
- associating, based on a user selection from a plurality of types of marks, a selected mark with at least one of the displayed thumbnail images;

displaying, on the display unit, the selected mark with the displayed thumbnail image that is associated with the selected mark;

storing, in a storage unit, displayed thumbnail images in the form of thumbnail image data different from original image data; and if a thumbnail image previously displayed is displayed again, reading the stored thumbnail image data from the storage unit and displaying, on the display unit, the thumbnail image.

* * * * *